(12) United States Patent
Kawabe et al.

(10) Patent No.: US 7,369,130 B2
(45) Date of Patent: May 6, 2008

(54) METHOD AND APPARATUS FOR EDITING IMAGE DATA, AND COMPUTER PROGRAM PRODUCT OF EDITING IMAGE DATA

(75) Inventors: Tsuyoshi Kawabe, Kodaira (JP); Mitsue Ito, Kodaira (JP); Hirotada Ueda, Kokubunji (JP); Kazuhito Yaegashi, Kodaira (JP)

(73) Assignee: Hitachi Kokusai Electric Inc., Tokyo (JP)

( * ) Notice: Subject to any disclaimer, the term of this patent is extended or adjusted under 35 U.S.C. 154(b) by 277 days.

(21) Appl. No.: 11/119,456

(22) Filed: May 2, 2005

(65) Prior Publication Data

US 2005/0193343 A1 Sep. 1, 2005

Related U.S. Application Data

(63) Continuation of application No. 09/698,260, filed on Oct. 30, 2000.

(30) Foreign Application Priority Data

Oct. 29, 1999 (JP) ................................. 11-308285
Nov. 16, 1999 (JP) ................................. 11-325083

(51) Int. Cl.
*G06T 13/00* (2006.01)
(52) U.S. Cl. ....................... 345/474; 345/157
(58) Field of Classification Search ................ 345/474, 345/157; 715/850, 851
See application file for complete search history.

(56) References Cited

U.S. PATENT DOCUMENTS

| | | | |
|---|---|---|---|
| 5,148,154 A | | 9/1992 | MacKay et al. ............. 715/782 |
| 5,297,061 A | * | 3/1994 | Dementhon et al. ........ 345/180 |
| 5,347,306 A | * | 9/1994 | Nitta ........................ 348/14.1 |

(Continued)

OTHER PUBLICATIONS

Ueda, et al "Desk Top TV Program Creation-TVML (TV program making language) Editor", Association for Computing Machinery, Sep. 1998.

(Continued)

*Primary Examiner*—Kee M. Tung
*Assistant Examiner*—Motilewa Good-Johnson
(74) *Attorney, Agent, or Firm*—Mattingly, Stanger, Malur & Brundidge, P.C.

(57) ABSTRACT

A method for editing an image on a display unit, an apparatus for executing the method and a computer program product for the method, wherein a predetermined CG object is designated in an image on the display unit, and in order to edit the image, a first command list for speech, motion, moving image reproduction or audio reproduction is displayed on the display unit, a command for editing the designated CG object is selected from the first command list and executed for the designated CG object. In the method of editing the image on the display screen and the apparatus for executing the method, the position information of the CG object located in the CG studio on the display unit and the information on the position and orientation of the camera for imaging the CG studio are read from a memory, it is determined whether the CG object selected by the pointing device is a CG character or a property, the information on the position to which the pointing icon has moved on the display unit by manipulating the pointing device is acquired, and the selected CG object is moved to the position to which the pointing icon has moved. Based on the information on the position to which the CG object has moved, the data on the character set-up window is updated in the case where the CG object is a CG character, and the data on the studio set-up window is updated in the case where the CG object is a property. The selected CG object can be dragged to the desired position by the pointing device.

5 Claims, 49 Drawing Sheets

U.S. PATENT DOCUMENTS

| | | | | |
|---|---|---|---|---|
| 5,396,590 A | * | 3/1995 | Kreegar | 715/808 |
| 5,717,848 A | * | 2/1998 | Watanabe et al. | 345/474 |
| 5,850,352 A | | 12/1998 | Moezzi et al. | 345/419 |
| 5,861,889 A | * | 1/1999 | Wallace et al. | 345/619 |
| 5,867,175 A | | 2/1999 | Katzenberger et al. | 345/473 |
| 6,072,467 A | * | 6/2000 | Walker | 345/157 |
| 6,139,433 A | | 10/2000 | Miyamoto et al. | 463/32 |
| 6,208,357 B1 | | 3/2001 | Koga et al. | 345/473 |
| 6,369,821 B2 | | 4/2002 | Merrill et al. | 345/473 |
| 6,466,239 B2 | * | 10/2002 | Ishikawa | 715/850 |
| 6,654,031 B1 | | 11/2003 | Ito et al. | 715/723 |
| 6,675,387 B1 | | 1/2004 | Boucher et al. | 725/105 |

OTHER PUBLICATIONS

Yokoyama, et al A TV Program Generating/Interactive Editing System based on TVML (TV program making language), The 3$^{rd}$ Intelligent Information Media Symposium, Dec. 1997.

Yokoyama, et al "Man-Machine Interface for TV Program Making Language (TVML)" The Institute of Electornics, Information and Communication Engineers Society Conference, Sep. 1997.

Hayashi, et al "TV Program Making Language for Making Personal TV Program on a Desktop" Broadcasting Technique, Jan. 1999, pp. 139-144.

* cited by examiner

METHOD AND APPARATUS FOR EDITING IMAGE DATA, AND COMPUTER PROGRAM PRODUCT OF EDITING IMAGE DATA

CROSS-REFERENCE TO RELATED APPLICATION

The present application is a continuation of application Ser. No. 09/698,260, filed Oct. 30, 2000 and relates to subject matters described in co-pending application Ser. No. 09/337,331 filed on Jul. 21, 1999 and assigned to the assignee of the present application, the contents of which are incorporated herein by reference.

BACKGROUND OF THE INVENTION

The present invention relates to the production and editing of image data, or in particular to an image data editing method, an editing apparatus and a computer program product for carrying out the method used to produce a television broadcast program or a video program.

In recent years, an image data editing system has been developed for producing image data using the computer from GG animation, moving image data, still image data, text data, audio data, sound synthesis data by combining the techniques of animation, sound synthesis and moving image reproduction.

Further, an image data editing method has been conceived in which a TV program is described as a script in time series in the same way as writing a scenario, and the script is interpreted by the computer to create a TV program. According to this method, image data can be interactively edited easily even by a person who has thus far been engaged in the preparation of a program schedule table. In this image data editing method, the editing state is displayed on the display screen and the GUI (graphical user interface) operation can be performed for automatically producing the script.

Examples of the image data editing system for creating a TV program interactively between the user and the computer are disclosed in "Desk-top TV Program Creation—TVML (TV Program Making Language) Editor—", Ueda et al., Association for Computing Machinery, September 1998; "Program Creation/interactive Editing System Based on TV Program Making Language TVML", by Toshiaki Yokoyama, et al., 3rd Intelligence Information Media Symposium, December 1997; "Development of Man-Machine Interface of TV Program Making Language TVML", by Toshiaki Yokoyama, et al., September 1997 Society Convention of The Institute of Electronics, Information and Communication Engineers; and "Program Making Language TVML Making Possible Desk Top Creation of Personal TV Program", by Masaki Hayashi, Broadcast Technologies, January 1999, pp. 139-144.

In the TVML editor disclosed in these references, a program for a virtual studio, i.e. a CG (computer graphics) studio can be created with a computer and a screen connected thereto using the animation characters (CG characters) stored in a large-capacity random access memory such as a hard disk drive, a CG studio set image data library, a voice synthesis tool and an animation production tool without using a real studio or actors/actresses.

An image of a program being edited or created can be displayed on the editing screen of the TVML editor. The image displayed is the one viewed from a preset direction of projection, i.e. the eye of the camera in a virtual studio. During the creation or editing of a program image, the processing is required for moving CG characters and other CG objects on stage and setting the speech and the motion of each CG character accurately in conformance with each other. For changing the set data of the CG characters in the virtual studio, it is necessary to open the setting input screen and input data from the keyboard or the like. This work for changing the setting, which requires the operations of opening different windows and inputting data of information from the keyboard a number of times, is complicated and low in efficiency.

The editing screen used in the conventional image data editing method will be explained with reference to FIG. 6. FIG. 6 shows an example of the screen of the conventional TV program editing device displayed on the monitor. Numeral 201 designates an editing window, numerals 202, 202' studio blocks for setting the speech and motion of CG characters and the camera to image the interior of the CG studio, numeral 203 a movie block, numeral 204 a title block, numeral 205 a superimposition block, numeral 206 a sound block, numeral 207 a narration block, numeral 208 a block for miscellaneous setting, numeral 209 event marks, numeral 210 a monitor window, numerals 211, 212 representative screens, numerals 213, 214 slider sections, numeral 215 a start block and numeral 220 a menu bar.

On the left side of the editing window 201 shown in FIG. 6, the image output on the display screen is indicated by a vertical column having the studio block 202, the movie block 203, the title block 204, the studio block 202', etc. In the editing window 201, the ordinate represents the time and the work of TV program creation is conducted downward on the display screen.

FIG. 7 is an enlarged view of the studio block 202 shown in FIG. 6. Numeral 202 designates the studio block, numeral 301 a speech setting section for setting the speech, voice type, etc. of the CG characters speaking in the CG studio, numeral 302 a motion setting section for arranging and setting the motion of the CG characters walking or otherwise behaving, numeral 303 a camera work setting section for designating the camera work, and numeral 304 a studio set-up button for setting the initial values of the positions of the CG characters and the camera in the studio, the background of the CG studio, properties and scenery and the combination thereof. The set information of the CG studio, the speech and motion of the CG characters and the camera work information are displayed in the studio block 202.

Returning to FIG. 6, the movie block 203 is a section to set the operation for controlling the reproduction of the moving image already edited and prepared in advance, and displays the file name of the moving image and other information. By clicking the representative screen 211 on the left side of the movie block 203 by mouse, for example, a movie setting window (not shown) pops up on the display screen. At the same time as the reproduction, rapid feed and rewinding of the moving image by the operation of editing and setting the movie setting window, in-points and out-points, and timing of superimposition, narration and speech, etc. are designated. The title block 204 is a section in which the display of the text information and a still image on the TV receiver screen or the movie screen, for example, is controlled. When the representative screen 212 on the left side of the title block 204 is clicked, for example, a title window (not shown) pops up on the display screen and the editing of the title screen is made possible.

A superimposition block 205 is a section where the superimposition of text combined with the image output on the TV receiver or the movie screen is controlled, and a sound block 206 is a section in which the background music (BGM) or the like music combined with the image is controlled. A narration block 207, on the other hand, is a section in which a narration is combined with the moving image or the like being reproduced, and a miscellaneous setting block 208 is a section in which the waiting time or the like is set. These blocks can be edited in a similar way to the studio block 202, the movie block 203 and the title block 205 described above.

A TV program creator (hereinafter referred to as the user) creates a TV program by the GUI operation on the edit window 201 shown in FIG. 6. First, in accordance with the scene of the program to be created, the user generates the studio block 202, the movie block 203, the title block 204, etc. in the edit window 201 and arrange them vertically. After miscellaneous detailed setting in each block, the work for creating the program is conducted. The setting in the studio block 202 will be explained as an example.

Basically, the speech and motion of a CG character each can be set only at one corresponding point (cell) of an event.

Specifically, once the studio block 202 is generated and arranged on the edit window 201, one event is created in the studio block 202. The "event" here is defined as one horizontal line on the screen displayed as the event marks 209. The events thus created are recorded in the order of the progress of the program. Upon designation of event addition by the operator, an event is newly added to the studio block 202, which extends vertically, so that the blocks lower than the studio block 202 in the screen (the movie blocks 203 and subsequent blocks, for example) are displaced by one line downward. In this way, after adding an event to each block, the miscellaneous setting of the particular event is carried out. For example, the speech of characters is input to the speech column (cell) in the studio block 202. A TV program is created by this operation.

FIG. 8 is a diagram in which a speech window is displayed above the edit window displayed on the display screen. The same component element as those described above are designated by the same reference numerals, respectively. Numeral 201-1 designates an edit window, numeral 210-1 a monitor window, numeral 401 a speech window, numeral 402 a character setting menu for designating a CG character who speaks in the speech window 401, numeral 403 a speech type setting menu for selecting the use of a text or an audio file, numeral 404 a text box for inputting the words in the case where the text is selected in the speech type setting menu 403, numeral 405 a wait check button for awaiting a start of execution of the next command until the end of the ongoing speech by a CG character, numeral 406 a rate scale for regulating the speed of the speech, numeral 407 a volume scale for regulating the sound volume of the speech, numeral 408 an intonation scale for regulating the intonation of the speech, numeral 409 a pitch scale for regulating the pitch of the speech, numeral 410 a closed caption setting menu for changing the caption, numeral 411 a motion change menu for changing the motion of a CG character, numeral 412 a lip sensitivity scale for regulating the lip sensitivity of a CG character, numeral 413 a pause text box for inputting the number of seconds for which the preceding pause (the period from the start of an event to the time when the character begins to speak) and the tail pause (the period from the time when the character stops speaking to the end of the event), numeral 414 a wait menu for selecting the waiting or not waiting for a speech command, numeral 415 a preview button for previewing the speech of the CG character, numeral 416 a default button for changing the value set in the window to a default value, numeral 417 a cancel button for restoring the window setting to the state prevailing when the window is opened, and numeral 418 a close button for closing the window by use of the setting in the window. The lip sensitivity is a command factor determined by the TVML language specification, which is a coefficient for determining the size of the mouth opening according to the sound level. In the case where it is desired to set the speech of a CG character in the CG studio, the mouse is double clicked at the cell of the speech setting section 301 in FIG. 7. The speech window 401 is displayed on the screen as shown in FIG. 8. The creator desiring that the CG character B speaks a text, for example, first double clicks the mouse at the cell of the desired position in the self setting section 301 to open the speech window 401. The character setting menu 402 is set to the CG character B, and the character string which the producer desires the CG character B speaks is input in the text box 404. After setting the other parameters, the close button 418 is clicked. Thus the creator can cause the CG character to speak the words of the speech.

Not only to set the speech of the CG character, it is also possible to edit a desired event by double clicking the block of the event or the cell of the setting section and thus opening the related window.

The GUI used in this invention will be explained with reference to FIG. 11. FIG. 11 is a pop-up menu of the OSF/Motif widget which is one of the GUI parts. Numeral 800 designates a menu window for displaying a pop-up menu, numeral 801 a parent widget such as "form", "row/column" or "bulletin board" for displaying the pop-up menu, numeral 802 pop-up menu frame, numeral 803 a label widget for menu title, numeral 804 a separator widget for defining menu items, and numeral 805 a push☐button widget constituting a menu item. The pop-up menu is of such a type that the menu is displayed when the mouse is clicked. The OSF/Motif (open software foundation) is an organization engaged in standardization of the operating system and is composed of DEC (Digital Equipment Corporation), HP (Hewlett Packard) and IBM (International Business Machine Corporation). The widget is defined as a high-level GUI in the X window proposed by OSF/Motif and includes a library call for supplying various "parts" considered necessary for the user interface. Among these parts, the availability and quantity of the labels, separators and buttons of the menu can be determined freely.

Generally, the pop-up menu is of such a type that the menu is displayed in response to clicking of the mouse. Normally, a pop-up menu appears on the display screen when the right button of the mouse is clicked within an area where the pop-up menu is registered. The desired menu item is selected by moving the mouse vertically on the pop-up menu display screen while keeping the mouse depressed.

In the case where it is desired for a CG character B to speak a speech in a program already edited, for example, a line of an event is inserted (added) at an event position where it is desired for the CG character to speak the speech. The speech window is opened by double clicking the cell of the event speech setting section 301. It is also necessary to set the character setting menu 402 and input the desired character string to the text box. The setting is impossible unless a plurality of operations similar to those described above are carried out also for editing other events. This repetitive operations are complicated and have an adverse effect on the creation efficiency. Especially in the case where the program to be created is so long, the events are required to be checked by manipulating the scroll bar 213 of the edit window 201 by mouse and thus scrolling the contents of the display in the window. This makes it very difficult to grasp the contents.

Each event includes eight command types including "speech", "motion", "camera", "superimposition", "sound", "mixer", "narration" and "miscellaneous setting". One event can be edited or set for each command type. If all the command types are set, therefore, a maximum of eight commands can be set for each event. The commands including "speech", "motion", "camera", "superimposition", "sound", "mixer", "narration" and "miscellaneous setting" set in each event are executed in that order.

In the conventional method of editing image data, the text information of the script of the video program displayed in the edit window is scrolled while searching for a point of a command to be edited, and the relation between the particular command and the preceding and following commands is checked based on the information on the screen. Then, the edit work such as insertion, modification and deletion of a command is carried out by inputting the text information. This poses the problem that the editing requires a plurality of operating and input sessions.

Especially in the case where the program created is so long, the program contents are very difficult to grasp when scrolling the contents of display in the edit window and thus checking the commands executed.

Also in editing each command of an event separately, assuming that a new command is to be added or one of a plurality of commands is to be changed, the user is required to conduct the edit work carefully considering the order of execution of the commands.

This repetitive operation is so complicated as to increase the inclination to be more dependent on the memory and skill of the user, and forms one of the causes of a suppressed production efficiency.

Further, the cooperation between the work of checking the monitor window after the edit operation and an additional edit work is not sufficient, and requires a similar complicated operation.

Also in the conventional edit screen described in the references cited above, a each change in the set data of a CG object in the virtual studio requires that the set input screen is opened and the data is input from the keyboard or the like. In this work of changing the setting, the repetitive sessions of operation of opening different windows and inputting data through the keyboard are necessary, thus complicating the work and reducing the editing efficiency.

SUMMARY OF THE INVENTION

The object of the present invention is to provide a method and an apparatus for editing image data and a computer program product for executing the method, in which the efficiency of the edit work can be improved with a simple operation of directly designating an object to be edited and edit items and conducting the edit work directly on a CG object on the screen of a monitor window.

According to one aspect of the present invention, there are provided a method and an apparatus for editing image data displayed on a display unit and a computer program product for executing the method, in which a predetermined CG object is designated in the image displayed on the display unit, and in order to edit the particular image, a list of first commands associated with the speech, motion, the reproduction of a moving image or the audio reproduction is displayed on the display unit, a command required for editing the designated CG object is selected from the first command list on display, and the selected command is executed for the designated CG object.

According to another aspect of the invention, there are provided a method and an apparatus for editing an image displayed on a display screen, in which the position information of a CG object existing in a CG studio displayed on the display unit and the information on the position and orientation of the camera for imaging the CG studio are read from a memory; it is determined whether the CG object selected by a pointing device is a CG character or a property; the information on the position to which the pointing icon on the display unit has been moved by operating the pointing device is obtained thereby to move the selected CG object to the position to which the CG object is moved; and based on the information on the position to which he CG object has moved, the data in the character set-up window are updated in the case where the CG object is a CG character, and the data in the studio set-up window are updated in the case where the CG object is a property. The selected CG object can be dragged to and arranged at the desired position with the pointing device.

DESCRIPTION OF THE EMBODIMENTS

Figure 5:
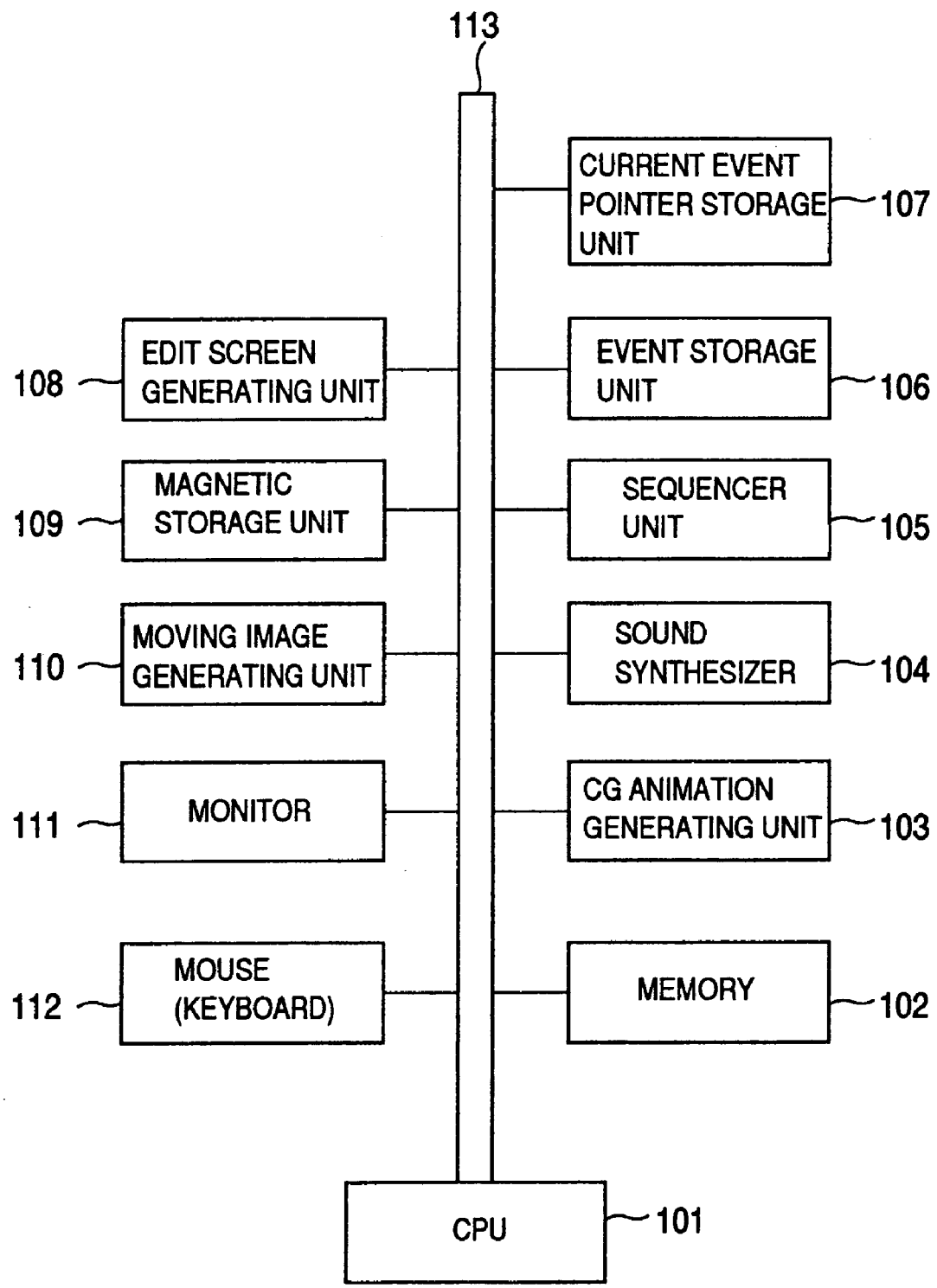
FIG. 5 is a block diagram showing a configuration of an image data editing system according to an embodiment of the invention.

An interactive image data editing system embodying the invention will be explained with reference to FIG. 5. FIG. 5 is a block diagram showing an example of a configuration of a TV program editing apparatus. Reference numeral 101 designates a CPU (central processing unit), numeral 102 a memory, numeral 103 a CG animation generating unit, numeral 104 a sound synthesizer, numeral 105 a sequencer, numeral 106 an event storage unit, numeral 107 a current event pointer storage unit, numeral 108 an edit screen generating unit, numeral 109 a magnetic recording unit, numeral 110 a moving image generating unit, numeral 111 a display unit, numeral 112 an input device including a pointing device such as a mouse and a keyboard, and numeral 113 a bus. The CPU 1 is connected through the bus 113 to the memory 102, the CG animation generating unit 103, the sound synthesizer 104, the sequencer 105, the event storage unit 106, the current event pointer storage unit 107, the edit screen generating unit 108, the magnetic recording unit 109, the moving image generating unit 110, the display unit 111 and the input device 112.

In FIG. 5, the CG animation generating unit 103 generates a CG animation of a CG character that appears (hereinafter referred to as the appearing character) and a CG studio set, and the sound synthesizer 104 generates the speaking voice (including a speech, a cry, the imitation sound, the effect sound of the studio, etc.) of the appearing character. A plurality of the sound synthesizers 104 may be used in the case where a nation or a tribe uses a plurality of languages. The moving image generating unit 110 displays a moving image already edited, and the memory 102 stores the commands for reproducing the speech and the motion of the appearing character, the moving image and the sound corresponding to the scenario of a TV program. The sequencer 105 generates a TV program sequentially by controlling the CG animation generating unit 103, the sound synthesizer 104 and the moving image generating unit 110 based on the command information of a TV program stored in the memory 102. The display unit 111 displays the TV program and the edit information of the TV program created. The edit screen generating unit 108 displays an event edit screen for creating a TV program and manipulates the edit information of the program stored in the memory 102. The event storage unit 106 records in chronological order the commands for the TV program created on the event edit screen by the edit screen generating unit 108 and the commands for the TV program stored in the memory 102 and displayed on the event edit screen generated by the edit screen generating unit 108. The current event pointer storage unit 107 stores by acquiring from the event storage unit 106 the pointer of an event to be edited on the event edit screen generated by the edit screen generating unit 108. The input device 112 is for giving an instruction for display to the display unit 111, an instruction for reproduction to the sequencer 105 and an instruction for editing the TV program command information stored in the memory 102. The input device 112 is mainly made up of a pointing device such as a mouse for GUI operation and a keyboard for GUI operation. The magnetic storage unit 109 stores the modeling data of the appearing character, the data on the CG studio, the image information of the moving image and the audio data (such as music, background sound, etc.) as well as the edit data. The magnetic storage unit 109 may be a remote file connected by a transmission network such as a randomly accessible hard disk, an optical disk or a magneto-optic disk. The bus 113 connects these component elements. These component elements can be connected to other devices through the bus 113. The CPU 101 transmits and receives signals to and from other component elements connected through the bus 113, and each component element is controlled by an access signal from the CPU 101. In the foregoing description, the functions of the hardware and the software are not discriminated for convenience sake. It is, however, simple and desirable to implement the event storage unit 106, the current event pointer storage unit 107 and the edit screen generating unit 108 as the software executed by use of the CPU 101.

The use of the editing system described above makes it possible to arrange the scenario of the TV program in chronological order and efficiently edit it, and also to produce and output the TV program thus created. The image data editing method according to an embodiment of the invention described below is implemented by the system shown in FIG. 5.

Figure 9:
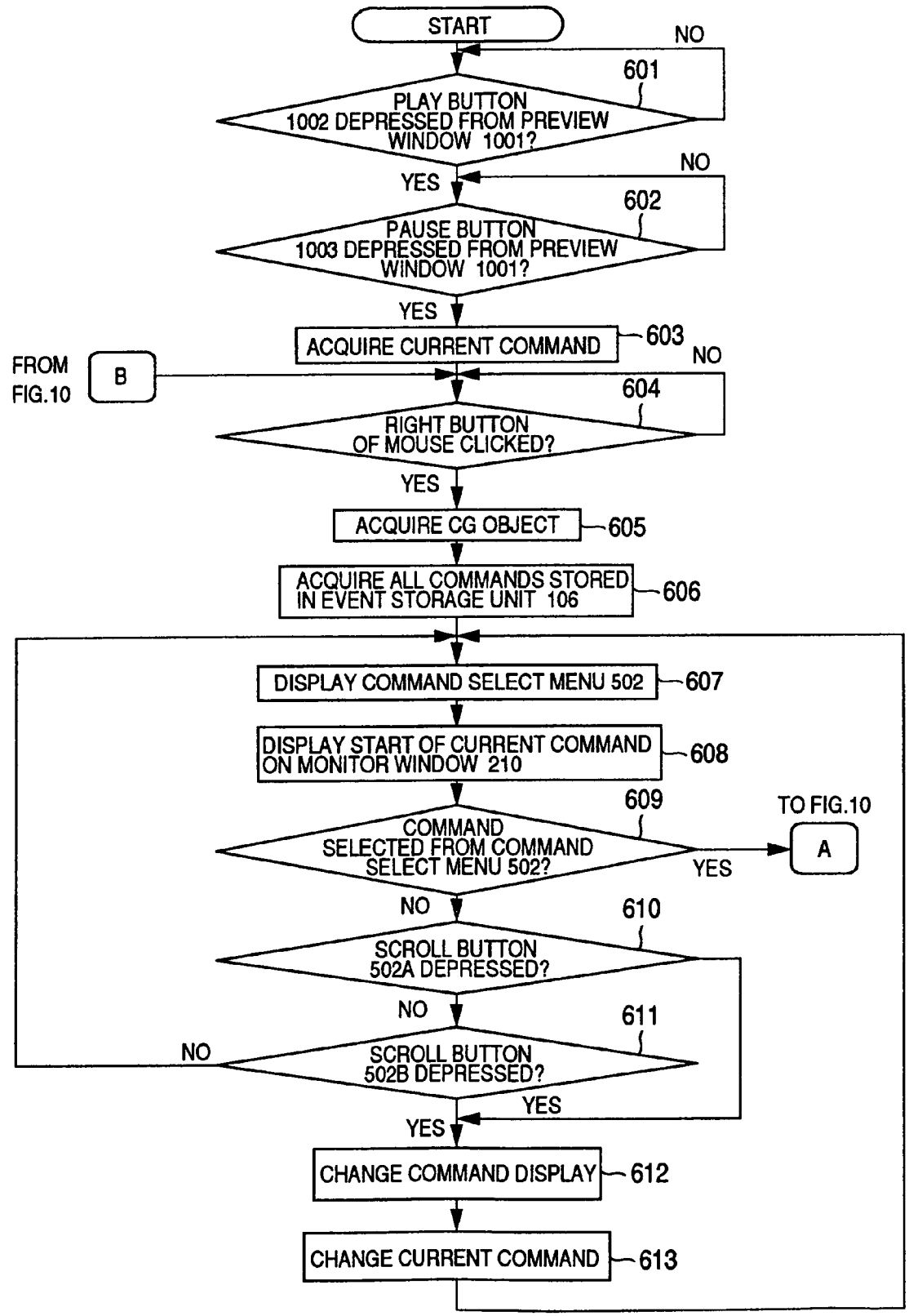
FIG. 9 is a flowchart for explaining the process of operation in an image data editing method according to an embodiment of the invention.
Figure 10:
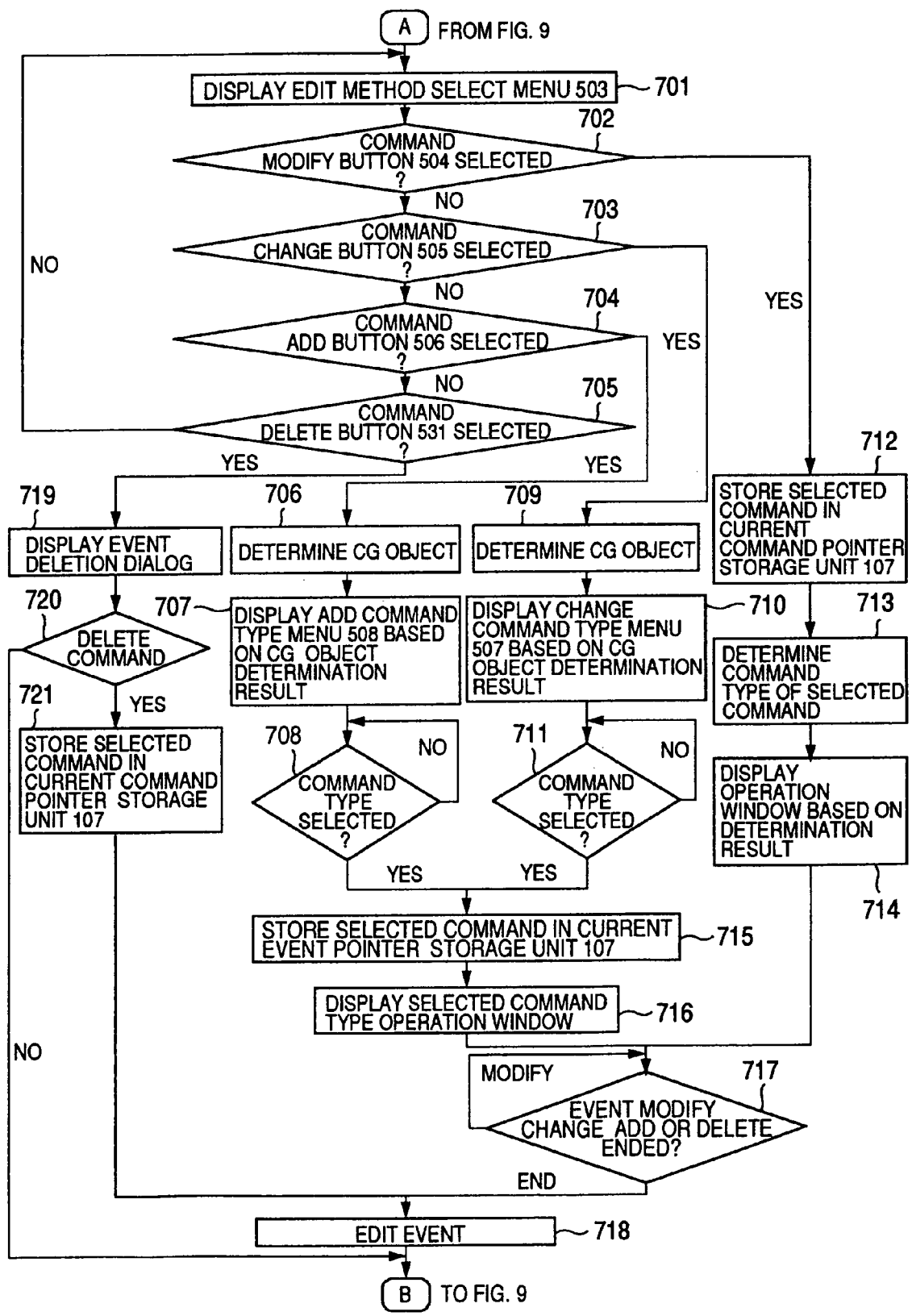
FIG. 10 is a flowchart for explaining the process of operation in an image data editing method according to an embodiment of the invention.
Figure 11:
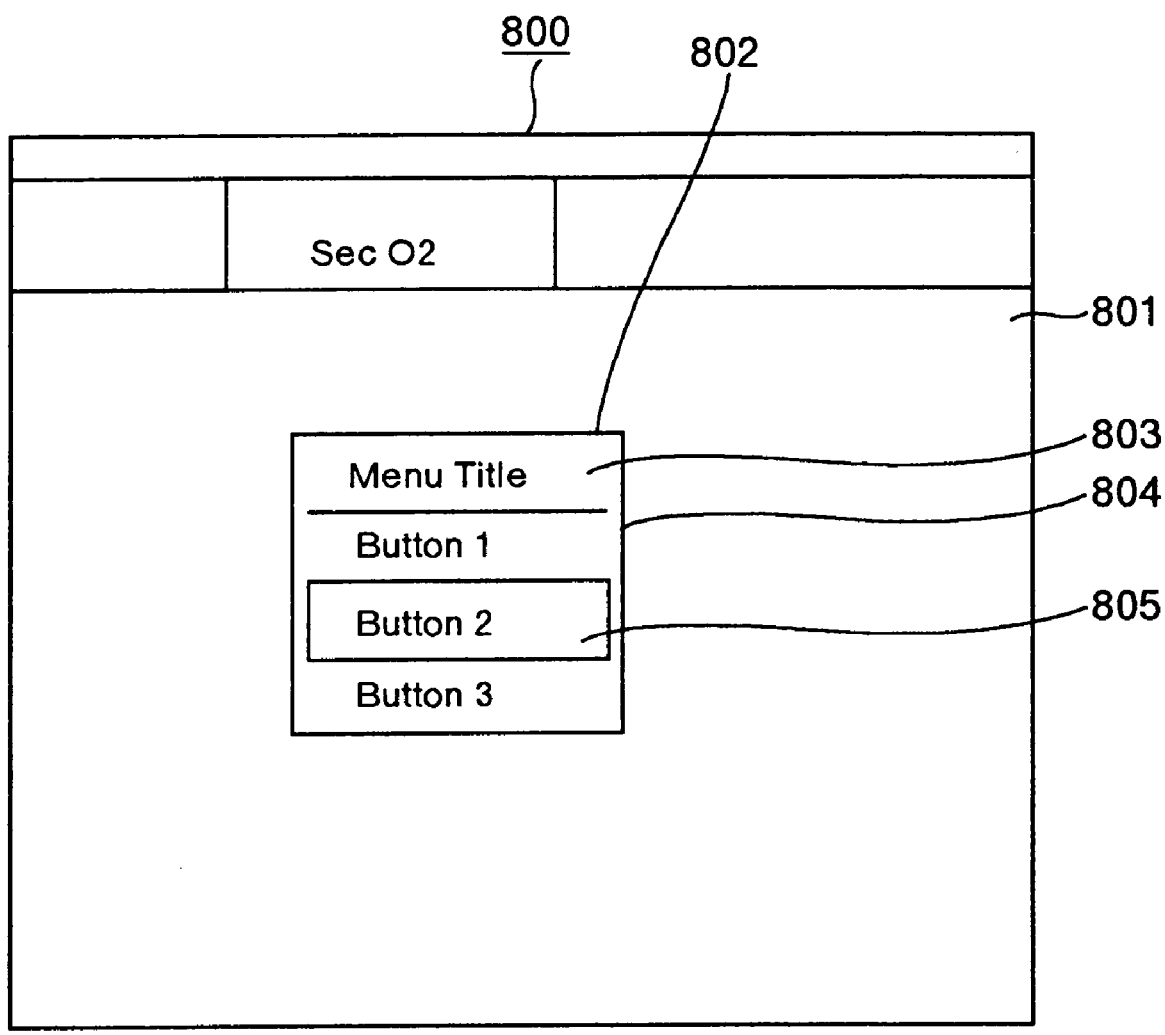
FIG. 11 is a diagram for explaining a pop-up menu on the edit screen.
Figure 12:
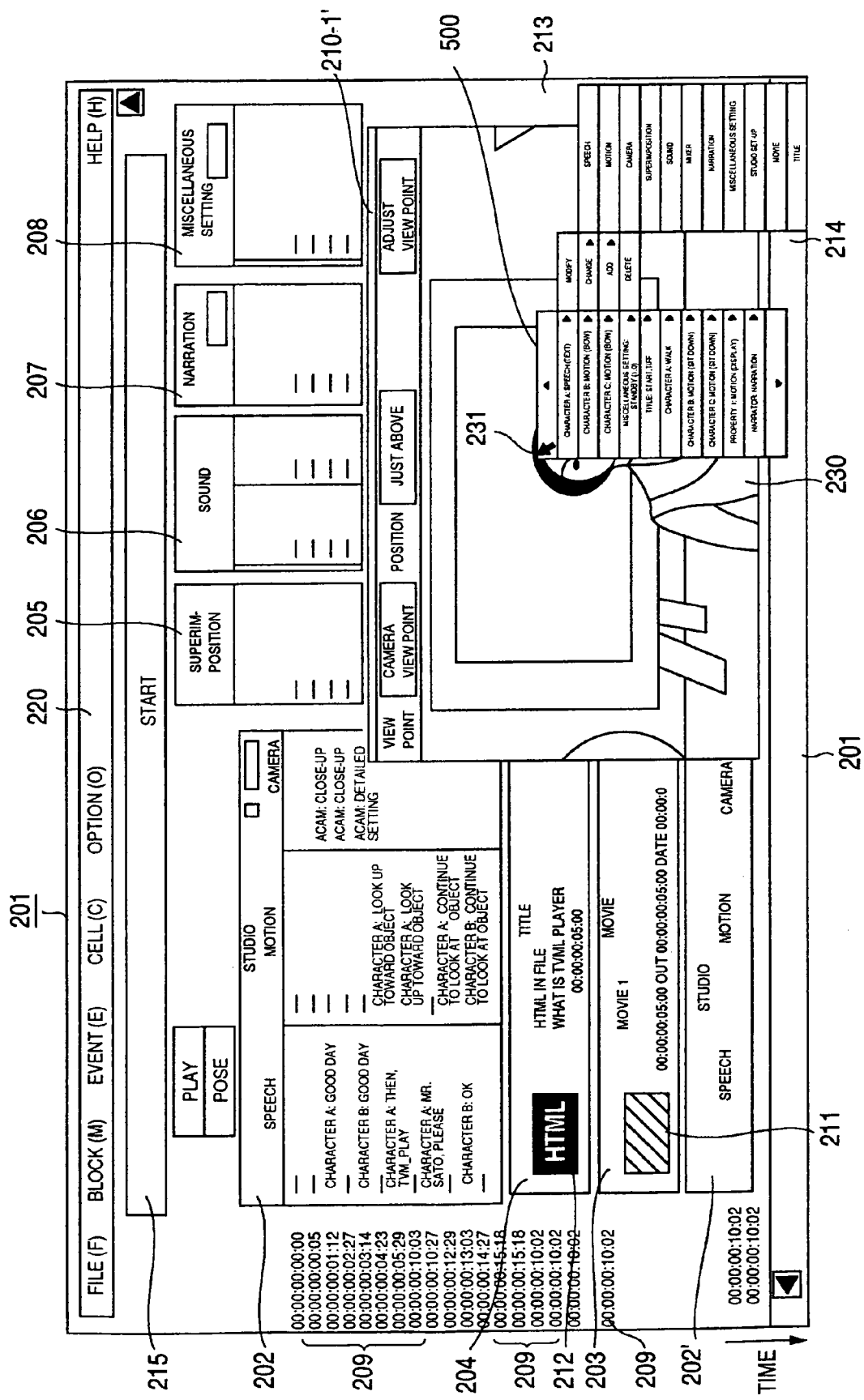
FIG. 12 shows an edit window in the image data editing method according to an embodiment.

An embodiment of the invention will be explained below with reference to FIGS. 1 to 4, FIGS. 9, 10 and 12. FIGS. 1 to 4 are diagrams for explaining a pop-up menu of a command list displayed by being popped up on the monitor window according to an embodiment of the invention. FIG. 9 is a flowchart for explaining the process of operation for displaying a command select menu (command list) according to an embodiment of the invention. FIG. 10 is a flowchart for explaining the process of operation for selecting a command from the command select menu according to the invention. FIG. 12 is a diagram showing an edit window according to an embodiment of the invention. The component elements having the function coincident with those explained with reference to the prior art are designated by the same reference numerals, respectively. As to other component elements, reference numerals 210-1', 501, 501-1, 501-2, 501-3 designate a monitor window, numeral 230 a character B, numeral 231 a pointer, numerals 500, 502 a command select menu, numerals 502a, 502b a scroll button, numeral 503 an editing method select button, numeral 504 a command modification button, numeral 505 a command change button, numeral 506 a command add button, numerals 507, 507', 507" a change command type menu, numeral 508 an add command type menu, numeral 509 a speech change button, numeral 510 a motion change button, numeral 511 a camera change button, numeral 512 a superimposition change button, numeral 513 a sound change button, numeral 514 a mixer change button, numeral 515 a narration change button, numeral 516 a miscellaneous setting change button, numeral 517 a studio set-up change button, numeral 518 a movie change button, numeral 519 a title change button, numeral 520 a speech add button, numeral 521 a motion add button, numeral 522 a camera add button, numeral 523 a superimposition add button, numeral 524 a sound add button, numeral 525 a mixer add button, numeral 526 a narration add button, numeral 527 a miscellaneous setting add button, numeral 528 a studio set-up add button, numeral 529 a movie add button, numeral 530 a title add button and numeral 531 a command delete button.

Figure 8:
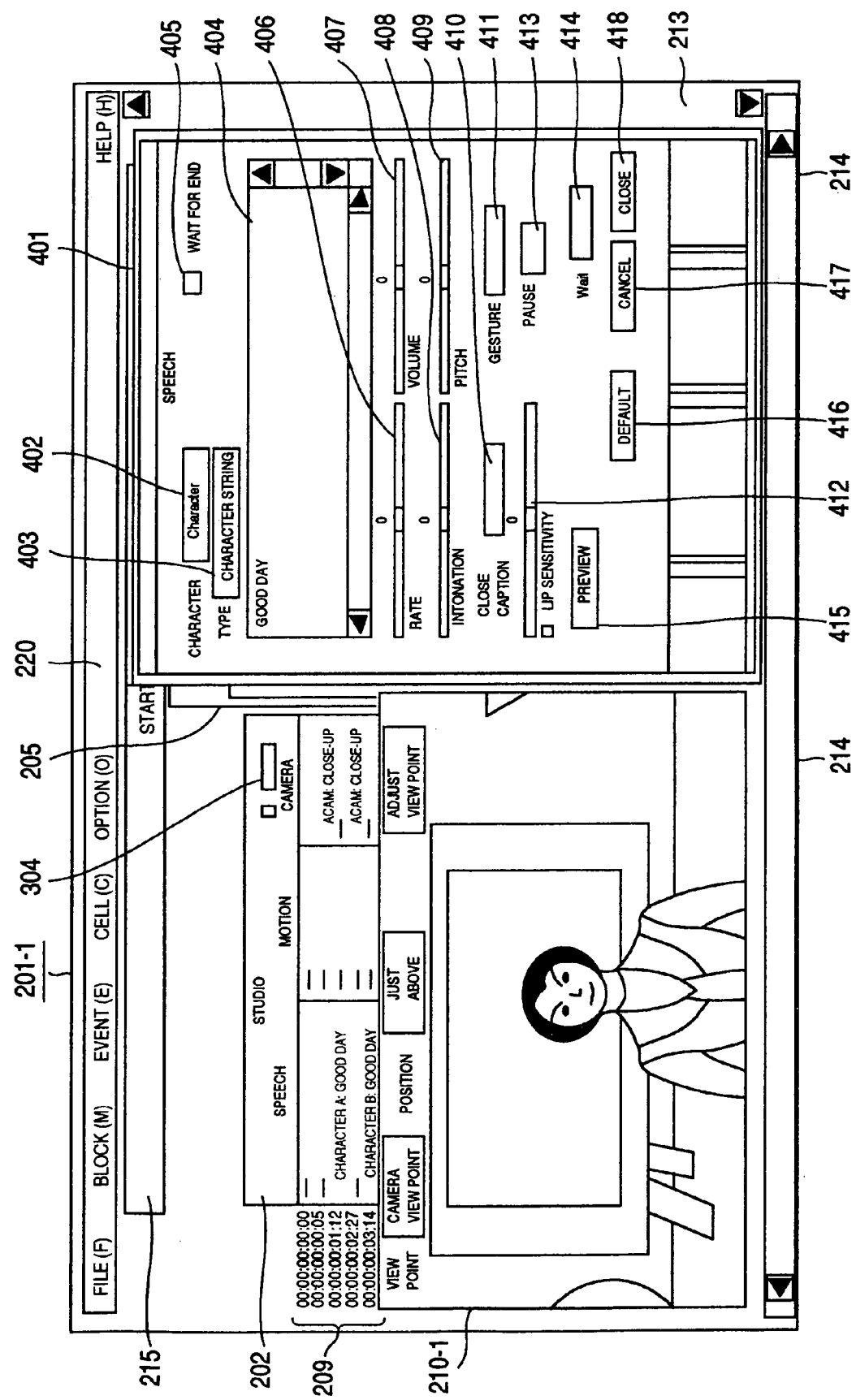
FIG. 8 shows a speech window and a monitor window in the edit screen of a TV program editing apparatus.

According to this invention, the select menu window for the command to be edited can be opened by selecting the CG object displayed on the monitor window 210-1' shown in FIG. 12, whereby the command becomes possible to edit. For example, when a pointer is moved by the mouse to any position on an area of a monitor window 210-1' where a CG character B 230 as an object is displayed thereon and then the right button of the mouse is clicked, the command select menu 500 is displayed. The monitor window 210-1' of FIG. 12 is the result of moving the display position of the monitor window 210-1 of FIG. 8 according to the preference of the user. In this way, the window on the display screen of the display unit 111 can be moved to the desired position.

Figure 6:
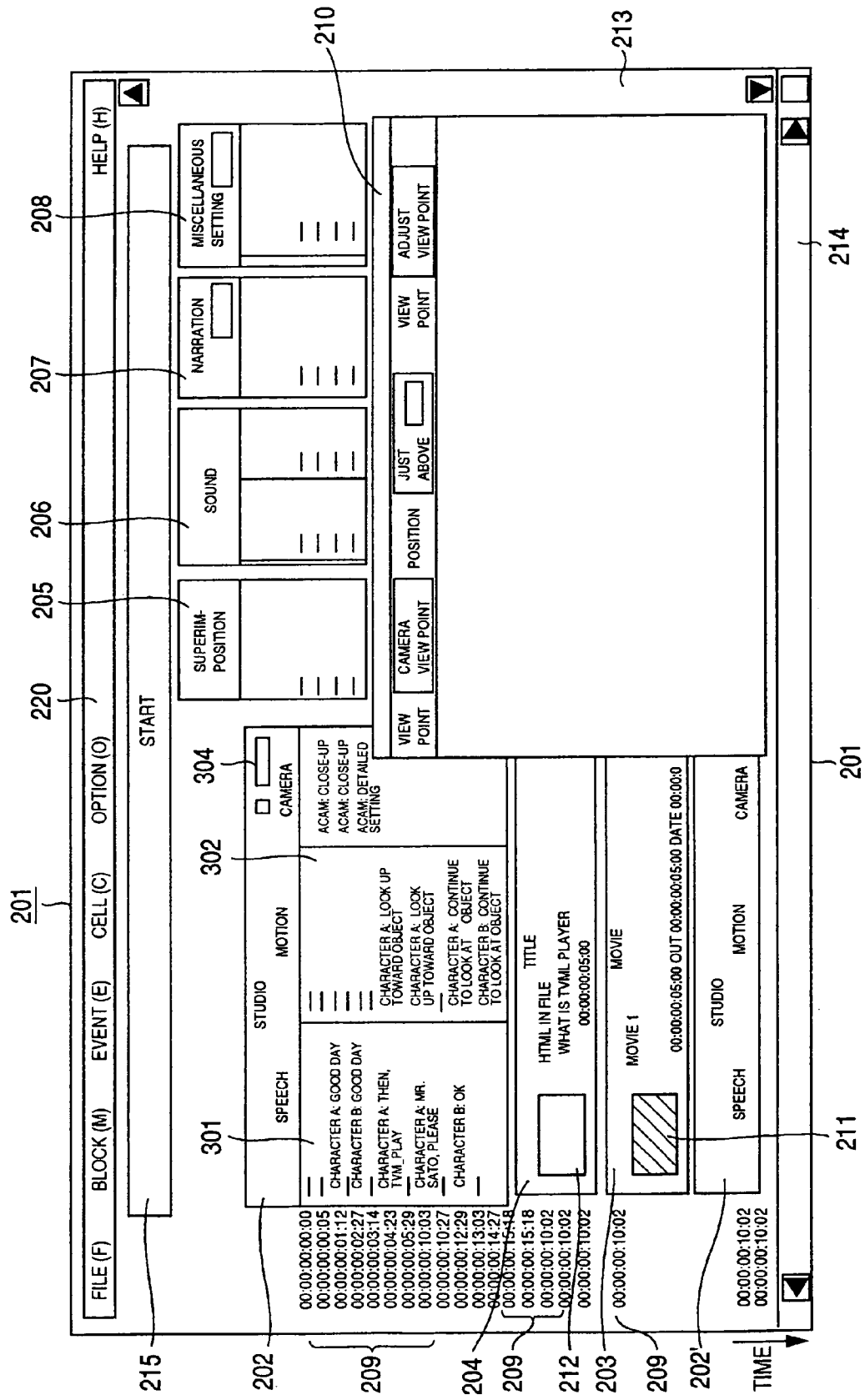
FIG. 6 shows an example of an edit screen of a TV program editing apparatus.
Figure 7:
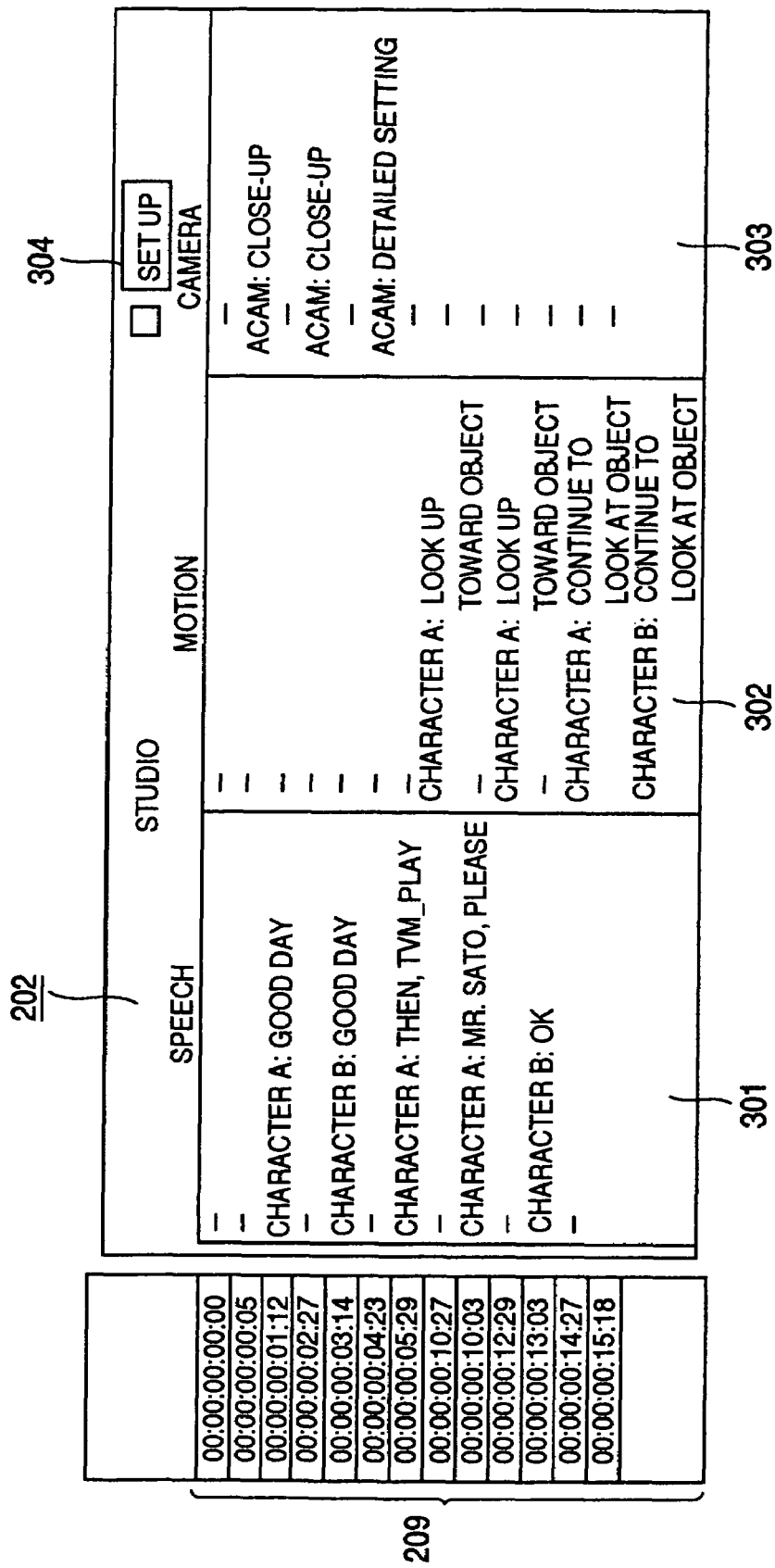
FIG. 7 shows a detailed a studio block in the edit window of a TV program editing apparatus.
Figure 16:
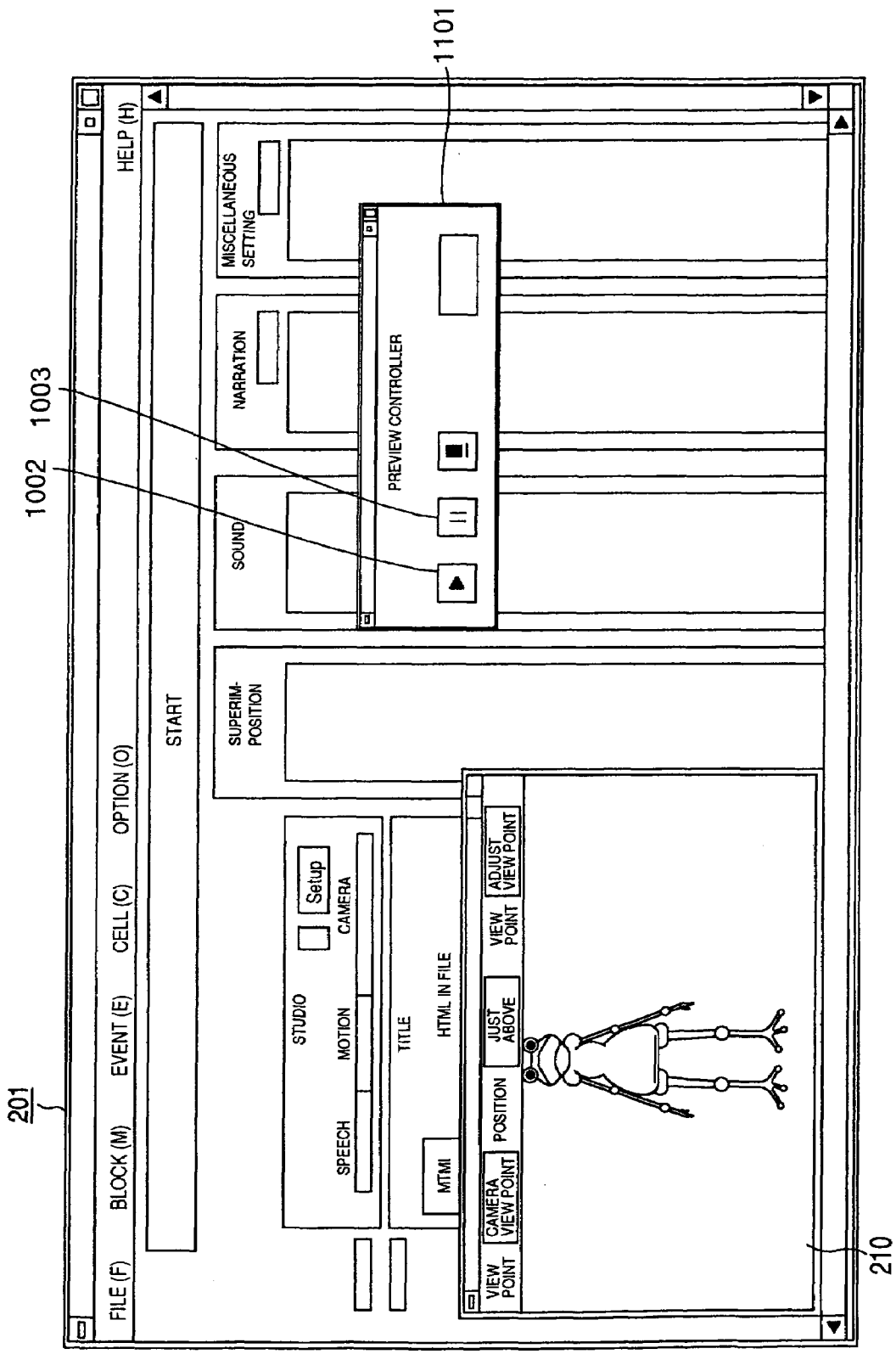
FIG. 16 shows an example of a preview controller and a monitor window displayed on the image data editing apparatus according to an embodiment of the invention.

The initial screen on the monitor window 501 shown in FIGS. 1, 2, 3, 4 and 13 is basically identical to the initial screen on the monitor window 210 shown in FIG. 6. FIG. 16 shows a window for reproducing, upon completion of the edit work or during the edit work, the image of a video program that has already been edited by that time. In the case where the user checks an image that has already been edited, the screen of the monitor window 210 is opened as shown in FIG. 16. Numeral 201 designates an edit window, numeral 210 a monitor window, numeral 1001 a preview controller, numeral 1002 a play button, and numeral 1003 a pause button. By clicking the play button 1002 of the preview controller 1001 displayed with the monitor window 210, the video programs that have already been edited are reproduced on the screen of the monitor window 210 in the order of progress of the scenario thereof. As the user watches a reproduced image, the user can edit an event such as modifying, changing, adding or deleting the setting of a command of the video program.

In the image data editing method according to this invention, the additional edit work such as the modification, change, addition or deletion of the setting of an event of a video program can be easily accomplished by directly designating a CG object in the image on the monitor window. Specifically, when the user selects one of the CG objects in the image on the monitor window by the pointing device, a list showing the names of commands that can be edited for the selected CG object is opened as a select menu on the display screen. The user selects the name of the desired command to be edited from the command select menu and thus makes the particular command ready for editing.

FIG. 9 is a flowchart for explaining the process of operation for displaying the command select menu. FIG. 10 is a flowchart for explaining the process of operation performed in the case where the desired command has been selected from the command select menu in the process shown in FIG. 9.

First, the user clicks the play button 1002 of the preview controller 1001 (FIG. 16) by use of the pointing device to reproduce the edited video program and checks the image reproduced on the monitor window 210. In step 601, it is determined whether the play button 1002 has been clicked or not. When a point (event) requiring the reedit work is found in the reproduced image, the user clicks the pause button 1003 (FIG. 16). In the case where the answer in step 601 is YES, it is determined in step 602 whether the pause button 1003 has been clicked or not. In the case where the answer in step 602 is YES, the command including the image reproduced when the pause button 1003 is clicked is acquired as the current command in step 603.

Then, the user designates a CG object to be reedited on the monitor window 210. In step 604, it is determined whether the area of the CG object in the monitor window 210 has been clicked by the pointing device or not. In the case where the answer in step 604 is YES, the CG object located at the clicked position on the monitor window 210 is acquired from the CG animation generating unit 103 in step 605. Further, in step 606, all the commands stored in the event storage unit 106 are acquired. In step 607, a command select menu (command list) 502 containing the names of all the acquired commands arranged in chronological order is produced and displayed in superimposition on the monitor window 210. In the command select menu 502, the names of the commands of the video programs thus far edited by he user and stored in the event storage unit 106 are displayed in one vertical column. The current command acquired in step 603 is displayed in the central column of the command select menu 502, while the commands before and after the current command are displayed in the range adapted for display above and below the column of the current command name. The commands that cannot be displayed within the frame of the command select menu 502 can be displayed by operating the scroll buttons 502a, 502b. By displaying the command select menu 502, the user can easily grasp the order in which a plurality of commands, if any, are executed, thereby shortening the time for the reedit work.

In step 608, the first image of the current command is displayed on the monitor window 210. Then, the user selects by clicking one command in the command select menu 502 by use of the pointing device. In step 608, it is determined whether any one of the commands in the command select menu 502 has been selected or not. In the case where the answer in step 608 is YES, the process proceeds to step 701 in FIG. 10. In the case where the answer in step 608 is NO, on the other hand, it is determined in step 610 whether the scroll button 502a has been clicked or not or in step 610 or it is determined in step 611 whether the scroll button 502b has been clicked or not. In the case where any one of the scroll buttons 502a, 502b has been clicked, the process for changing the display range of the command select menu 502 is executed in step 612. In step 613, the name of the current command is updated by shifting the display upward or downward in response to the operation of the scroll button 502a in step 610 or the operation of the scroll button 502b in step 611. Thus, the menu updated in step 607 is displayed again. In this way, all the commands from the start to the end of the video program can be checked on the command select menu 502 and the monitor window 501.

Figure 1:
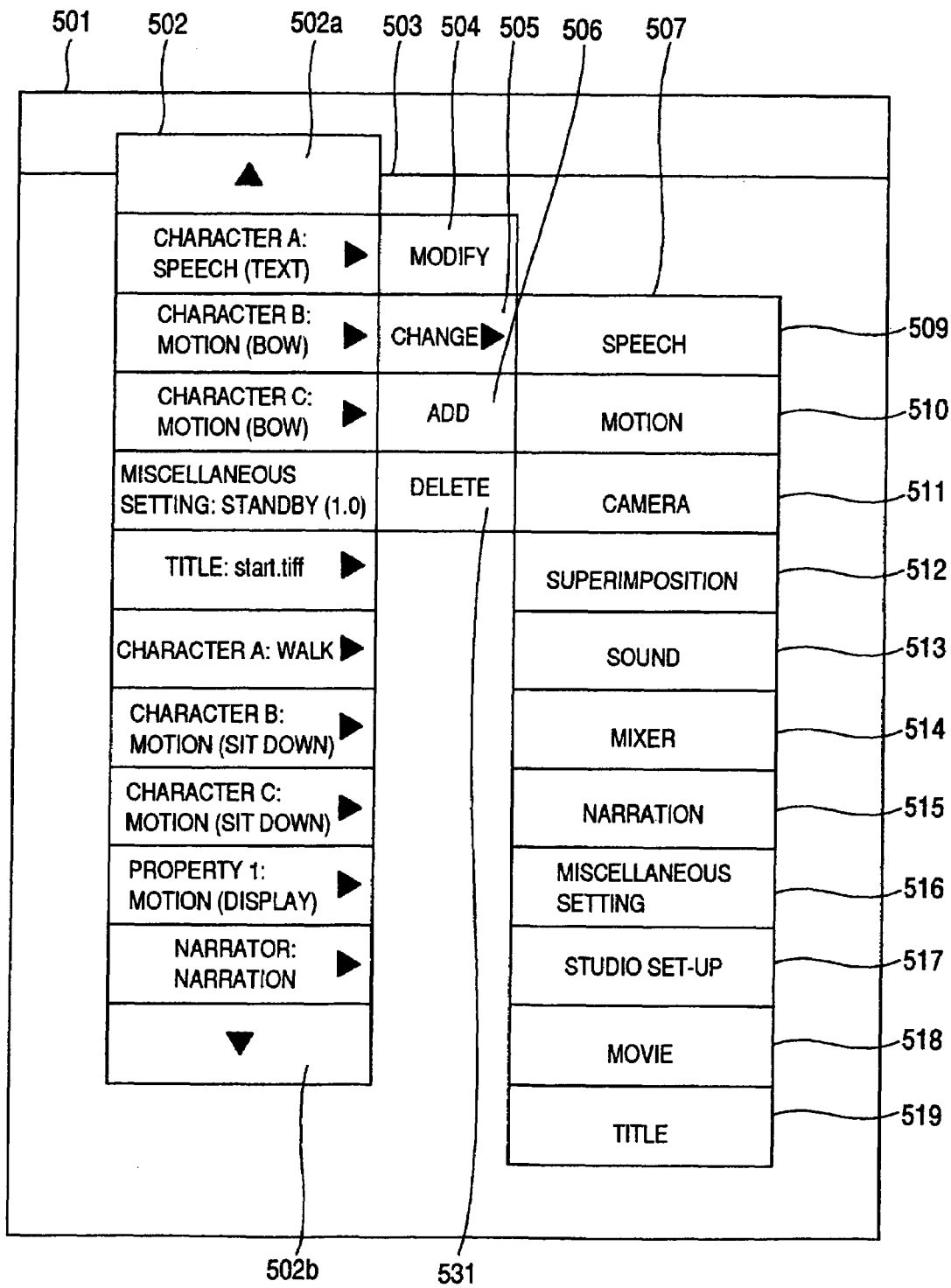
FIG. 1 shows an example of a command select menu displayed in an image data editing method according to an embodiment of the present invention.

All the icons of the command name column displayed in the command select menu 502 are cascade buttons, as shown in FIG. 1. When a command is selected from the command select menu 502 in step 609, the process proceeds to step 701 in FIG. 10.

Figure 14:
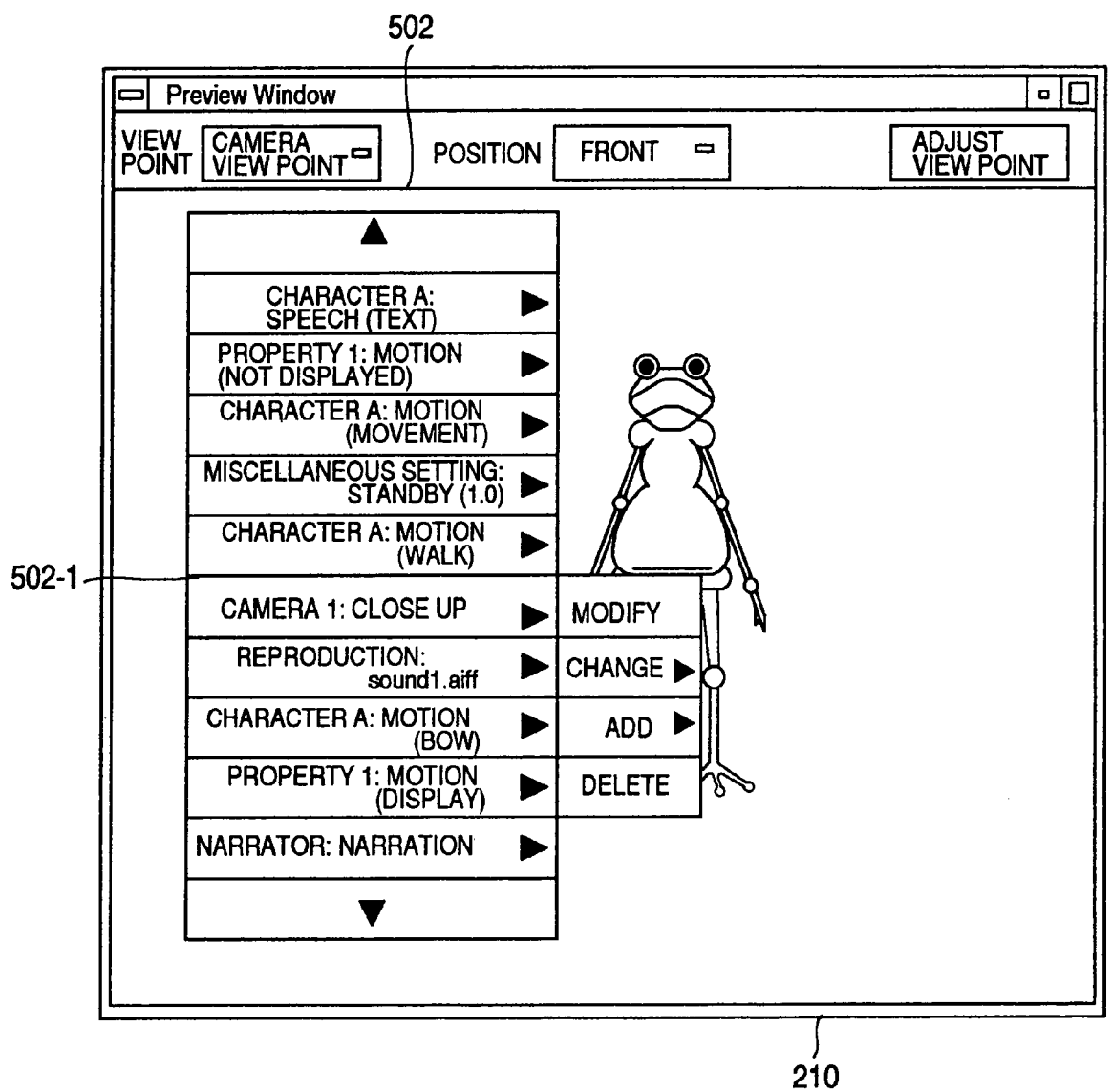
FIG. 14 shows an example of an edit window displayed on the image data editing apparatus according to an embodiment of the invention.
Figure 15:
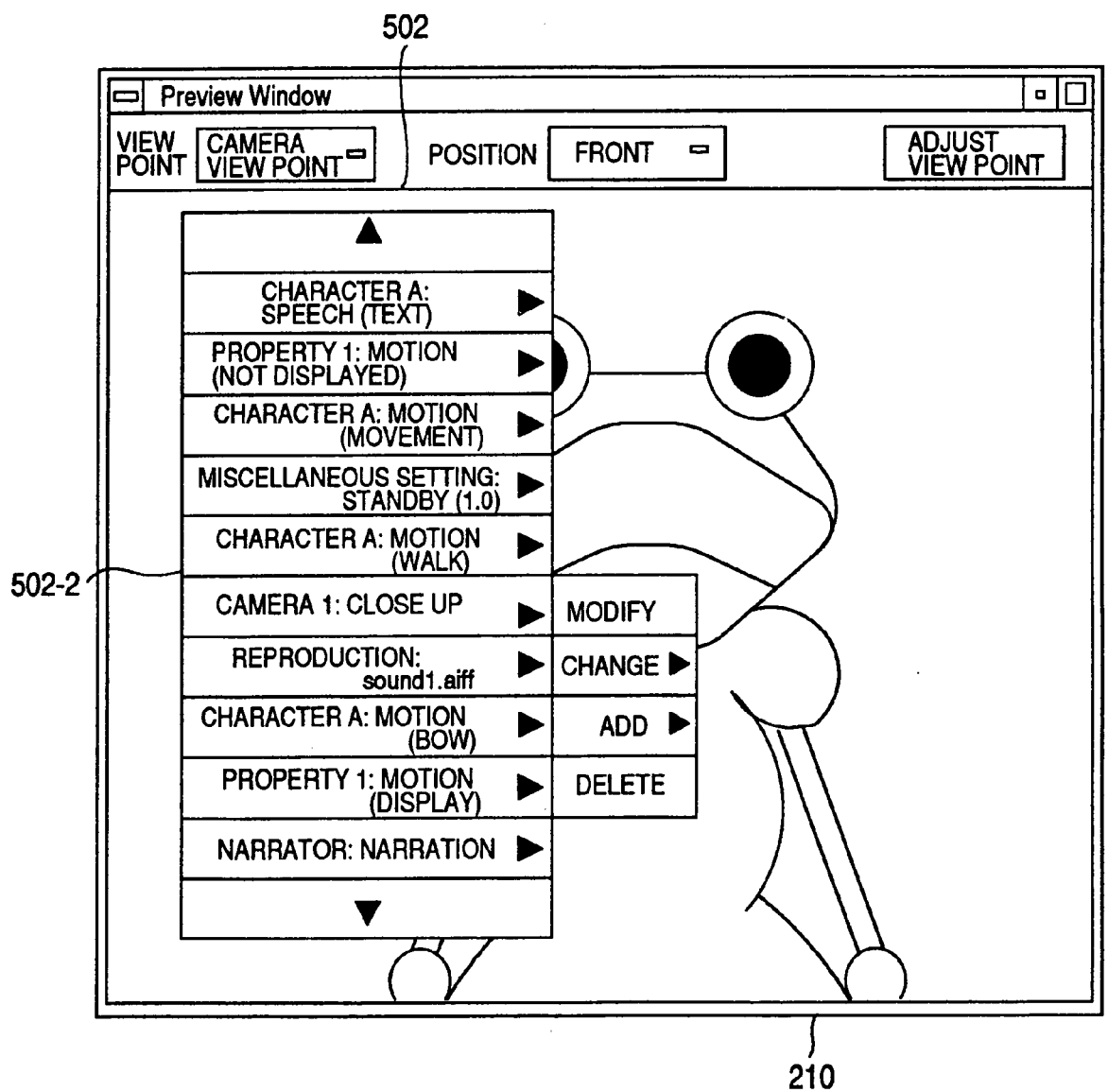
FIG. 15 shows an example of an edit window displayed on the image data editing apparatus according to an embodiment of the invention.

FIGS. 14 and 15 show the difference of the image displayed on the monitor window 210 in the case where different commands are selected from the command select menu 502. FIG. 14 is an example of the monitor window 210 displayed when the command 502-1 is selected from the command select menu 502. FIG. 15 is an image of the monitor window 210 displayed when the command 502-2 is selected from the command select menu 502. By switching the commands, the state of the CG object appearing on the screen can be checked.

In step 701, a menu (command list) 503 for selecting the editing method (command type) is displayed. The editing method select menu 503 has four buttons including a command modify button 504, a command change button 505, a command add button 506 and a command delete button 531 according to the type of the command.

When the command modify button 504 is clicked, the command selected from the command select menu 502 can be modified. This command modify button 504 can be used, for example, in the case where it is desired to change the speech of the CG character or to finely adjust the camera position or the imaging range for the command selected from the command select menu 502.

In step 702, it is determined whether the command modify button 504 has been clicked or not. In the case where the answer is YES, the process proceeds to step 712 in which the selected command is stored in the current command pointer storage unit 107 (FIG. 5). In step 713, the type of the selected command is determined. In step 714, an operation window corresponding to the command type is displayed. The process then proceeds to step 717 for modifying the selected command. When the command modification is completed by closing the operation window, the editing process is carried out according to the contents set by the modified command. The image edited in response to the modified command is stored in the command storage unit 106.

By operating the command change button 505 (FIG. 1), the command selected from the command select menu 502 can be exchanged with other command. In the case where the current command selected from the command select menu 502 is the speech and the CG character is caused to speak the speech, the narrator can be newly caused to do so by changing the current command to the narration. The command change (exchange) button 505 makes up a cascade button. When the command change button 505 is clicked in step 703, the CG object selected in step 605 is determined in step 708. In step 710, a change command type menu (change command list) 507 is displayed based on the result of determination in step 708. The change command menu 507 is configured with 11 buttons for setting a change command, including a speech change button 509, a motion change button 510, a camera change button 511, a superimposition change button 512, a sound change button 513, a mixer change button 514, a narration change button 515, a miscellaneous setting change button 516, a studio set-up change button 517, a movie change button 518 and a title change button 519.

When it is determined in step 711 that any one of the above-mentioned buttons has been clicked, the selected command is stored in the current command pointer storage unit 107 in step 715, and further the operation window of the selected command type is displayed in step 716. In step 717, the selected command can be changed. When the command change is completed by closing the operation window, the editing process is carried out with the contents of setting of the change command in step 718. The edited image of the changed command is stored in the command storage unit 106. At the same time, the command and the command block or the setting section displayed in the command select menu 502 are also changed. The command block or the setting section is changed by checking whether a plurality of commands are included in the command column associated with the command to be changed and the process for change and the screen display are carried out in a manner not to change the order of commands.

Figure 2:
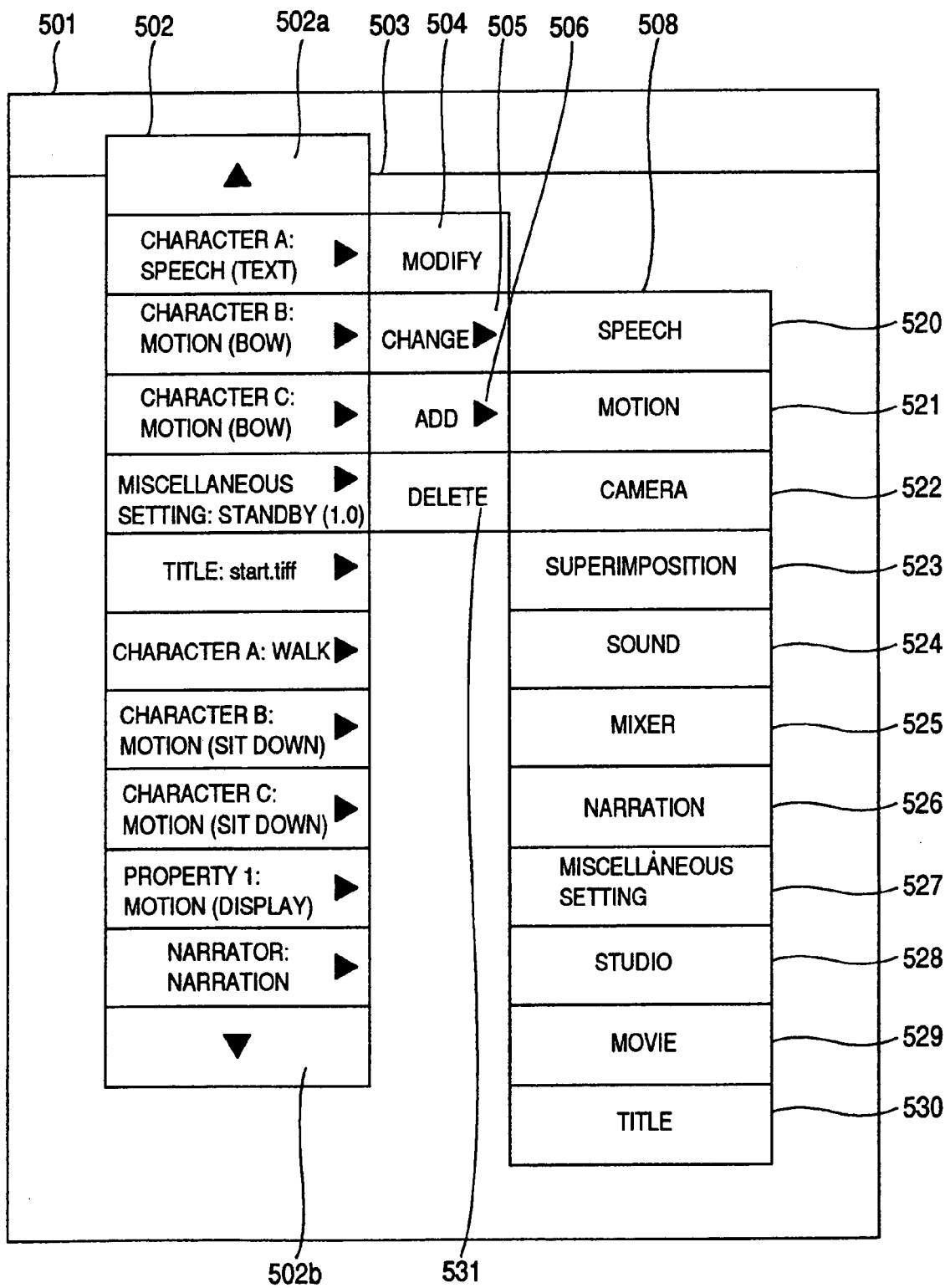
FIG. 2 shows another example of a command select menu displayed in an image data editing method according to an embodiment of the present invention.
Figure 3:
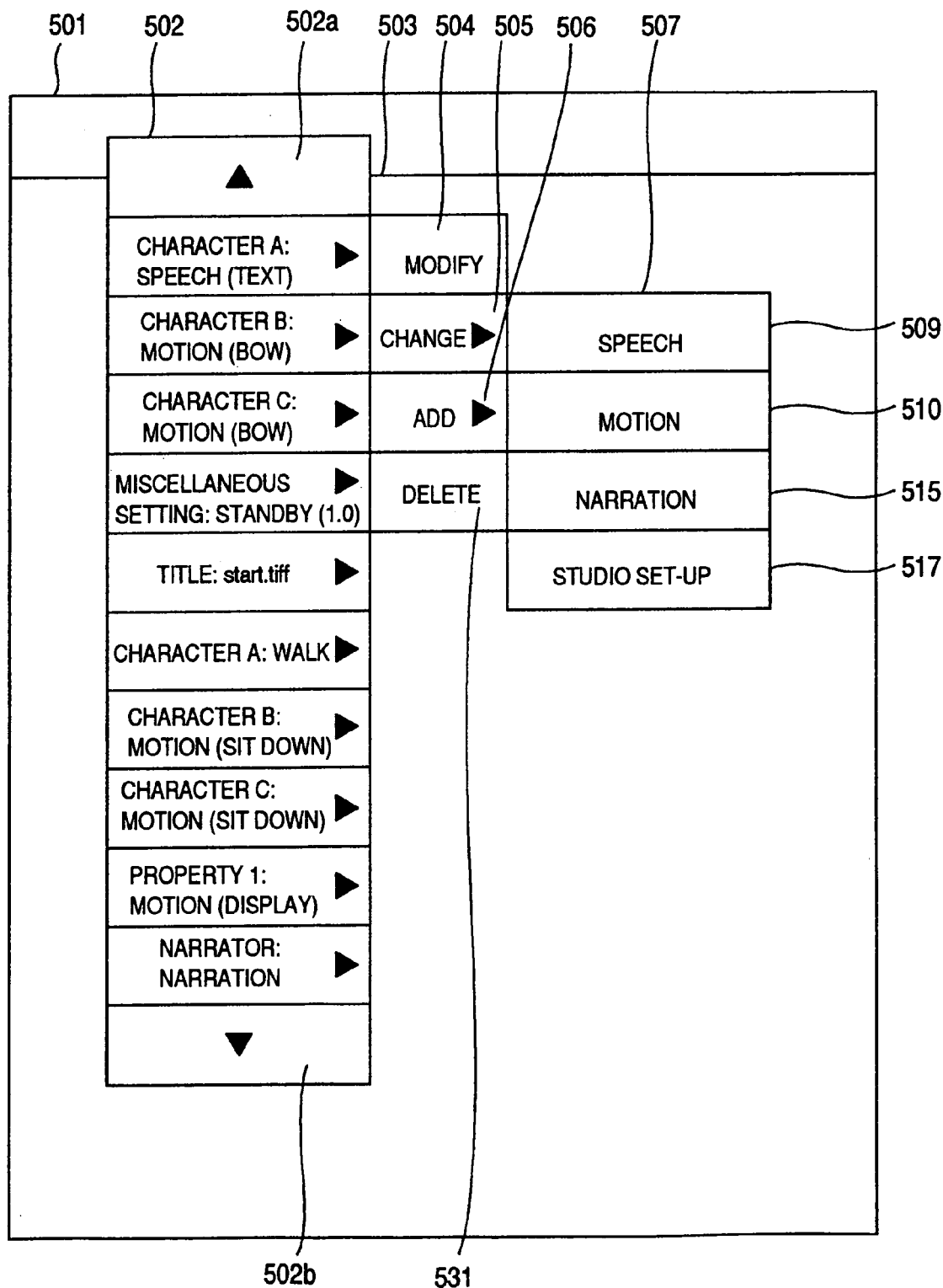
FIG. 3 shows still another example of a command select menu displayed in an image data editing method according to an embodiment of the present invention.
Figure 4:
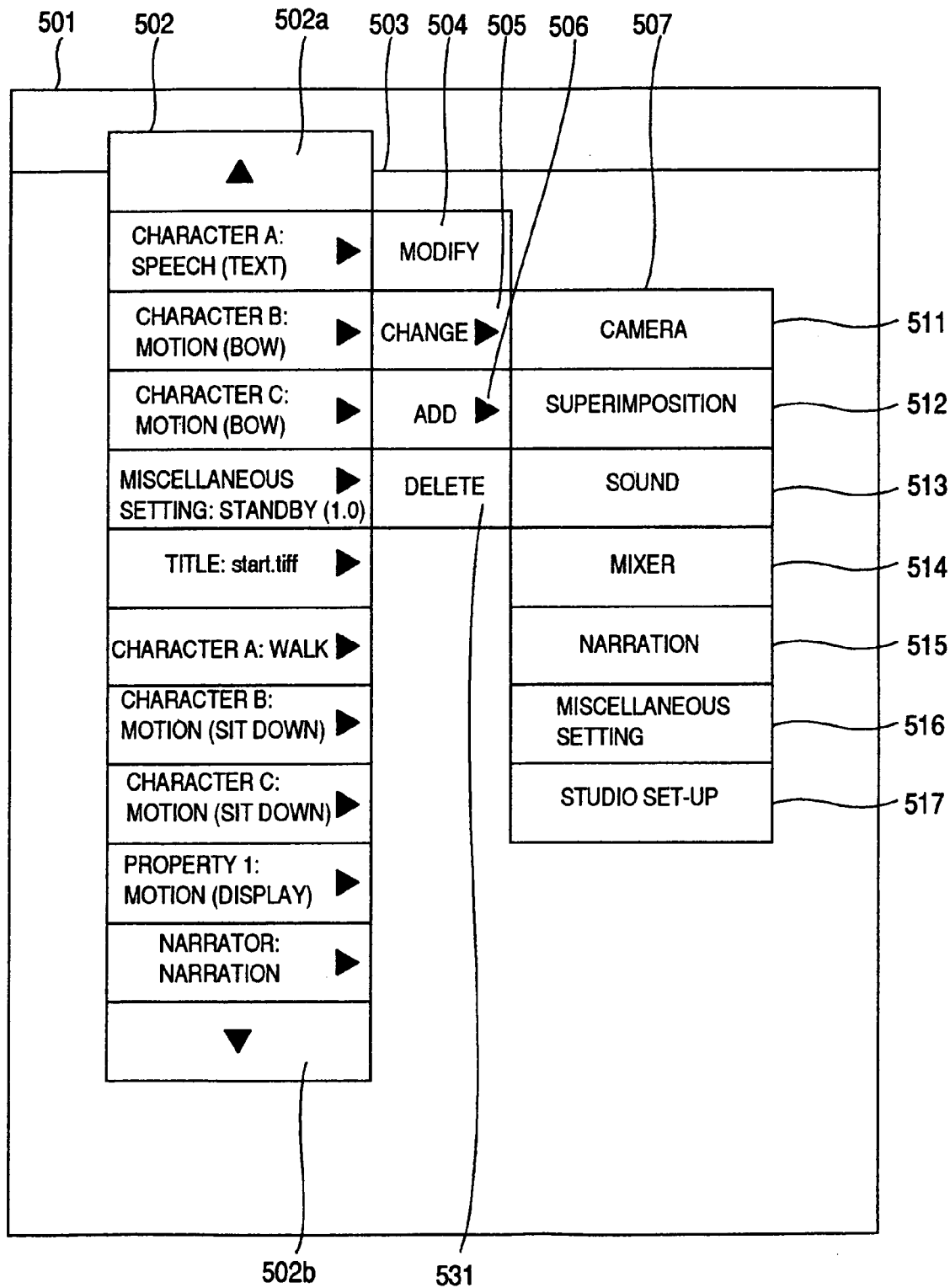
FIG. 4 shows yet another example of a command select menu displayed in an image data editing method according to an embodiment of the present invention.

The command add button 506 can be used to add a command after the command selected from the command select menu 502. Assuming, for example, that the current command selected from the command select menu 502 is the speech which a CG character is caused to speak, after the end of the speech, a command for another motion such as a bow is set so that the image of the CG character bowing can be added. The command add button 506 is a cascade button. Upon determination in step 704 that the command add button 506 has been clicked, the selected CG object is determined in step 706. In step 707, the add command type menu 508 is displayed based on the result of determination in step 706. The add command type menu (add command list) 508 is configured with 11 buttons for adding a command, as shown in FIG. 2, including a speech add button 520, a motion add button 521, a camera add button 522, a superimposition add button 523, a sound add button 524, a mixer add button 525, a narration add button 526, a miscellaneous setting add button 527, a studio add button 528, a movie add button 529 and a title add button 530.

Upon detection in step 708 that one of these buttons has been clicked, the selected command is stored in the current command pointer storage unit 107 in step 715. Further, in step 716, the operation window for the selected command type is displayed. The process proceeds to step 717 for adding the selected command. Upon complete command addition by closing the operation window, the editing process is carried out with the setting of the added command in step 718. After the command selected from the command select menu 502, the command edited by being selected from the add command type menu 508 is added, and the edited command image thus produced is stored in the command storage unit 106. At the same time, the command is added to the commands displayed in the command select menu 502 and the event block or the setting section. In adding the command to the event block or the setting section, the add process and the screen display process are carried out in a manner not to change the order of commands while making sure that the event for the added command has a plurality of commands.

Figure 13:
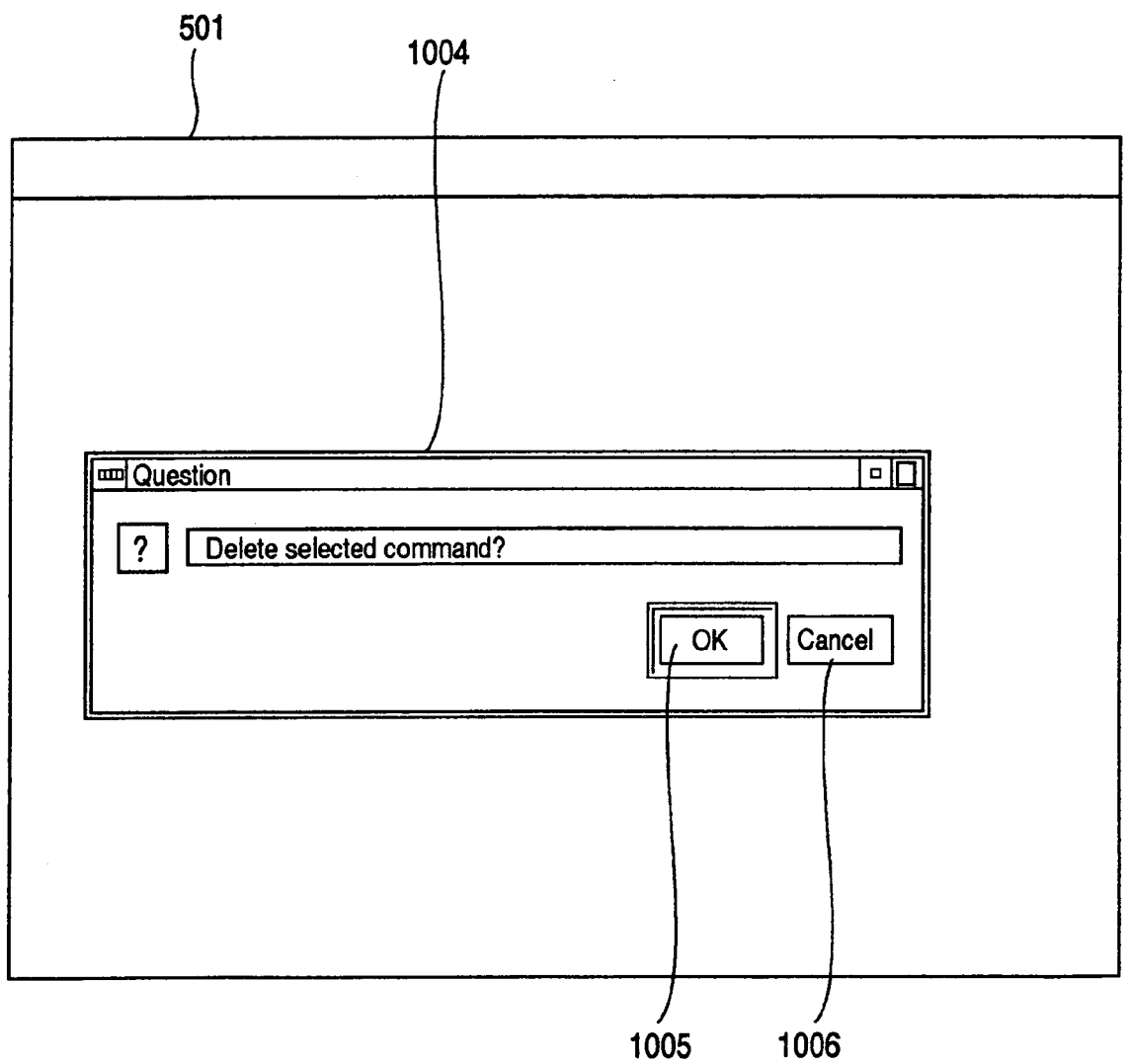
FIG. 13 shows a dialog for deleting a command in the edit window of the image data editing apparatus according to an embodiment of the invention.

The command delete button 531 is used for deleting the command selected from the command select menu 502. The command delete button 531 is a push-button type, and it is determined in step 705 whether the command delete button 531 has been clicked or not. In step 719, the command delete execution dialog 1004 of FIG. 13 is displayed. In the case where the command delete execution button (OK) 1005 is clicked in step 720, the selected command is stored in the current command pointer storage unit 107 in step 721. In step 718, the command selected from the command select menu 502 is deleted, and the command following the deleted command is stored in the command storage unit 106. At the same time, the block or the setting section of the command and the event displayed in the command select menu 502 are also deleted. Also, when the click of the command delete execution cancel button 1006 is recognized in step 720, the command editing is terminated without carrying out the command delete process. By displaying the dialog 1004 and selecting the execution or cancellation in this way, the operation of deleting a command erroneously can be avoided.

A more detailed explanation will be given of the CG object determination process and the display of the add command type menu and the changed command type menu. In step 706 or 709, it is determined what is the CG object acquired from the CG animation generating unit 103 in step 605. In the CG object determination process, the CG object is classified into five objects including "CG character", "properties", "studio", "movie" and "still image". In step 707 or 710, only the command type capable of implementing the CG object determined in the CG object determination process is displayed in the change command type menu 507 or the add command type menu 508.

In the case where the CG object is a CG character, four buttons including a speech change button 509, a motion change button 510, a narration change button 515 and a studio set-up button 517 can be selected from the change command type menu 507 (See FIG. 3.), while three buttons for setting an add command including a speech add button 520, a motion add button 521 and a narration add button 526 can be selected from the add command type menu 508.

In the case where the CG object is a property, two buttons including the motion change button 510 and the studio set-up change button 517 can be selected from the change command type menu 507, while only the motion add button 521 is selectable from the add command type menu 508.

In the case where the CG object is a CG studio, on the other hand, seven buttons including a camera change button 511, a superimposition change button 512, a sound change button 513, a mixer change button 514, a narration change button 515, a miscellaneous setting change button 516 and a studio set-up change button 517 can be selected from the change command type menu 507 (See FIG. 4.), while nine buttons for setting an add command, including a camera add button 522, a superimposition add button 523, a sound add button 524, a mixer add button 525, a narration add button 526, a miscellaneous setting add button 527, a studio add button 528, a movie add button 529 and a title add button 530 can be selected from the add command type menu 508.

In the case where one frame of an image sequence or a still image is displayed in the monitor window 210, the six buttons including the superimposition change button 512, the sound change button 513, the mixer change button 514, the narration change button 515, the miscellaneous setting change button 516, the movie change button 518 (for the moving image) and the title change button 519 (for the still image) can be selected from the change command type menu 507, while the nine buttons can be selected from the add command type menu 508 like the add command type menu 508 corresponding to the case in which the CG object is the studio.

In the case where the selected CG object is a CG character or a property, the name and position of the CG object are reflected on the display when the command type is selected from the change command type menu 507 or the add command type menu 508 and the operation window is displayed in step 716. Thus, when the command select menu window is opened for editing by clicking the right button of the mouse for the CG character or the property, as the case may be, the name of the CG character name or the property for which the command is implemented has been updated to the name of the CG object clicked. In the case where the speech window 401 is opened, for example, the name of the CG character selectively clicked is displayed (updated and set) in the character setting menu 402. In this way, the event editing of the selected CG character or the selected property can be easily designated on the monitor window by the pointing device. Thus, the need is eliminated for the user to perform the complicated operation of inputting by character keys in a predetermined column of the CG character or the property to designate the CG object for which an event is edited.

Figure 17:
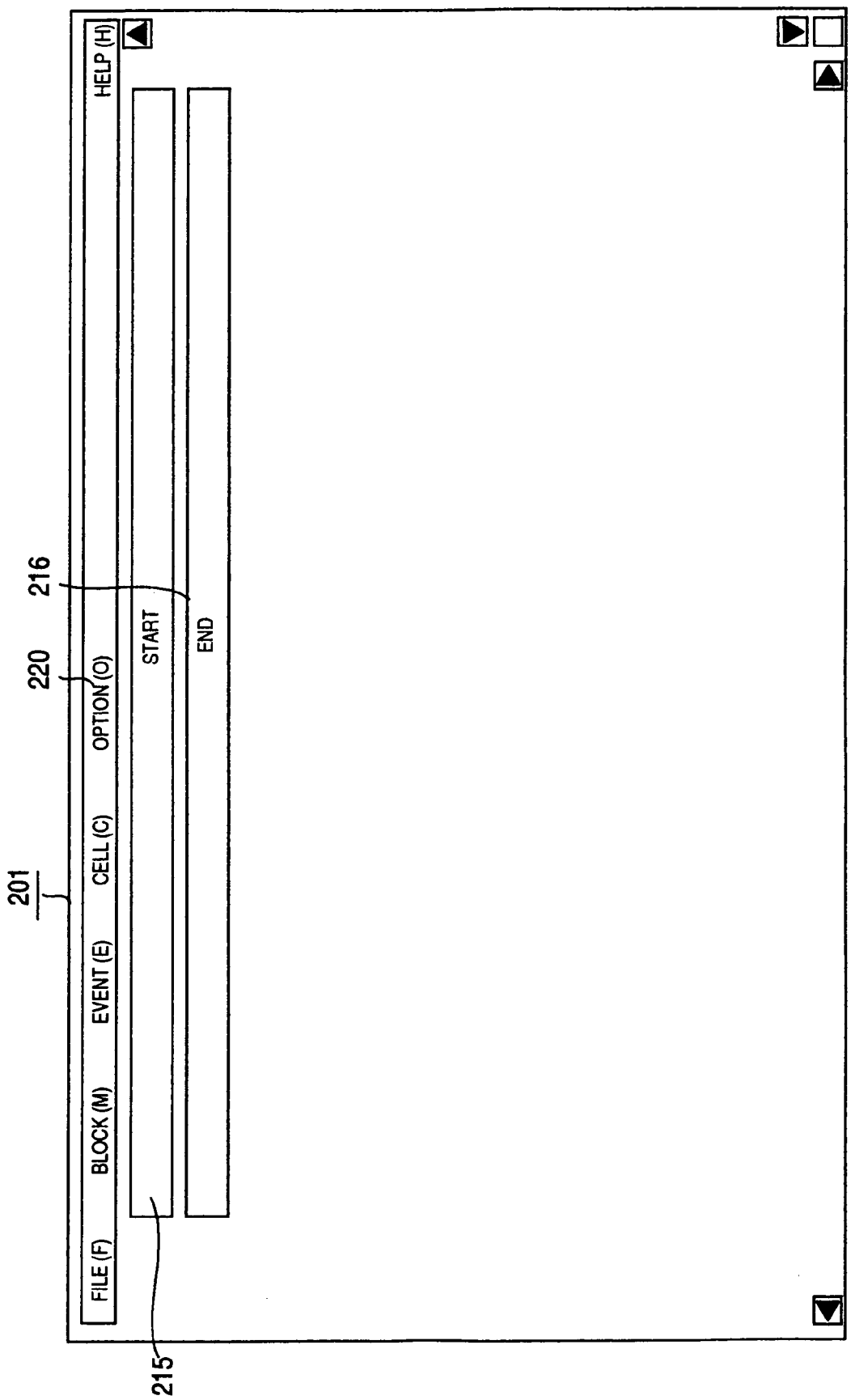
FIG. 17 shows an example of a first edit window displayed to start creating a program on the image data editing apparatus according to an embodiment of the invention.

FIG. 17 shows an initial edit window displayed in the monitor for starting to create and edit a video program anew. When creating a program anew, the first step for the user to follow is to select "block (M)" of the menu bar 220 in the edit window 201 by mouse or the like, and further to select "new creation" from the menu on display. Then, three other menus including "studio", "movie" and "title" are displayed. From these three menus, a menu to be edited is selected. In this way, the selected one of the blocks including the studio block 202, the movie block 204 and the title block 211 is displayed between the start button 215 and the end button 216 (shown in FIG. 6).

Figure 18:
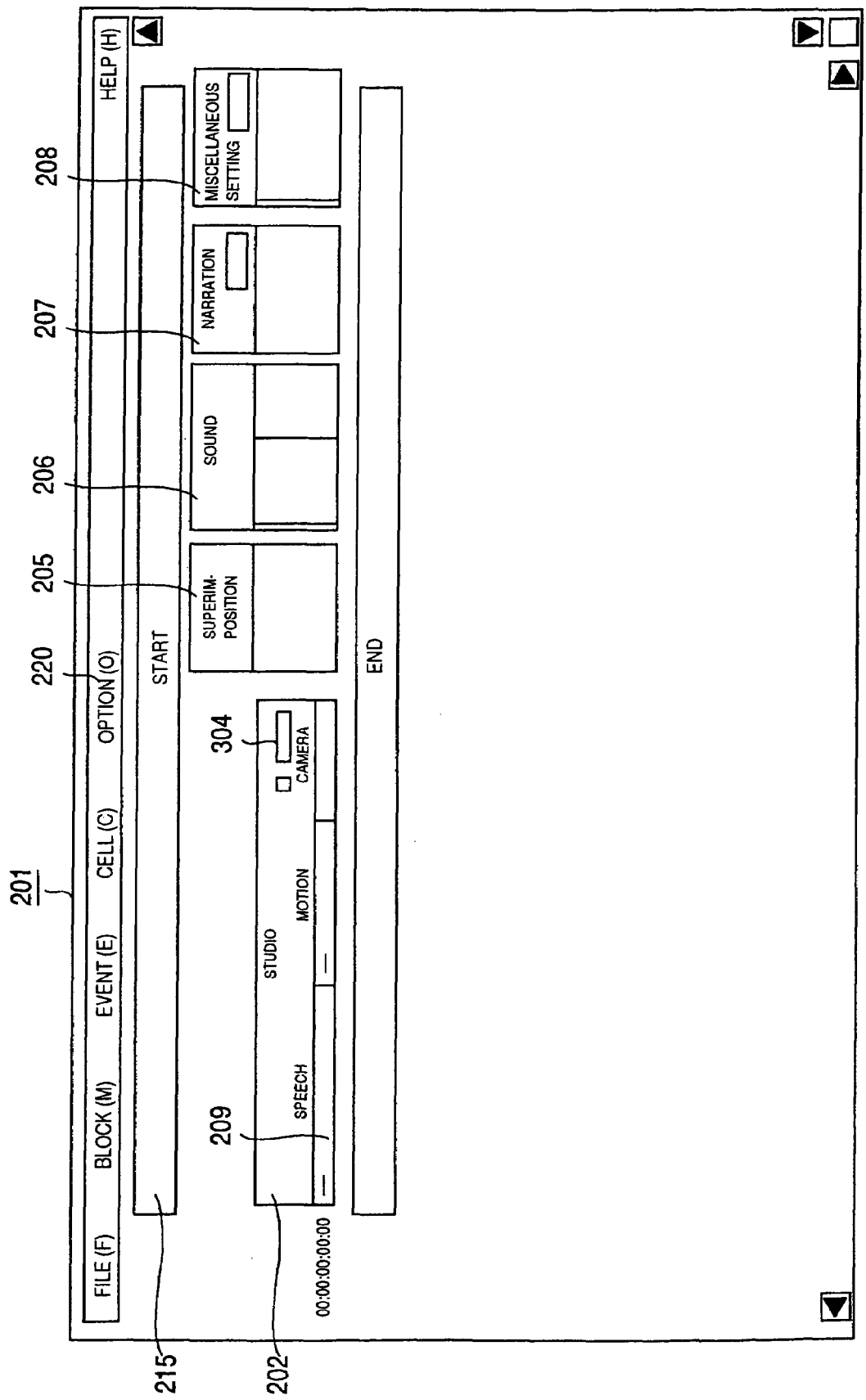
FIG. 18 shows an example of an edit window displayed with the set-up block selected from the screen shown in FIG. 17.

Assuming that "studio" is selected out of the three menus, as shown in FIG. 18, the studio block 202, the superimposition block 205, the sound block 206, the narration block 207 and the miscellaneous setting block 208 appear on the screen. By this time point, the setting in each block is not yet complete, and therefore each event cell is displayed as a blank row.

An explanation will be given of a first method of displaying the monitor window 210 when starting the creation and editing of a video program anew.

Figure 19:
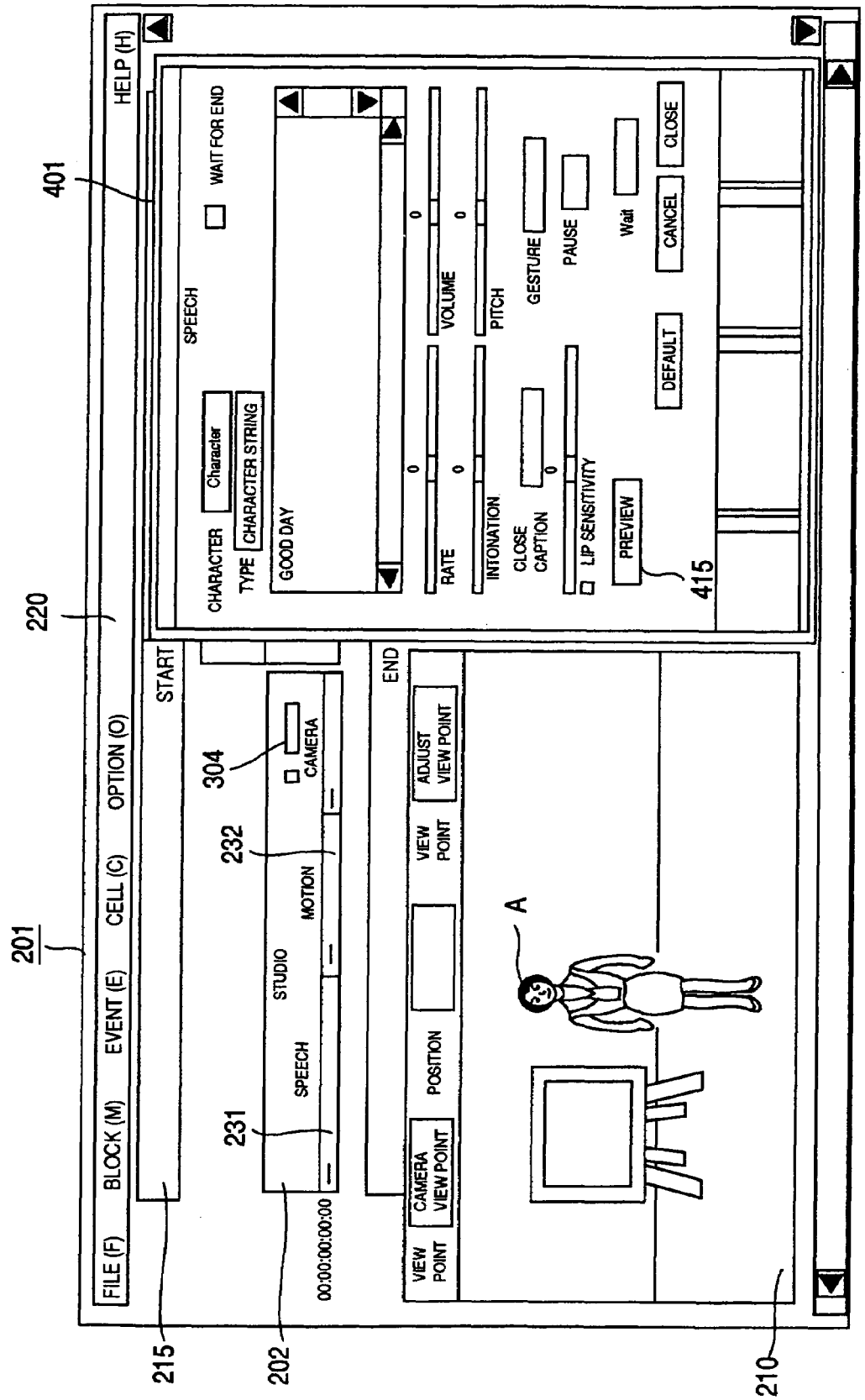
FIG. 19 shows an example of an edit window displayed with the edit process advanced from the screen shown in FIG. 18.

In the case where the user double clicks the cell portion of the speech setting section 209 in the studio block 202 with mouse under the condition of FIG. 18, the monitor window 210 and the speech window 401 with the "default" studio set displayed are popped up and displayed as shown in FIG. 19. When the preview button 415 in the speech window 401 is depressed, the reproduce operation is performed on the monitor window 201 in accordance with the command of the selected cell portion.

In the "default" studio set displayed on the monitor window 210, a background, scenery, properties and a CG object predetermined come to appear at predetermined positions in the studio set with the camera sight set on the front, for example. This setting can be changed even during the editing process to a scene in which a desk constituting a scenery is placed on the front and a CG character stands at the center of the studio in the CG studio, for example, by depressing the studio set-up button 304 or the default button 354 of the studio set-up window 351 in FIG. 21 described later.

As described above, assuming that the user initializes the desired speech or the desired motion of the CG character A 451, for example, by use of an input device on the speech window 401 or the studio set-up window 351 (FIG. 21) popped up for display. Then, the contents (command) of the speech or motion, as the case may be, are written in the cell of either the speech setting section 301 or the motion setting section 302 in the studio block 202 which is double clicked by mouse.

For reediting the first edited image with the speech and motion of the object initialized in this way, the method described with reference to the flow-chart of FIGS. 9 and 10 is carried out.

As described above, according to this invention, the contents of the event edited are easily grasped temporally and the event edit work is simplified and can be easily carried out. Thus, the efficiency of the creation of TV programs and moving image can be improved.

Further, the CG object of the event to be edited can be designated by selecting the CG object such as the CG character or properties displayed on the monitor window, and therefore, the operation is simplified. Not only that,. since the editing result is displayed directly on the monitor window, an image data editing method can be realized in which the edit work can be very easily checked.

Now, the image editing method according to another embodiment of the invention will be explained. According to this embodiment, the editing process for modifying or changing the motion of a CG character, e.g. the movement and arrangement of the CG character can be carried out by a simplified operation of designating a CG character directly on the monitor window and manipulating the mouse pointer on the monitor window.

Figure 20:
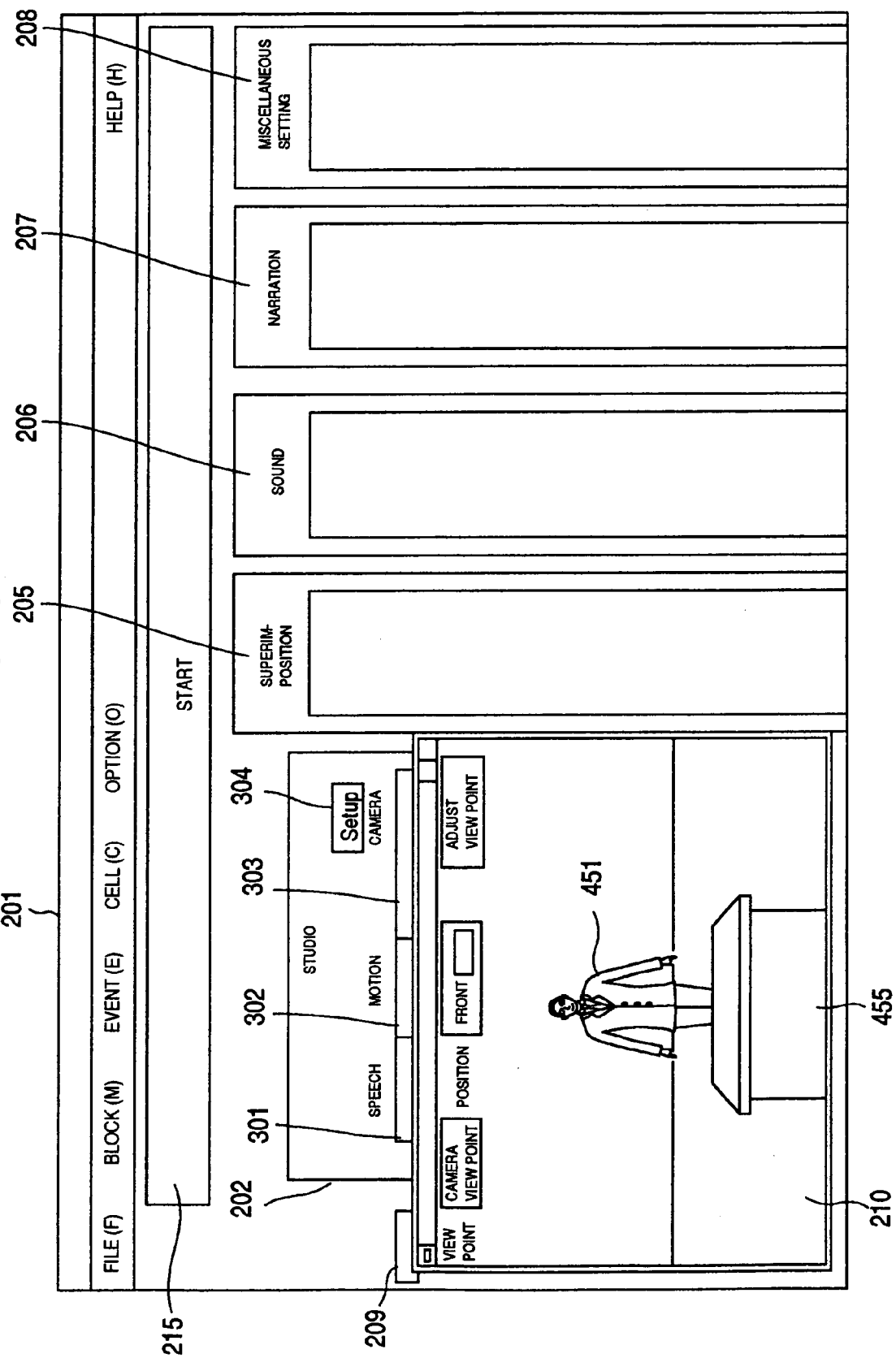
FIG. 20 shows an example of the basic edit screen for the TV program creation device.

The edit screen of the TV program editing device will be explained with reference to FIG. 20. FIG. 20 shows a basic edit screen displayed on the display unit 111. This edit screen is basically the same as the corresponding one shown in FIG. 6. The same reference numerals as those in FIG. 6 designate the same component parts, respectively.

In the system shown in FIG. 5, the TV program creator (hereinafter called the user) creates a TV program by the GUI operation on the edit screen shown in FIG. 20. First, the user generates a studio block 202, etc. and arranged them vertically on the edit window 201 in accordance with the desired scene of the program to be created. The program creation work is continued by detailed miscellaneous setting in the block. The following explanation is made taking the setting of the studio block 202 as an example.

Figure 21:
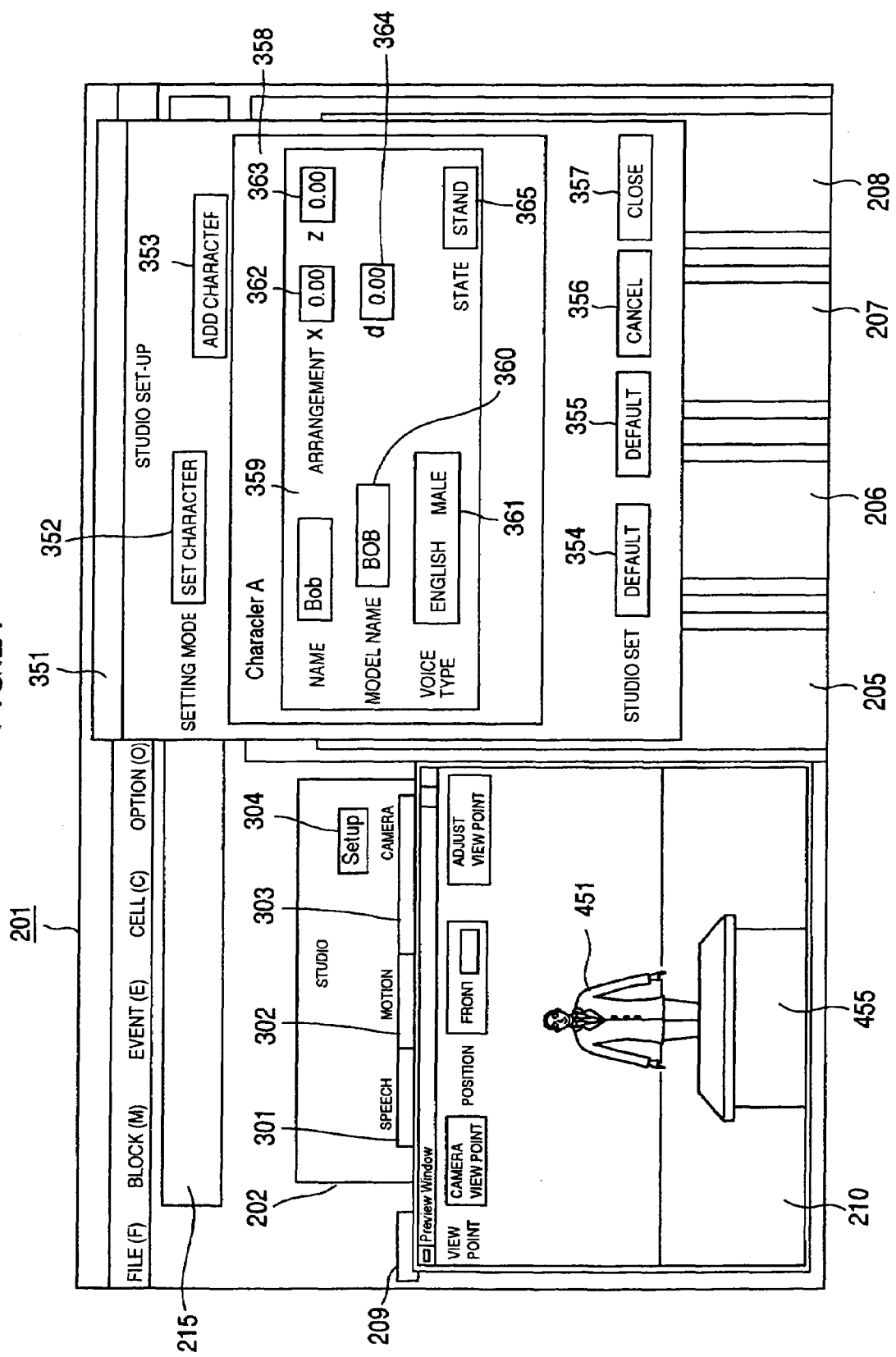
FIG. 21 shows an example of the studio set-up window on display.

In the case where a CG character and properties (hereinafter collectively called the CG object) are arranged in the studio, the studio set-up button 304 is clicked by mouse. As shown in FIG. 21, the studio set-up window 351 is displayed on the edit window 201. FIG. 21 is a diagram showing an example screen in which the studio set-up window is started. The same component elements having the same functions as those described above are designated by the same reference numerals as the corresponding component elements, respectively. Numeral 352 designates a setting mode select menu for switching the setting mode between the CG character, the camera and the properties, numeral 353 an add button for adding a CG object or camera to the studio, numeral 354 a studio set select menu for changing the CG studio set, numeral 355 a default button for initializing the values of arrangement of the CG object, etc., numeral 356 a cancel button for restoring the state before editing, numeral 357 a close button for ending the studio set-up work, numeral 358 a character board, numeral 359 a name editing text field, numeral 360 a model select menu, numeral 361 a voice type menu, numeral 362 an arrangement x value text field, numeral 363 an arrangement z value text field, numeral 364 a direction d value text field, and numeral 365 a state select menu. In the description that follows, the arrangement of a CG character will be taken up as an example. The character board 358 includes a name edit text field 359 for editing the name of the CG character, a model select menu 360 for selecting the type of the character, the voice type menu 361 for selecting the type of the language spoken by the CG character, the arrangement x value text field 362 indicating the position of the x coordinate of the CG character, the arrangement z value text field 363 indicating the z coordinate, the direction d text field 364 indicating the direction of the CG character, and the state select menu 365 for selecting the standing state or seated state. As many character boards 368 as the CG characters are displayed. The coordinate of the CG studio is represented by, as viewed from the studio front, the horizontal direction as x axis (rightward direction indicated by +), the vertical direction as y axis (upward direction indicated by +), the direction along the depth as z axis (forward direction indicated by +), and the center of the floor surface (xz plane) of the CG studio as the origin. The CG studio front is defined as the direction of the view point displayed in the monitor window 210 in FIGS. 20 and 21.

Figure 22:
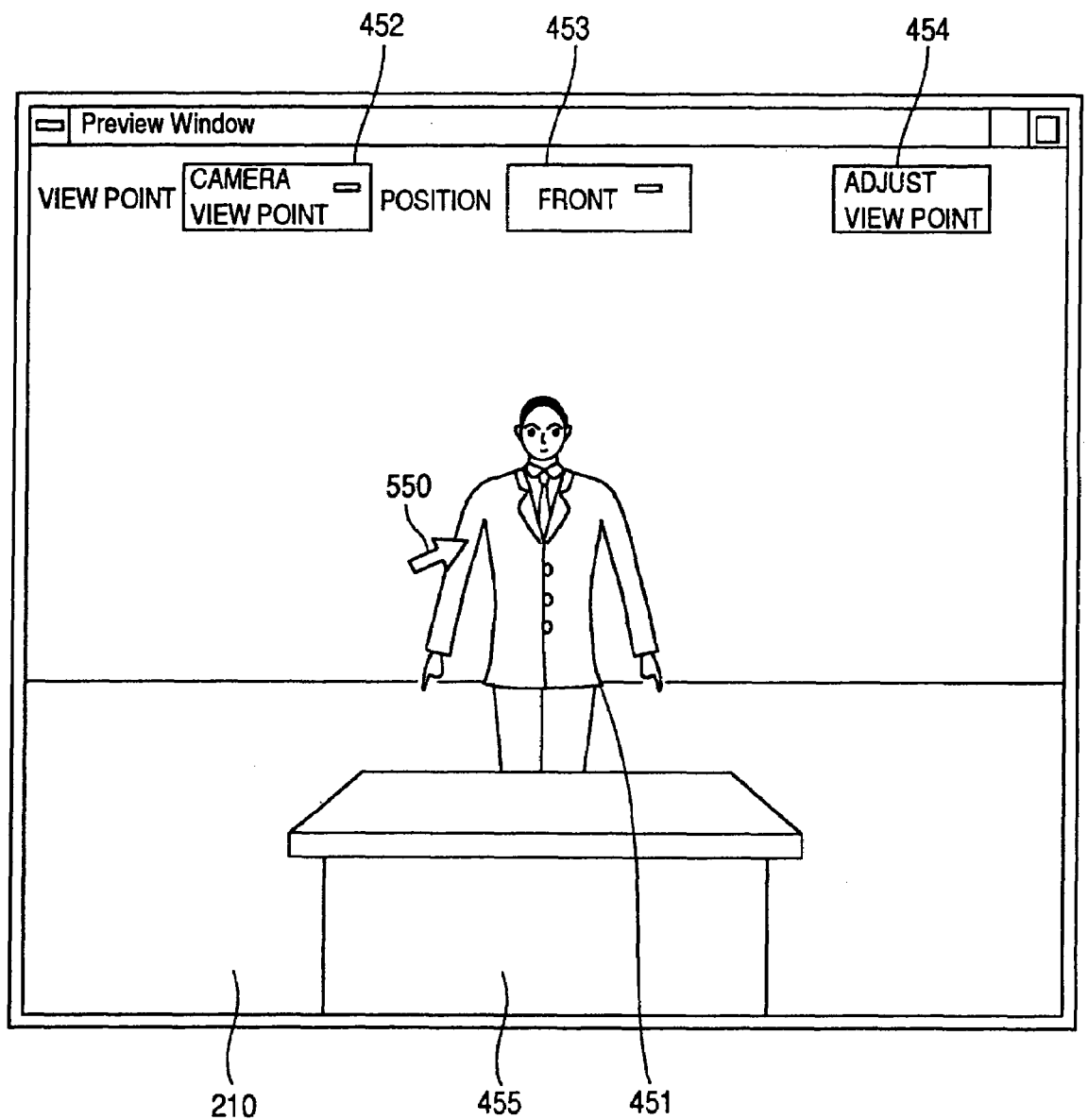
FIG. 22 is an enlarged view of the monitor window.

FIG. 22 is an enlarged view of the monitor window 210. The same component elements having the same functions as those described above are designated by the same reference numerals, respectively. In addition, numeral 451 designates a CG object, numeral 452 a view point option menu (hereinafter called the view point menu), numeral 453 an option menu for the position of the user view point (hereinafter called the position menu), and numeral 454 a user view point adjust button. Although FIG. 22 shows a case in which only one character is arranged, a plurality of characters may be involved, and the CG objects include, other than the character, such properties as a desk 455 and a sofa (not shown). The view point menu 452 is used for switching between the view point from the camera and the user view point set in advance by the creator. The user can switch five view points (for example, front, just above, right, left, upper right) by the position menu 453. Also, by selecting the view point adjust button 454, the user can freely set the view point.

In the case where it is desired to move the character 301 in the studio in x direction, the arrangement x text field 362 (FIG. 21) is clicked by mouse. The arrangement x value text field 362 is defined by a red frame indicating that the x coordinate value of the CG object can be changed. Under this condition, a numerical value is input to the arrangement x value text field 362 using the keyboard. The CG character is moved to the designated position and displayed on the monitor window 208.

When the arrangement x value text field 362 is defined by the red frame, the CG character can be moved within the CG studio by dragging the mouse pointer along x direction (horizontal direction in the screen) on the monitor window 210. In similar fashion, when the arrangement z value text field 364 is clicked by mouse, the arrangement z value text field 364 is defined by a red frame thereby making it possible to change the z coordinate of the CG object. In that state, the CG character can be moved within the CG studio by dragging the mouse pointer along z direction (vertical direction in the screen). The "drag" is defined as the operation of moving the mouse pointer while being depressed.

Figure 23:
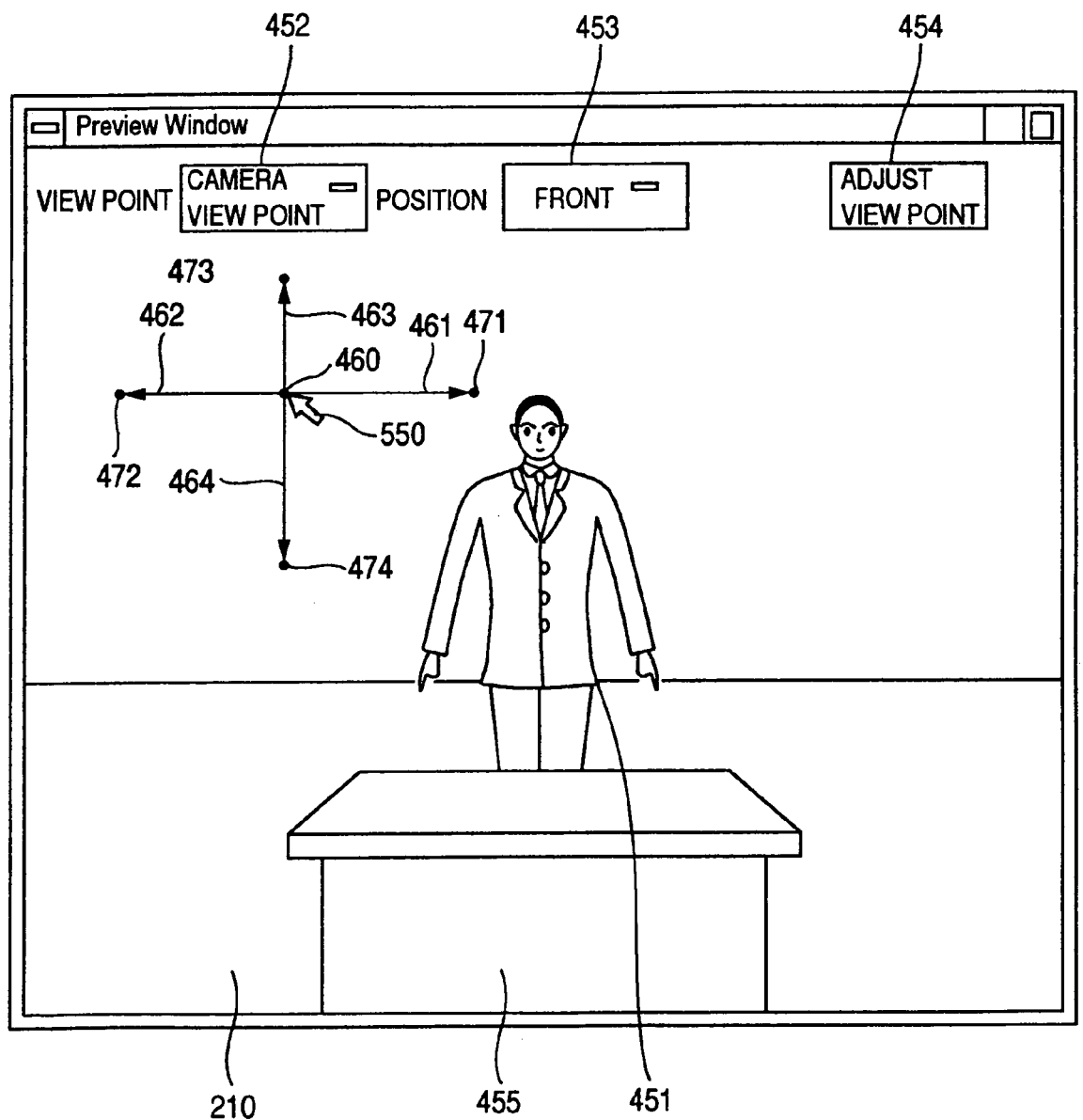
FIG. 23 is a diagram for explaining a CG character moved in accordance with the dragging of the pointer by the mouse.

FIG. 23 is a diagram for explaining the movement of the CG character with the dragging of the mouse pointer. In FIG. 23, the same component elements as those in FIG. 22 are designated by the same reference numerals, respectively, as in FIG. 22. In addition, numeral 550 designates a mouse pointer, numeral 460 a position where the mouse pointer 550 is originally located, numeral 461 a trajectory left when the mouse pointer 550 is dragged rightward, numeral 462 a trajectory left when the mouse pointer 550 is dragged leftward, numeral 463 a trajectory left when the mouse pointer 550 is dragged upward, numeral 464 a trajectory left when the mouse pointer 550 is dragged rightward, numeral 471 a position reached when the mouse pointer 550 is dragged rightward, numeral 472 a position reached after the mouse pointer 550 is dragged leftward, numeral 473 a position reached after the mouse pointer 550 is dragged upward, and numeral 474 a position reached after the mouse pointer 550 is dragged rightward.

When the arrangement x text field 362 of FIG. 22 is defined by a red frame, the mouse pointer 550 is in its first position 460 in FIG. 23.

Under this condition, assuming that the mouse pointer is dragged to the position 471 rightward as indicated by the trajectory 461, the CG character 451 moves rightward. The arrangement x value text field 362 is changed in accordance with the coverage. In similar fashion, when the mouse pointer is moved to the position 472 by dragging along the trajectory 462 leftward, the CG character 451 moves leftward, so that the value of the arrangement value x text field 362 is changed in accordance with the coverage.

When the arrangement z value text field 363 of FIG. 21 is selected and dragged to the position 473 upward as indicated by the trajectory 463, on the other hand, the CG character 451 moves into the depth, and the value of the arrangement z text field 363 is changed in accordance with the coverage. In similar manner, when the mouse is dragged to the position 474 downward as indicated by the trajectory 464, the CG character 451 is moved forward, so that the value of the arrangement z value text field 363 is changed in accordance with the coverage.

In the process, the coverage of the CG character is proportional to the amount by which the mouse pointer is dragged (trajectory 461). However, the coverage of the CG character is not equal to the amount by which the mouse is dragged. In the case where the mouse pointer 550 first located at the right eye of the CG character 451 is dragged to move the character, it is difficult to move the right eye of the CG character 451 on the position to which the mouse pointer 550 is moved.

It is therefore difficult to move the CG character accurately to the target position by use of the mouse.

In the example described above with reference to FIG. 23, there is only one CG character existing in the CG studio. In the case where there are two or more CG characters, however, the desired character board is selected out of a plurality of character boards 308 in the studio set-up window 351, and the arrangement x value text field 362 or the arrangement z value text field 363 is selected, after which the mouse pointer 550 is dragged.

The other objects such as the properties are all moved by a similar operation.

As the result of the aforementioned operation on the edit screen, a script for reproducing a TV program is automatically described in accordance with the same operation and setting. The script automatically produced this way is input to the TV program reproduction unit thereby to reproduce the TV program.

In the manner described above, the arrangement of the CG object can be changed.

According to the aforementioned method of inputting the numerical value directly, however, it is difficult to accurately grasp the position of the CG object after movement.

Also, in the case where the CG object is moved by dragging the mouse on the monitor window 210, the intuitive manipulation of the CG object is impossible in view of the fact that the mouse pointer and the CG object fail to cover exactly the same distance and move direction on the screen each other.

In any case, the operation is required to display the studio set-up window 351 and click the arrangement x value text field 362, the arrangement z value text field 363 or the direction d text field 364 in the studio set-up window 351, thereby complicating the edit work.

According to the embodiment of the invention described below, the aforementioned disadvantage is obviated, and the CG object follows and moves to the position of the mouse pointer. In this embodiment, the CG object can be arranged intuitively, and an image data editing method executed by a simple operation is provided.

In order to achieve the object described above, an image editing method according to an embodiment of the invention is such that the position coordinate of the CG object is transformed to the coordinate system on the screen of the monitor window, so that the position of the mouse pointer and the position of the CG object are set in the same coordinate system, and by comparing the position of the CG object with that of the mouse pointer in the common coordinate system, thereby determining whether the object has been designated by the mouse pointer or not.

Further, according to an embodiment of the invention, the coordinate of the mouse pointer is transformed to the same coordinate system as the CG object, and by moving the CG object to the transformed coordinate position of the mouse pointer, the selected CG object is moved following the mouse pointer.

According to this invention, the mouse pointer 550 is located within the area of the CG object 451 displayed on the monitor window 210 as shown in FIG. 22, and the CG object 451 is moved by being dragged by the mouse pointer 550.

An embodiment of the invention will be described below.

According to this embodiment of the invention, the entire operation of moving the CG object is performed on the monitor window.

Figure 24:
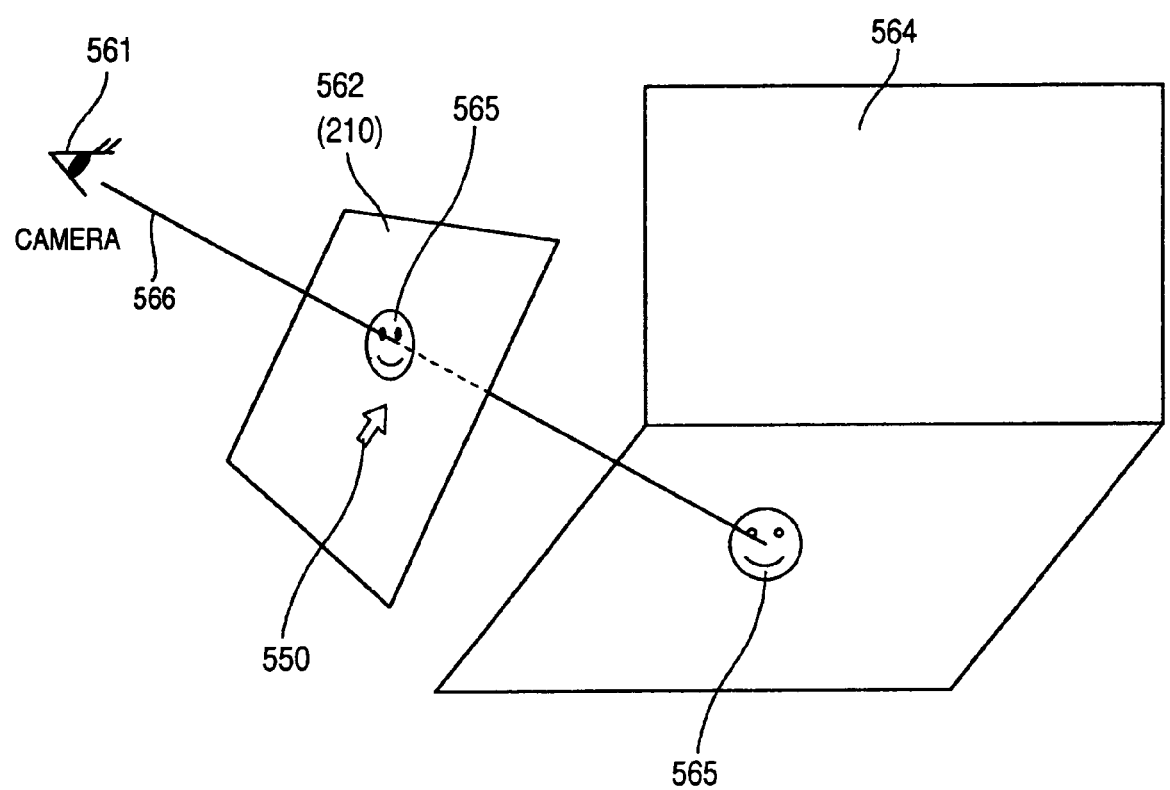
FIG. 24 shows an example of relative positions of the coordinates of the camera, the CG object and the mouse pointer in an editing method according to the invention.

First, the selection of a CG object with the mouse clicked in the monitor window 210 according to an embodiment will be explained with reference to FIGS. 24 and 25. FIG. 24 is a diagram showing relative positions of the coordinate systems of the camera, the CG object and the mouse pointer according to an embodiment of the invention. Numeral 561 designates a view point (camera), numeral 562 a coordinate plane of the monitor window, numeral 550 a mouse pointer on the coordinate plane of the monitor window, numeral 564 a CG studio, numeral 565 a CG object on the studio coordinate, numeral 565' a projection CG object projected on the coordinate plane 502 of the monitor window, numeral 566 a line of sight connecting the camera view point 561 and the object 565.

In FIG. 24, the monitor window 562 is set between the camera 561 and the CG object 565 in the CG studio 564.

The image of the CG object 565 formed on the light receiving surface of the camera is similar to the projection CG object 565' projected on the virtual projection plane (the coordinate plane of the monitor window 565) 562 perpendicular to the optical axis (line of sight) 566 connecting the camera 561 and an arbitrary point of the CG object 565.

The monitor window 562 corresponds to the display screen of the monitor window 210. The mouse pointer 550 is located in the monitor window 562.

Figure 25:
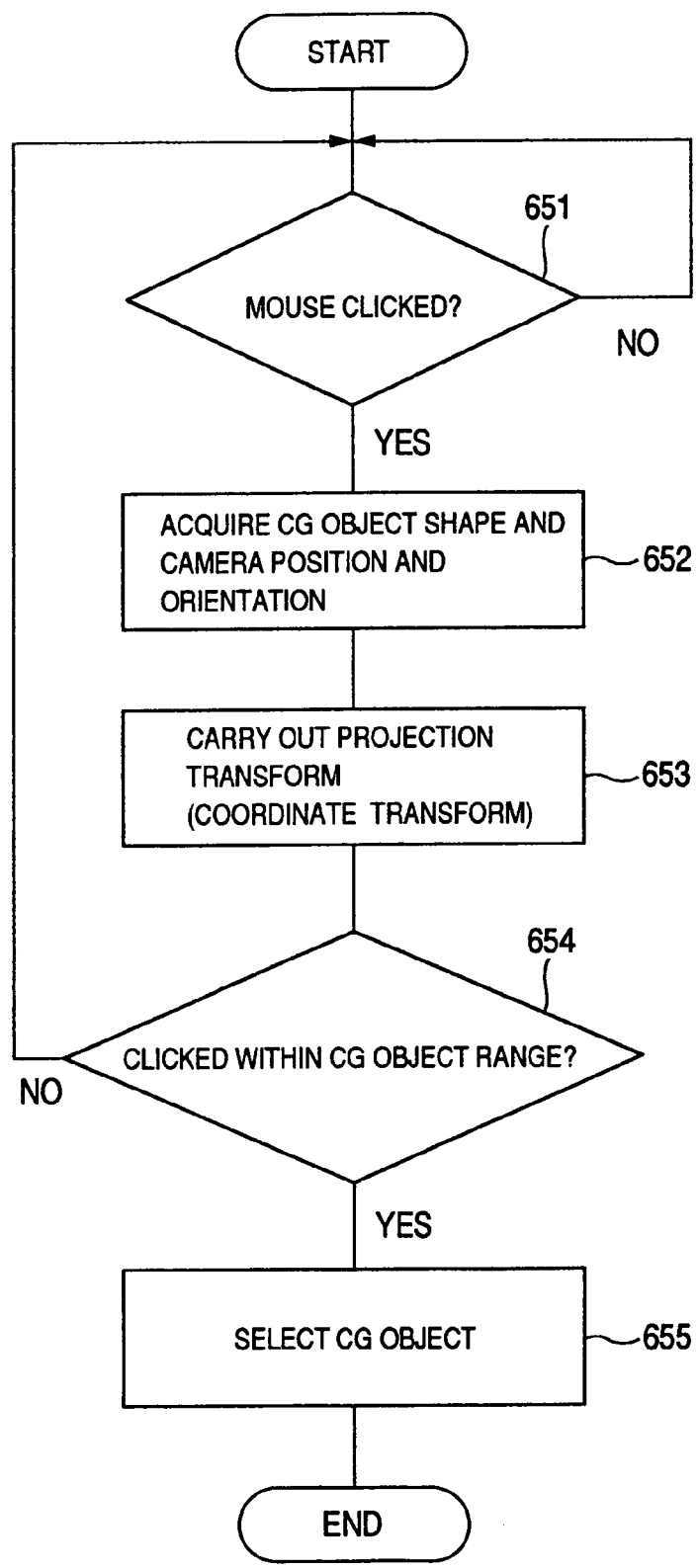
FIG. 25 is a flowchart showing the process for determining a projection coordinate of a CG object in an editing method according to an embodiment of the invention.

FIG. 25 is a flowchart for explaining a method of determining whether the mouse pointer 550 has selected the CG object 565' in the case where an arbitrary point in the monitor window 210 (562 in FIG. 24) is clicked by the mouse pointer 550 (at which the mouse button is depressed).

In step 651, it is determined whether the mouse button has been clicked or not on the monitor window 562. In the case where the mouse button is clicked, the process proceeds to step 652. If the mouse button is not clicked, the standby state is continued until the mouse button is clicked. In step 652, the position coordinate, direction, shape and other setting information of the CG object 565 located in the CG studio 564 and the position coordinate and direction of the camera 561 are read from the memory 102 (FIG. 5). Then, the process proceeds to step 653.

In step 653, the projection transform is carried out. In the projection transform, the position coordinate is determined on the coordinate plane 562 of the projection CG object 565' produced by projecting the CG object 565' in the CG studio 564 on the coordinate plane 562 of the monitor window. For example, an intersection is determined between the straight line (assumed to be the line of sight 506) extending from the camera 501 to a given point in the CG studio 504 and the coordinate plane 562 of the monitor window constituting a projection plane. This process is performed for each point on the CG object 565. The projection transform of the CG object will be explained in detail later with reference to FIGS. 27 to 29.

In step 654, the coordinate of the CG object 555' projected on the monitor window coordinate plane 562 is compared with the coordinate of the mouse pointer 553. In the case where the mouse pointer 550 is located in the coordinate of the CG object 565', the process proceeds to step 655, and otherwise, the process is returned to step 651. In the case where the answer in step 654 is YES, it is determined in step 655 that the particular CG object has been selected by the mouse pointer.

Figure 26:
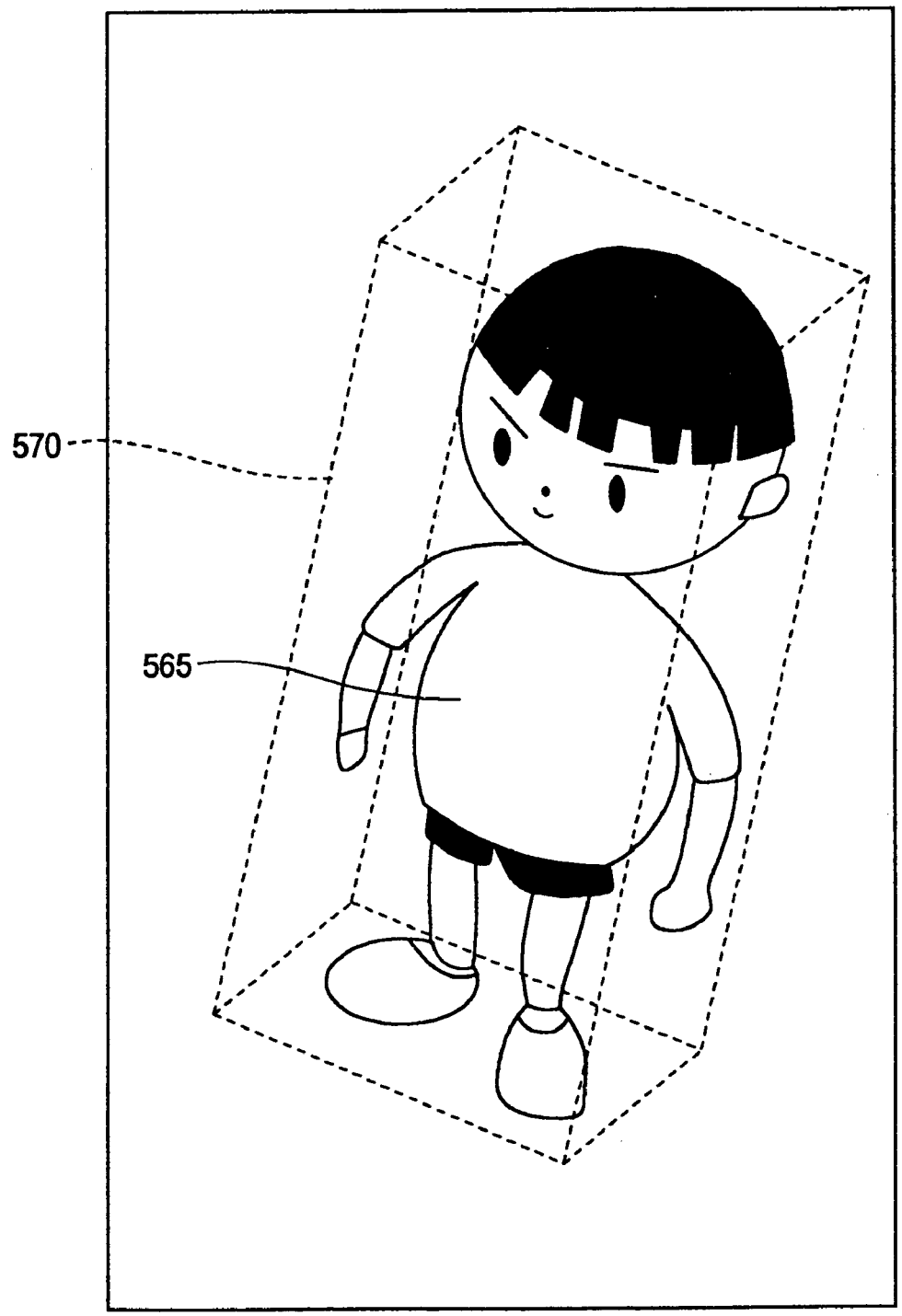
FIG. 26 is a diagram for explaining a method for determining the area of a CG object.
Figure 27:
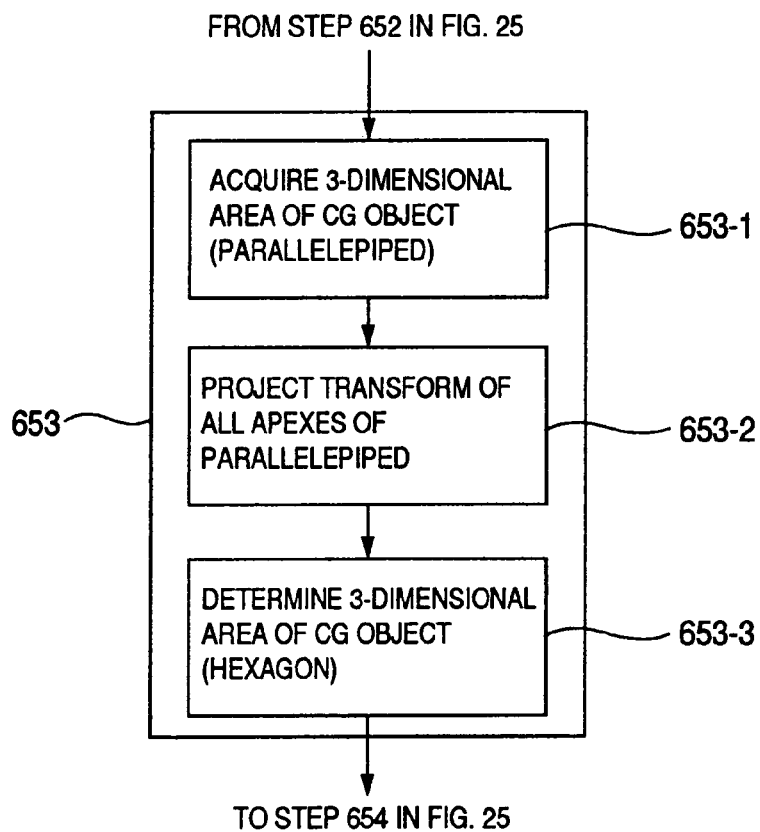
FIG. 27 is a detailed flowchart of the projection transform process.
Figure 28:
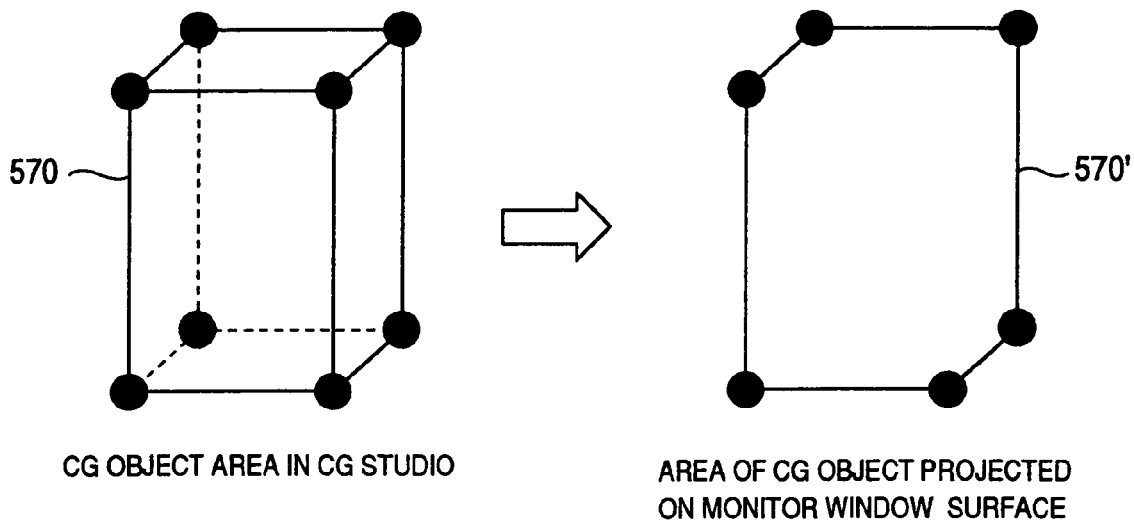
FIG. 28 is a diagram for explaining a method of transforming the coordinate of the area of a CG object in the CG studio into a two-dimensional coordinate on the projection surface.

FIG. 26 shows the CG object 565 located on the CG studio 564. FIG. 27 is a diagram for explaining in more detail the process of projection transform in step 653 in the flowchart of FIG. 25. The CG object located in the studio has a three-dimensional area. The area of the object, as shown in FIG. 26, is defined as a rectangular parallelepiped 570 surrounding the CG object 565. In step 653-1, the area of the parallelepiped 570 is determined. In step 653-2, the parallelepiped 570 on the CG studio coordinate is projected on the coordinate plane 562 of the monitor window. FIG. 28 is a diagram showing the state in which the parallelepiped 570 on the CG studio coordinate is projected on the coordinate plane 562 of the monitor window and becomes a two-dimensional shape 570'. The projected object 570' is located in the two-dimensional shape 570'. In step 653-3, the area of the CG object 565 on the coordinate plane 562 of the monitor window is determined by calculating the coordinate value of the two-dimensional shape 570' on the projection plane 562. In step 654, the coordinate of the mouse pointer 550 is compared with the two-dimensional area 570' of the CG object 565' determined in step 653-3. In the case where the coordinate value of the mouse pointer 550 is located within the area 570' of the CG object, it is determined that the CG object 565 has been selected.

Now, a method of the projection transform in step 653-2 of the flowchart of FIG. 27 will be explained with reference to FIGS. 29 to 32.

Figure 29:
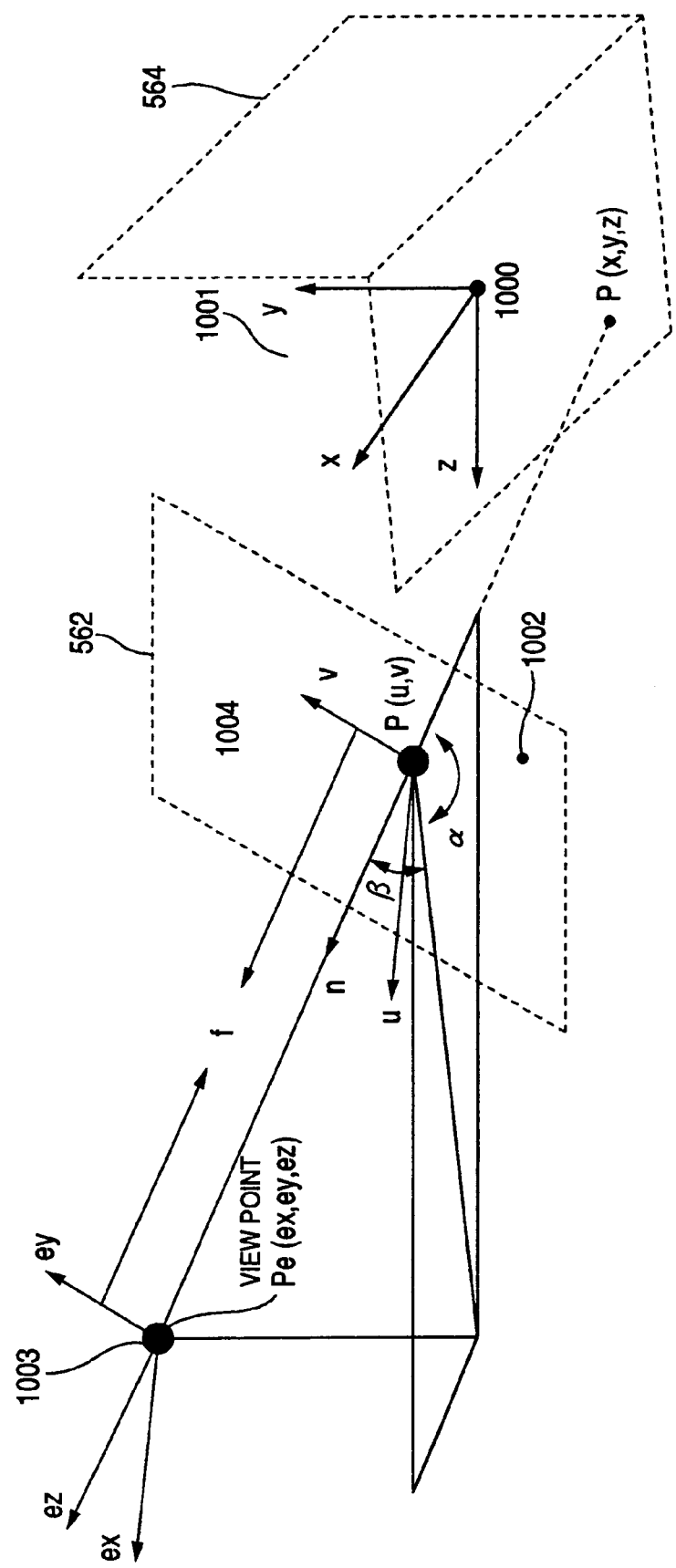
FIG. 29 is a diagram for explaining an example of the relation between the coordinate axes of the world coordinate system, the uvn coordinate system and the view point coordinate system in an editing method according to the invention.

FIG. 29 is a diagram showing the relation between the world coordinate (CG studio coordinate) system, the uvn coordinate system for setting the projection plane 562 and the coordinate system of the view point 561. Numeral 1001 designates the coordinate axis of the world coordinate system, numeral 1000 the origin of the coordinate axis of the world coordinate system, numeral 1002 the origin of the coordinate axis of the uvn coordinate system, numeral 1003 the origin of the coordinate system of the view point coordinate system, and numeral 1004 the apparent distance between the origin 1002 of the coordinate axis of the uvn coordinate system and the origin 1003 of the coordinate axis of the view point coordinate.

The coordinate transform using the projection method requires the three coordinate systems including the world coordinate system 1001, the uvn coordinate system and the view point coordinate system. The world coordinate system 1001 is set with the xz plane horizontal and the y axis normal to the xz plane. The uvn coordinate system is used for defining the view window, and the plane containing the orthogonal u and v axes constitutes the projection plane 562. The view point coordinate system has the origin at the position of the view point 561 (the camera, in this case) which is set in such a manner that the ez axis coincides with the direction of the visual line (the direction in which the view point is oriented) on the one hand and the ey axis and the ex axis are parallel to the v axis and the u axis, respectively, of the uvn coordinate system. Also, this point is set on the visual line a predetermined distance away from the origin view point of the uvn coordinate system. This distance f is the apparent distance 1004. The f value is determined based on the zoom rate of the camera.

Figure 30:
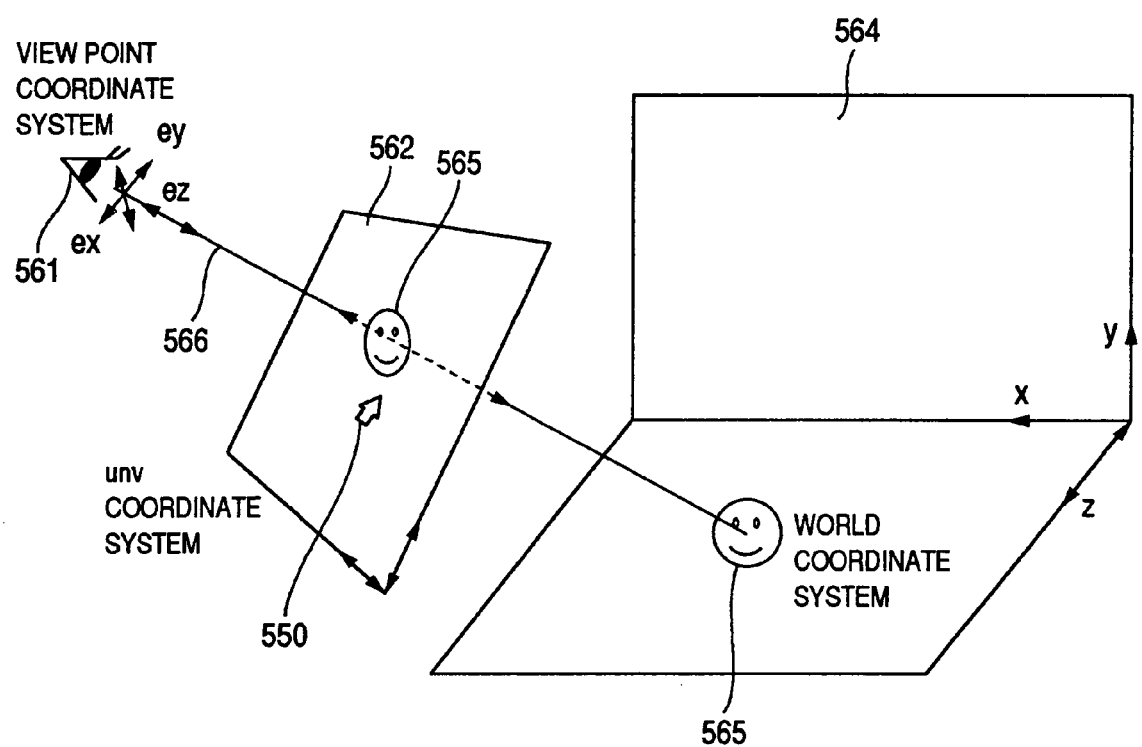
FIG. 30 is a diagram for explaining the coordinate systems of an editing method according to an embodiment of the invention.

To facilitate the understanding of this relation, the coordinate relation of the arrangement in FIG. 24 is shown in FIG. 30. The world coordinate system represents the coordinate in the CG studio 564, in which the x direction indicates the lateral direction as viewed from the front of the CG studio 564, the z direction indicates the depth and the y direction the height. The uvn coordinate system represents the coordinate of the coordinate plane 562 (210) of the monitor window, in which the lateral direction represents the u direction, the vertical direction the v direction and the direction of the visual line 506 the n direction. Further, the coordinate system as viewed from the camera 561 is the view point coordinate system, in which the direction of the line of sight is the ez direction, the lateral direction is the ex direction and the vertical direction the ey direction.

The projection transform process is performed in such a manner that the view point coordinate system is superposed on the world coordinate system 1001 and moved in parallel while moving the origin to the view point (xe, ye, ze). The view point coordinate system is then rotated by the azimuth angle a about the x axis of the view point coordinate system and further rotated about the y axis by the angle of elevation β. This is equivalent to the camera position (view point) being in the world coordinate system. It is assumed that an arbitrary point P in the studio is defined by the world coordinate system 1001, and the coordinate is expressed as (x, y, z). If the same point P is expressed as P(x1, y1, z1) in the view point coordinate system 1003, the following relation is held, where Tα is the rotational matrix with the view point coordinate rotated by α°, and Tβ the rotational matrix with the view point coordinate rotated by β°.

$$T\alpha = \begin{bmatrix} \cos\alpha & \sin\alpha & 0 \\ -\sin\alpha & \cos\alpha & 0 \\ 0 & 0 & 1 \end{bmatrix} \quad (1)$$

$$T\beta = \begin{bmatrix} \cos\beta & 0 & -\sin\beta \\ 0 & 1 & 0 \\ \sin\beta & 0 & \cos\beta \end{bmatrix} \quad (2)$$

$$\begin{bmatrix} x_1 \\ y_1 \\ z_1 \end{bmatrix} = T\beta T\alpha \begin{bmatrix} x - x_e \\ y - y_e \\ z - z_e \end{bmatrix} \quad (3)$$

By transformation of equation (3), the point P(x, y, z) in the world coordinate system 1001 can be nansformed to the view point coordinate system.

Next, the process for transforming a point in the view point coordinate system to the uvn coordinate system is performed. A screen normal to the ex axis in the view point coordinate system is located at a position of the distance f. A point P'(u, v) on. the projection plane corresponding to the point P is determined from the following equation.

$$u = -f(y_1/x_1) \quad (4)$$

$$= -f(z_1/x_1) \quad (5)$$

Figure 31:
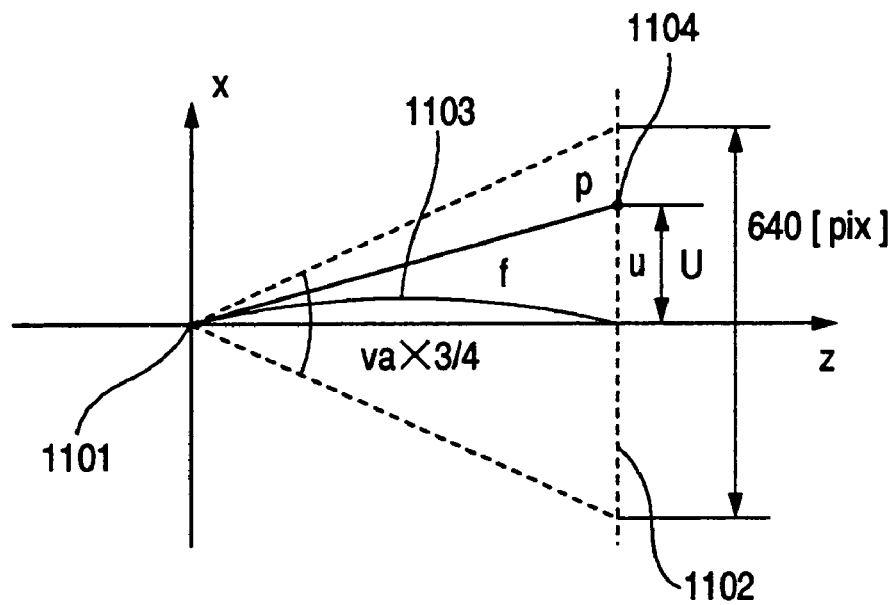
FIG. 31 is a diagram showing the relation between the view point and the projection surface in the zx plane to transform to the projection coordinate.
Figure 32:
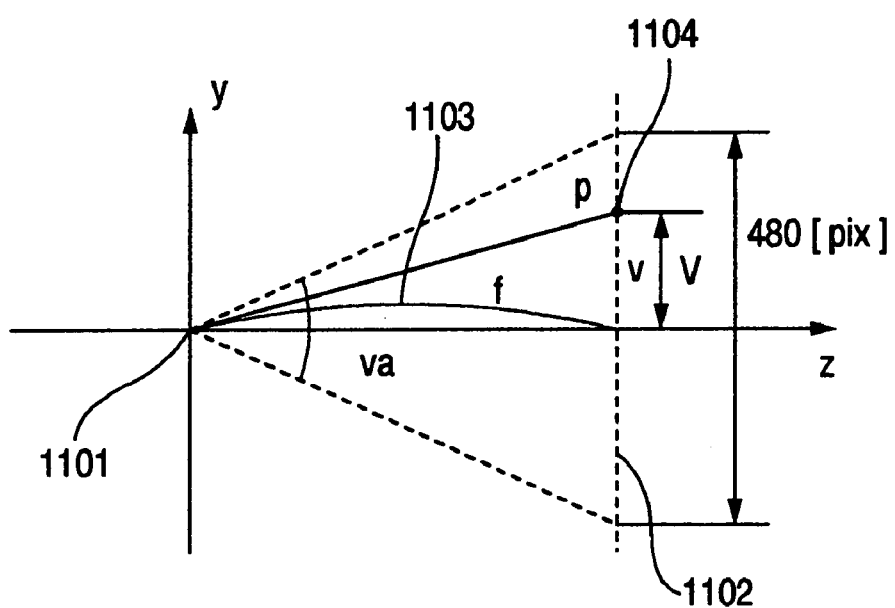
FIG. 32 is a diagram showing the relation between the view point and the projection surface in the yz plane to transform to the projection coordinate.

The projection coordinate (uvn coordinate system) determined from equations (4) and (5) is expressed in m. For acquiring data that can be displayed as an image on the monitor window, the unit is required to be transformed from m to pix indicating the number of pixels. Assume that the monitor window 210 is expressed as 640 pix×480 pix. Also, assume that the vertical screen angle is va, and the value of the point P expressed as the number of pixels is (U, V). The relation as shown in FIGS. 31 and 32 holds. FIG. 31 is a sectional view based on the xy plane representing the relation between the view point in the view point coordinate system and the projection plane. Numeral 1101 designates a position of the view point (camera), numeral 1102 a projection plane, numeral 1103 an apparent distance and numeral 1104 a point to be transformed. FIG. 32 is a sectional view based on the yz plane representing the relation between the view point in the view point coordinate system and the projection plane, where va is the vertical screen angle expressed in degree (°) (=π/180 rad). The horizontal screen angle, which cannot be read from the memory 102, is calculated from the vertical screen angle. In view of the fact the aspect ratio of the monitor window 210 is 4:3, the horizontal screen angle is given as va×4/3. From the relation given in FIGS. 31 and 32, the range of the CG studio displayed on the monitor window 210 is calculated. The distance from the center of the monitor window 208 to the right end of the CG studio displayed on the monitor window 208 is expressed as X, and the distance from the center of the monitor window 208 to the lower end of the CG studio is given as Y. Then, X and Y can be determined from the following equations.

$$X = f \tan\left(\frac{va}{2} \times \frac{4}{3}\right) \quad (6)$$

$$Y = f \tan\left(\frac{va}{2}\right) \quad (7)$$

Also, the following relation is obtained from FIGS. 31 and 32.

$$\frac{640}{2} : X = U : n \tag{8}$$

$$\frac{480}{2} : Y = V : v \tag{9}$$

Equation (6) is substituted into equation (8), and equation (7) into equation (9) to obtain the following equations.

$$U = \frac{320 \times u}{f \tan\left(\frac{va}{2} \times \frac{4}{3}\right)} \tag{10}$$

$$V = \frac{240 \times v}{f \tan\left(\frac{va}{2}\right)} \tag{11}$$

The values obtained from equations (10) and (11) are associated with the distance from the center of the coordinate plane 562 (210) of the monitor window. The transform operation is performed to move the points U, V to the point at the upper left corner making up the origin of the coordinate plane 562 of the monitor window. The transform is based on the following calculation.

$$U = \frac{320 \times u}{f \tan\left(\frac{va}{2} \times \frac{4}{3}\right)} + 320 \tag{12}$$

$$V = \frac{240 \times v}{f \tan\left(\frac{va}{2}\right)} + 240 \tag{13}$$

The foregoing calculation permits a point in the world coordinate system 1001 to be transformed to the projection coordinate system 1004 (uvn coordinate system).

Figure 33:
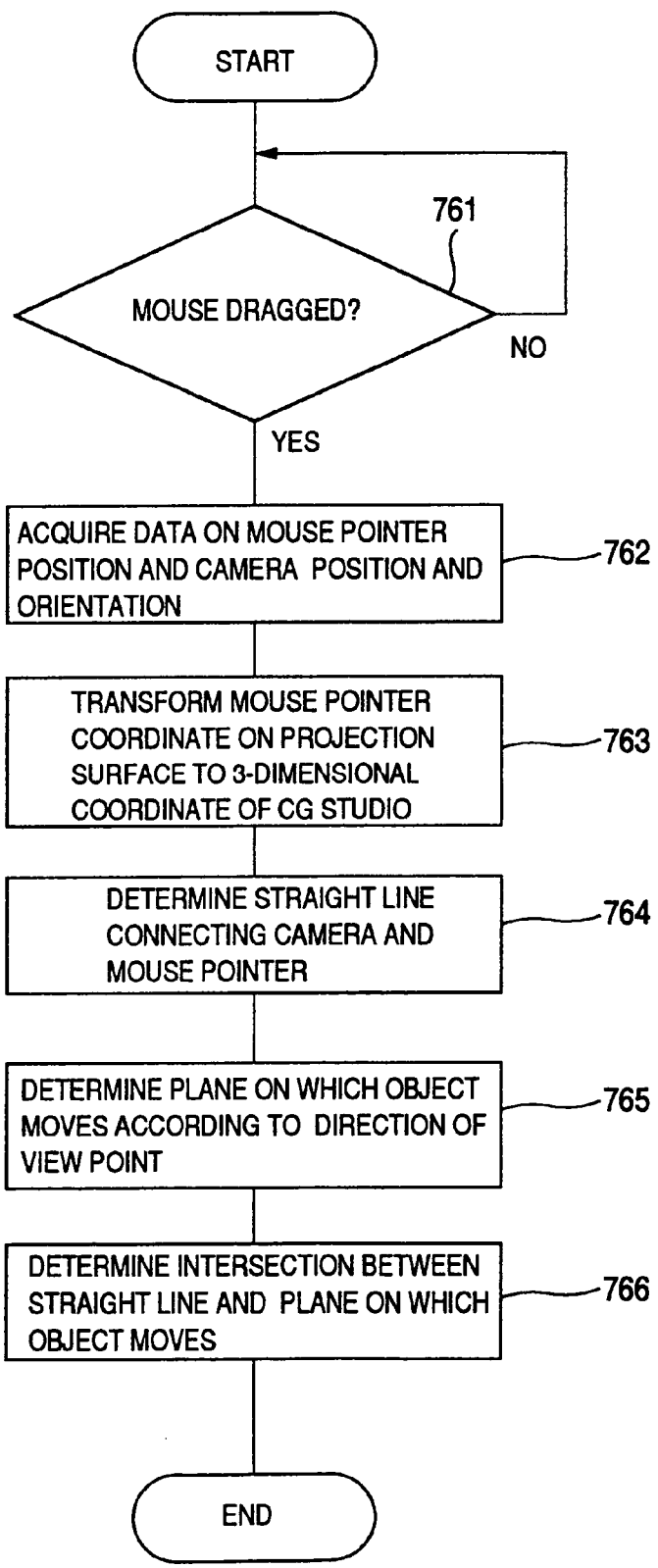
FIG. 33 is a flowchart showing an example of the process for determining the 3D coordinate of a CG object in an editing method according to the invention.
Figure 34:
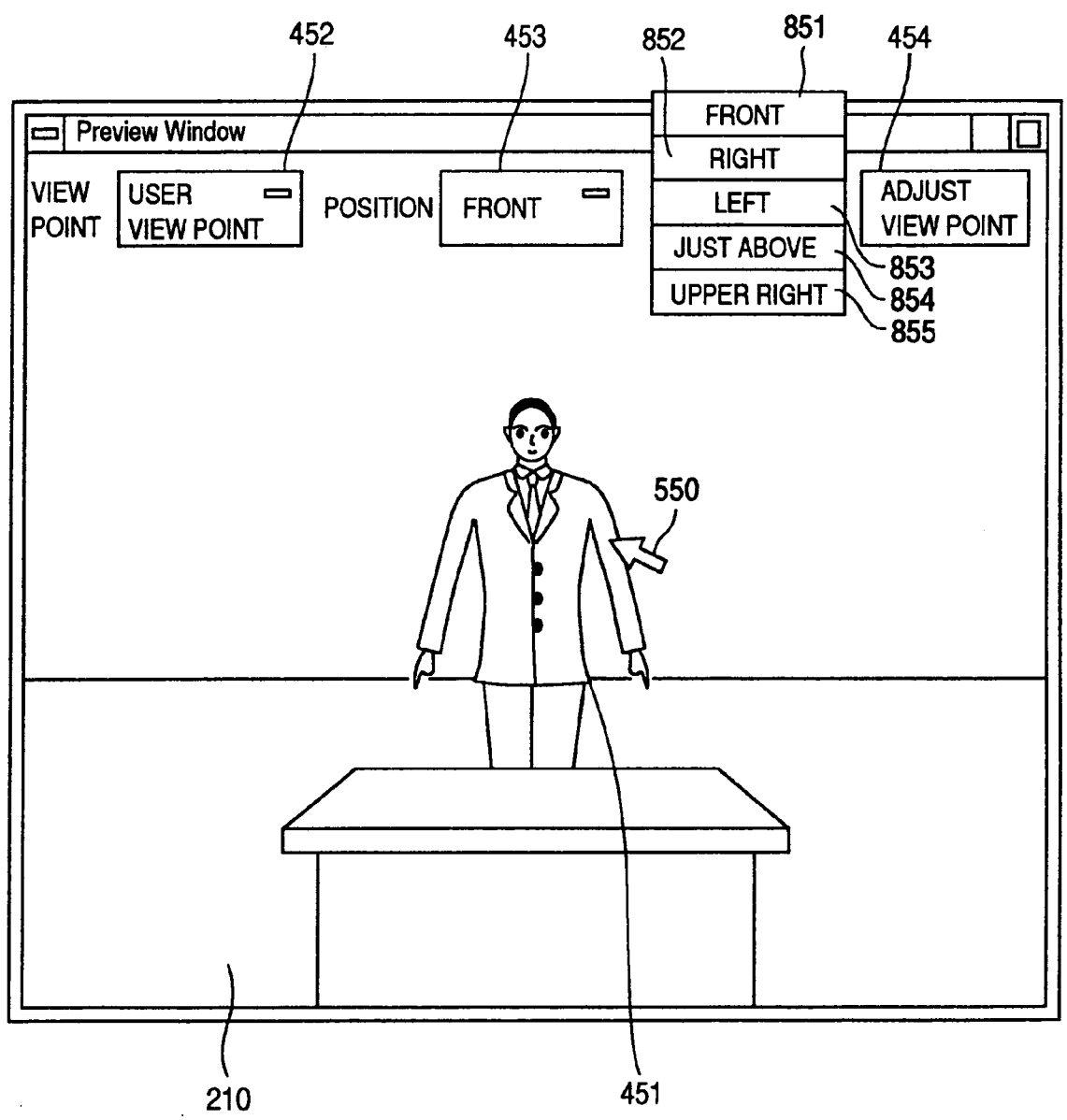
FIG. 34 is a diagram showing an example of an image of a monitor window for determining the plane on which a CG object is moved by switching the view point in an editing method according to the invention.

Now, a method of moving the CG object selected in step 655 of FIG. 25 within the studio 564 by dragging the mouse pointer 550 according to an embodiment of the invention will be described with reference to FIGS. 24, 33 and 34. FIG. 33 is a flowchart far explaining the method of moving the selected CG object 451 to a designated place. FIG. 34 is a diagram showing the image of the monitor window 210 at the time of determining the plane on which the CG object moves as the result of switching the view point according to the invention. The same component elements as the corresponding ones are designated with the same reference numerals, respectively, as those of the prior art described above. Numeral 851 designates a menu for setting the camera position to "front", numeral 852 a menu for setting the camera position to "right", numeral 853 a menu for setting the camera position to "left", numeral 854 a menu for setting the camera position to "just above", and numeral 855 a menu for setting the camera position to "upper right".

In FIG. 33, in the case where it is determined in step 761 that the mouse has been dragged, the process proceeds to step 762. Unless the mouse is dragged, on the other hand, the standby state is continued until it is dragged. In step 762, the coordinate of the mouse pointer 550 on the monitor window 210 is acquired. The coordinate value thus acquired is the value on the projection plane 562. At the same time, the information on the coordinate and direction of the camera 501 on the world coordinate system 1001 are acquired from the information memory 102. In step 763, the coordinate of the mouse pointer 550 acquired in step 762 is transformed from the coordinate (two dimensions) on the projection plane 562 to the coordinate (three dimensions) of the world coordinate system 1001, and the process proceeds to step 764.

Then, in step 764, the equation is determined for the straight line connecting the camera 561 and the mouse pointer 550, followed by proceeding to step 765. In step 765, the plane on which the CG object 451 is moved in accordance with the movement of the mouse pointer 550 is determined, followed by proceeding to step 766. In step 766, based on the plane on which the mouse pointer moves determined as above, the inter-section between the straight line determined in step 764 and the plane on which the project 451 is to move. The intersection thus calculated is determined to be the position of the CG object 451 in the studio.

The straight line connecting the coordinate (m2x, m2y, m2z) of the mouse pointer 550 and the view point (ex, ey, ez) in the world coordinate system calculated in step 762 is given by the following equation.

$$\frac{x - e_x}{m_{2x} - e_x} = \frac{y - e_y}{m_{2y} - e_y} = \frac{z - e_z}{m_{2z} - e_z} \tag{14}$$

where (x, y, z) is the coordinate of the CC character 451. Equation (15) below is used to express the zx plane (view point from ceiling) on which the CG character 451 is dragged by the mouse pointer 550.

$$y = 0 \tag{15}$$

Substituting equation (15) into equation (14), the following equations are obtained.

$$x = \frac{-e_y(m_{2x} - e_x)}{m_{2y} - e_y} + e_x \tag{16}$$

$$z = \frac{-e_y(m_{2x} - e_z)}{m_{2y} - e_y} + e_z \tag{17}$$

From equations (16) and (17) above, the intersection between the straight line and the plane is determined, and the coordinate (x, y, z) of the destination of the CG character 451 can be determined. In similar fashion, the equation of the plane for the view point from the front is given as z=0. and the equation of the plane for the view point from right is given as x=0. By substituting these equations into equation (14), the coordinate of the destination of the CG character is determIned.

The plane on which the CG object 505 moves is automatically determined by changing the view point in step 765. The view point is changed by switching the view point menu 452 (FIG. 22) in the monitor window 210 to the user view point. The user view point is defined as the one viewed from another camera provided for grasping the position of the CG object located in the CG studio regardless of the ongoing screen (the broad-cast image, for example) of a TV program. Five cameras are used as the user view point, and the user need not perform the operation of installing a camera simply for checking the arrangement. The view point can be changed for the position menu 453 in the case where the mouse button is clicked when the view point menu 452 is switched to the user view point.

Figure 35:
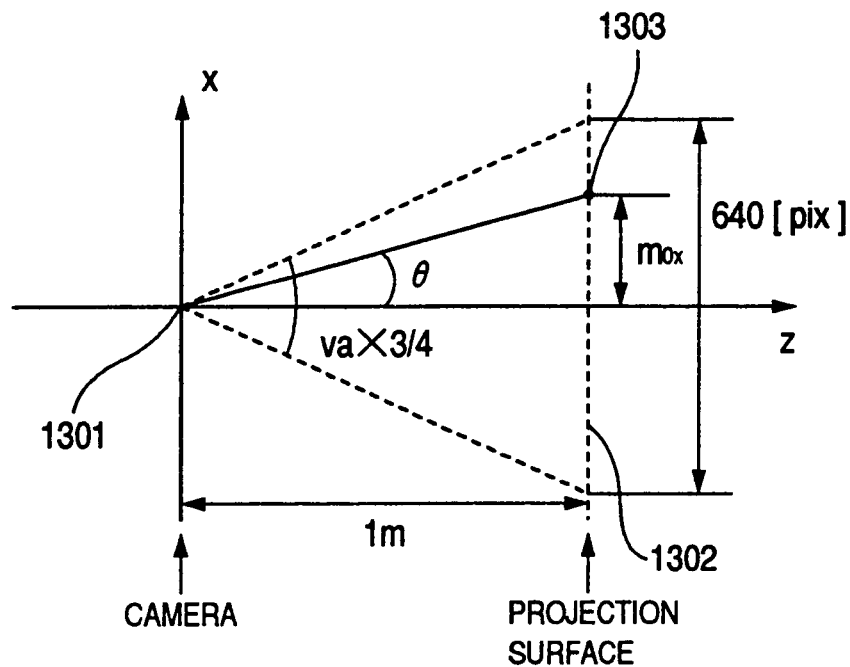
FIG. 35 shows a method of calculating the deviation angle of the mouse pointer from the direction of the line of sight in the zx plane.
Figure 36:
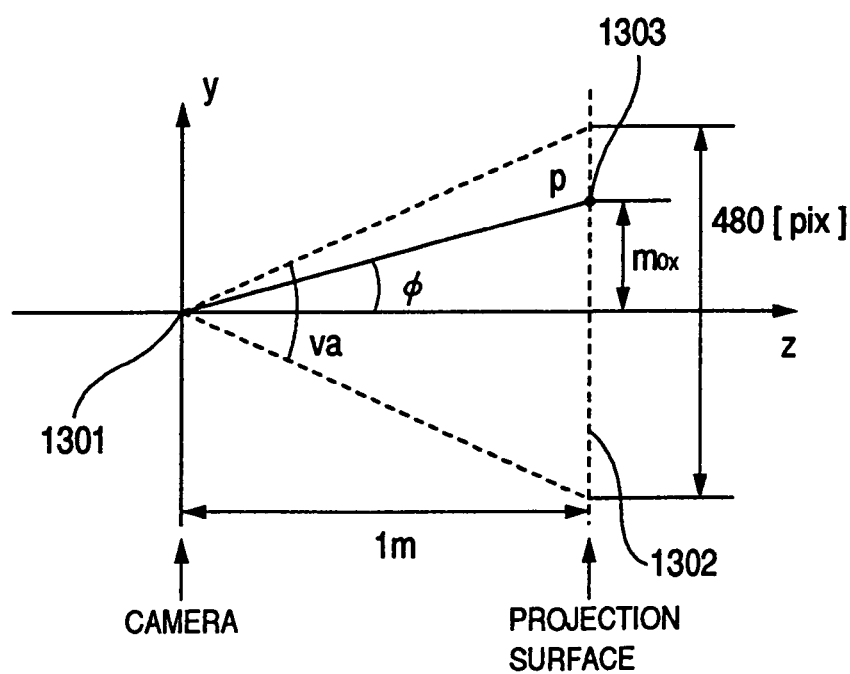
FIG. 36 shows a method of calculating the deviation angle of the mouse pointer from the direction of the line of sight in the yz plane.

The method of coordinate transform in step 763 according to an embodiment will be explained with reference to FIGS. 35 and 36. FIG. 35 is a sectional view based on the zx plane showing the method of calculating the deviation angle θ of the mouse pointer with respect to the line of sight. FIG. 36 is a sectional view based on the yz plane showing the method of calculating the deviation angle φ of the mouse pointer with respect to the line of sight. Numeral 1301 designates the position of the view point (camera), numeral 1302 the projection plane and numeral 1303 the position of the mouse pointer.

FIG. 35 is a sectional view similar to FIG. 31, based on the zx plane showing the relation between the view point, the monitor window and the mouse pointer. FIG. 36 is a sectional view based on the yz plane showing the relation between the view point, the monitor window and the mouse pointer. Numeral 1301 designates the view point (camera), numeral 1302 the projection plane and numeral 1303 the coordinate of the mouse pointer.

First, from the size of the projection plane and the coordinate of the mouse pointer, the deviation angles θ, φ with respect to the line of sight of the mouse pointer are calculated. In FIGS. 35 and 36, the line of sight is on the z axis. The mouse pointer 1303 is located on the projection plane 1302, and can be acquired from the memory 102 In the form of a 2D coordinate. By designating the point where the projection plane 1302 is located In the world coordinate system 1101, the coordinate of the mouse pointer 1303 in the world coordinate system 1101 is calculated. Considering the projection plane 1302 as virtual, the distance from the view point 1301 can be arbitrarily set. For example, the distance between the view point and the projection plane 102 Is set to 1 m. Assume that the coordinate of the mouse pointer on the projection plane 1302 is (mOx, mOy). The origin of the monitor window 210 is located at the upper left corner, while the origin of the projection plane 1302 is located at the center of the projection plane. Thus the origin is moved. The projection plane 1302 Is given as 640 pix ×480 pix. The coordinate of the origin of the projection plane 1302, therefore, is (320, 240). The coordinate (mOx', mOy') of the mouse pointer 550 on the projection plane 1302 is calculated from the followIng equations.

$$_{Ox}' = m_{Ox} - 320 \tag{18}$$

$$m_{Oy}' = m_{Oy} - 240 \tag{19}$$

From FIGS. 35 and 36, the following relation is obtained between θ and φ.

$$\frac{640}{2} : \frac{va}{2} \times \frac{4}{3} = m_{0x}' : \theta \tag{20}$$

$$\frac{480}{2} : \frac{va}{2} = m_{0y}' : \phi \tag{21}$$

where va is the vertical screen angle that Is the value which can be acquired from the memory 102. EquatIons (20) and (21) can be rewritten as follows, thereby making it possible to determine the deviation angles θ, φ of the position 1303 of the mouse pointer with respect to the line of sight.

$$\theta = \frac{va \times m_{0x}'}{240} \tag{22}$$

$$\phi = \frac{va \times m_{0y}'}{240} \tag{23}$$

The coordinate of the position 1303 of the mouse pointer in the view point coordinate system is calculated. The distance between the view point and the projection plane is 1 m. Therefore, the coordinate (m1x, m1y, m1z) of the mouse pointer in the viewpoint coordinate system can be determined from the following equations.

$$m_{1x} = \tan\theta \tag{24}$$

$$m_{1y} = \tan\phi \tag{25}$$

$$m_{1z} = 1 \tag{26}$$

Then, the view point coordinate system is transformed to the world coordinate system 1001. Assume that the coordinate of the position 1303 of the mouse pointer and the coordinate of the view point 1301 in the world coordinate system 1001 are (m2x, m2y, m2z) and (ex, ey, ez). respectively. the azimuth α and the angle of elevation β. Using the rotational matrix of equations (1) and (2), the following transform equation holds.

$$\begin{bmatrix} m_{2x} \\ m_{2y} \\ m_{2z} \end{bmatrix} = \begin{bmatrix} m_{1x} + e_x \\ m_{1y} + e_y \\ m_{1z} + e_z \end{bmatrix} T\beta T\alpha \tag{27}$$

From the foregoing calculation, the coordinate of the positIon 1303 of the mouse pointer in the world coordinate system 1001 can be calculated.

The menu item 851 in FIG. 34 is displayed by clicking the mouse button of the mouse pointer placed on the position menu 451, so that the CG studio 564 is switched to the view point from the front. Under this condition, the azimuth and elevation of the camera both 0° (0 red). The menu item 852 is used for switching the CG studio 564 to the view point from the right. The camera azimuth involved is 90° (π/2 rad) and the elevation is 0° (0 rad). The menu item 853 is for switching the CG studio 564 to the view point from the left. Under this condition, the camera azimuth is −90° (−π/2 rad) and the elevation is 0°. The menu item 854 is used for switching the CG studio 564 to the view point from the ceiling. The camera azimuth involved is 0° (0 rad) and the elevation is 90° (π/2 rad). The menu item 855 is used for switching the CG studio 564 to the view point from the upper right direction. The camera azimuth involved is 45° (π/4 rad) and the elevation is 30° (π/6 rad). The azimuth is the angle by which the camera is rotated about the y axis in the world coordinate system 1001, and increases when the camera is rotated in negative direction along the x axis assuming that the positive direction of z axis is 0° (0 rad). The elevation or the angle of elevation, on the other hand, is the angle by which the camera is rotated about the x axis of the world coordinate system 1001, and increases when the camera is rotated in negative direction along the y axis assuming that the positive direction of z axis is 0° (0 rad). The creator can freely set the position and the direction of the user view point by the view point adjust button 454. In the world coordinate system 1001, the plane on which the CG object 451 moves is automatically is the xy plane in the case where the menu item 851 is selected, i.e. when viewed from the front, the yz plane when the menu 852 or 853 is selected, i.e. when the studio 564 is viewed from the right and left, and the zx plane when the menu item 854 or 855 is selected, i.e. when the studio 564 is viewed from the ceiling or diagonally from above.

Figure 37:
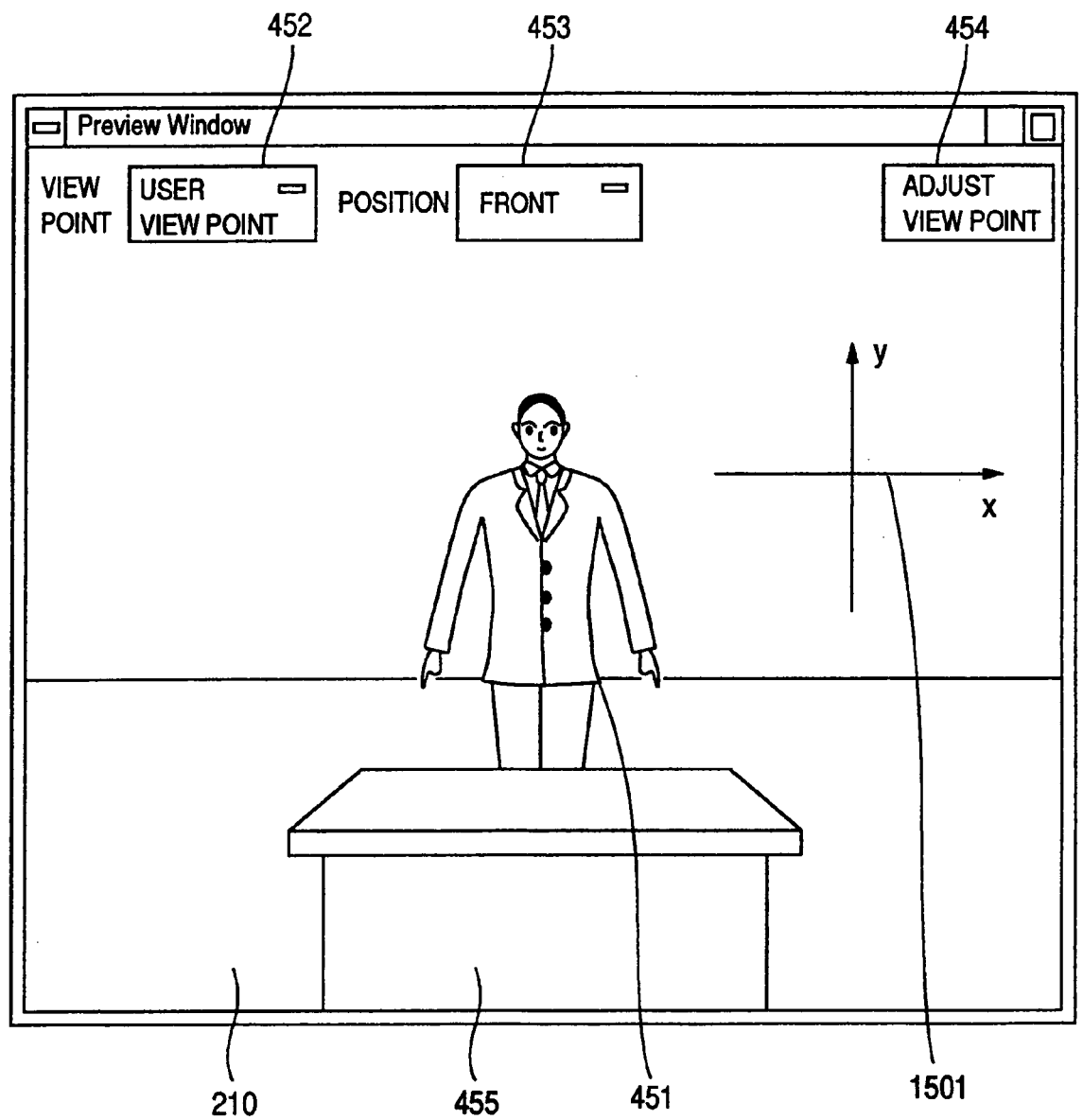
FIG. 37 is a diagram showing the direction in which the CG object moves as viewed by the user from the front side thereof.
Figure 38:
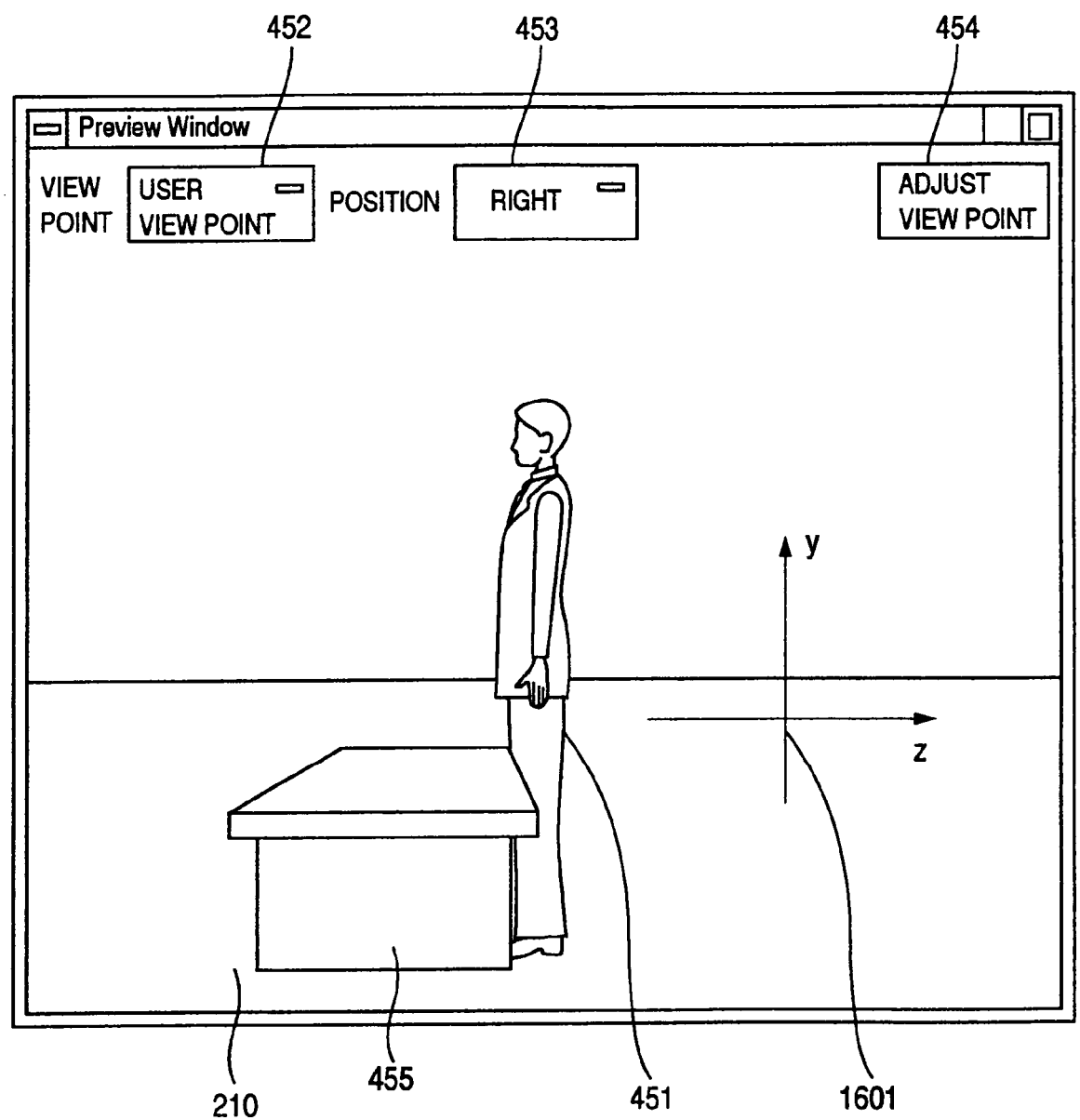
FIG. 38 is a diagram showing the direction in which the CG object moves as viewed by the user from the right side thereof.
Figure 39:
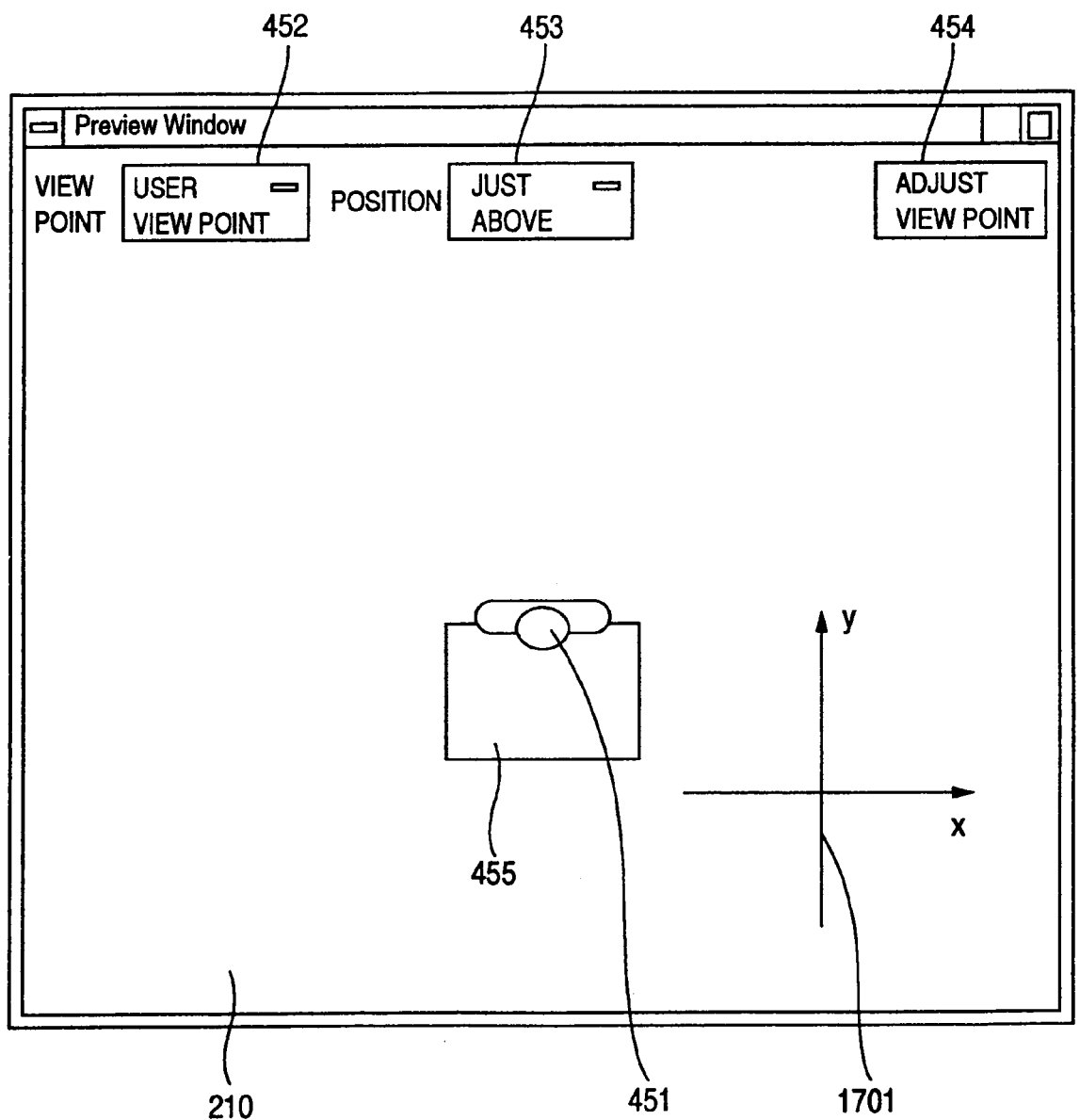
FIG. 39 is a diagram showing the direction in which the CG object moves as viewed by the user from the top thereof.

FIGS. 37 to 39 show the screens of the monitor window in the case where a point on the front, left and just above, respectively, are selected as the user view point. FIG. 37 is a diagram showing the direction in which the CG object 451 moves, as viewed by the user from the front; FIG. 38 is a diagram showing the direction in which the CG object 451 moves, as viewed by the user from the right; and FIG. 39 is a diagram showing the direction in which the CG object 451 moves, as viewed by the user from the ceiling. The same component elements as the corresponding ones described above are designated by the same reference numerals, respectively. Numeral 1501 designates an arrow indicating the movement of a CG object 451 on the xy plane on the screen as viewed from the front of the CG studio, and numeral 1601 designates an arrow indicating the movement of a CG object 451 on the yz plane on the screen as viewed from the right side of the CG studio. The object 451 is moved on the yz plane also in the screen as viewed from the left side of the CG studio. Numeral 1701 designates an arrow indicating the movement of the CG object in the z plane on the screen as viewed from the ceiling of the CG studio. The CG object moves on the zx plane also in the screen as viewed from upper right corner of the CG studio.

As described above, in step 766, the coordinate of the CG object 451 is determined by determining the intersection between the straight line connecting the camera 561 and the mouse pointer 550 and the plane determined in step 765. In this way, the direction in which the CG object 451 moves is automatically determined by switching the user view point, so that the CG object 451 can be freely arranged in the CG studio 564.

Figure 40:
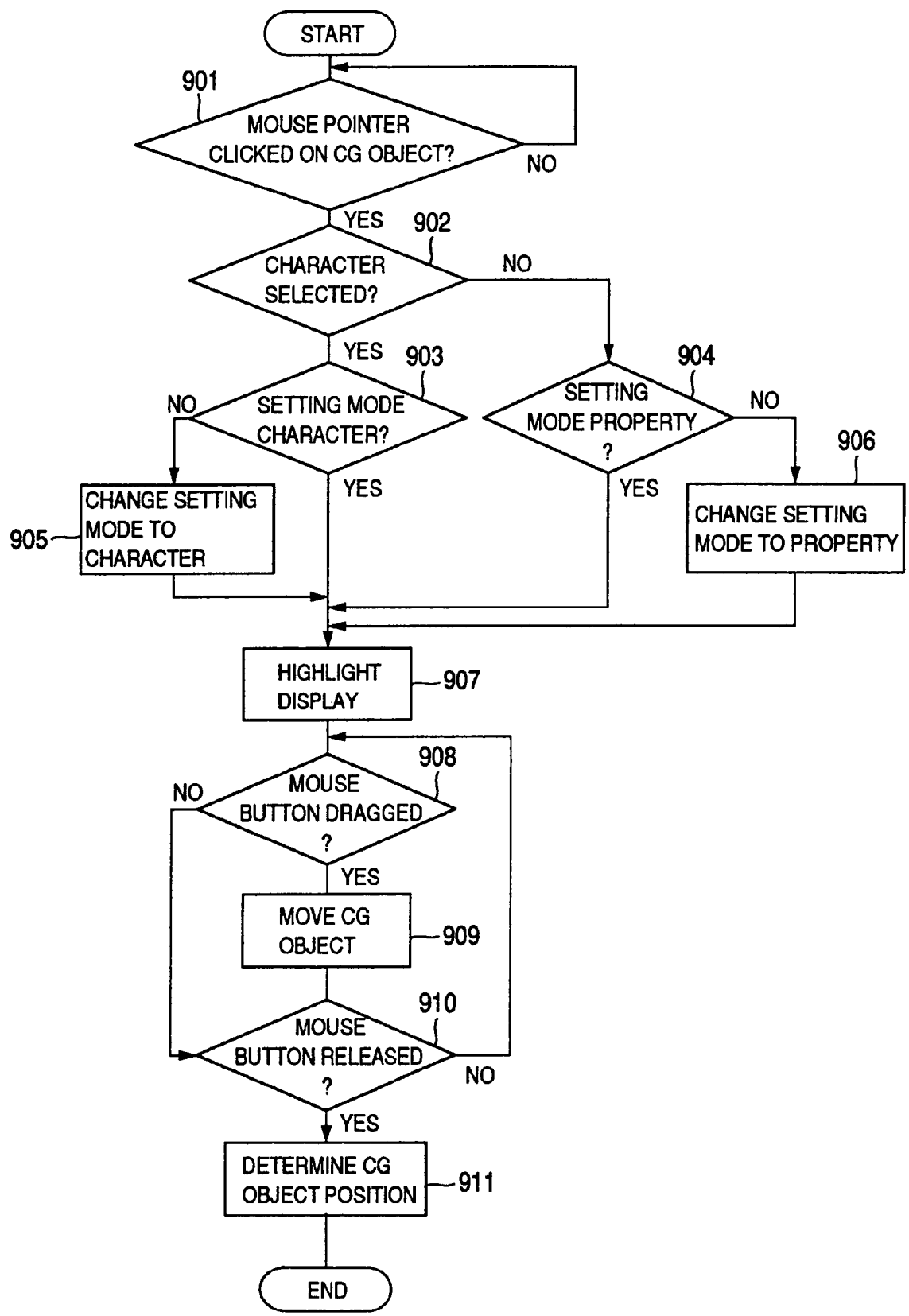
FIG. 40 is a flowchart showing the process of operation from the selection to the end of movement of a CG object.

Now, the actual operation according to an embodiment will be explained with reference to the screen of FIG. 22 and the flowchart of FIG. 40. FIG. 22 is an enlarged view of the monitor window 210 and was already explained. FIG. 40 is a flowchart for the operation performed from the selection of a CG object to the complete movement thereof. According to this embodiment, a CG character 451 and a desk 455 that is a property are integrated with each other as a CG object in the studio.

In step 901 of FIG. 40, it is determined whether the mouse pointer 550 has been clicked or not on the CG object in the monitor window 210. In the case where the mouse pointer has been clicked on the CG object, the process proceeds to step 902, and otherwise, the standby state is continued until the mouse pointer is so clicked. In step 902, it is determined whether the selected CG object is a CG character or a property.

In the case where the selected CG object is a CG character, the process proceeds to step 903, while otherwise the process proceeds to step 904. In step 903, the set mode is determined. In the case where the set mode 352 (FIG. 21) is other than the CG character, the process proceeds to step 905, while in the case where the set mode is a CG character, the process proceeds to step 907. In step 905, the set mode 352 is automatically changed to the character, and the process proceeds to step 907. Also in the case where a property is selected in step 902, the process proceeds to step 907 if the set mode 352 is a property in step 904. Otherwise, the process proceeds to step 906. In step 906, the set mode 32 is automatically changed to a property and the process proceeds to step 907.

In step 907, the direction in which the character board 358 (FIG. 21) and the CG object moves is highlighted (defined by a red frame), followed by proceeding to step 908. The restraints are imposed that the direction in which the CG object moves is along the plane determined in step 705 in FIG. 33, and the character is not moved in y direction. Thus, only the arrangement x text field 362 (FIG. 21) is highlighted. When the mouse is dragged in step 908, the process proceeds to step 909. Otherwise, the process proceeds to step 910. In step 909, the CG object is moved and the process proceeds to step 910.

In step 910, it is determined whether the operation of releasing the mouse (stopping dragging) has been carried out or not. In the case where the dragging is complete, the process proceeds to step 911, while if the dragging is continued, the process returns to step 908. In step 911, the movement of the CG object is completed, and the position of the CG object is stored in the memory 102.

Figure 41:
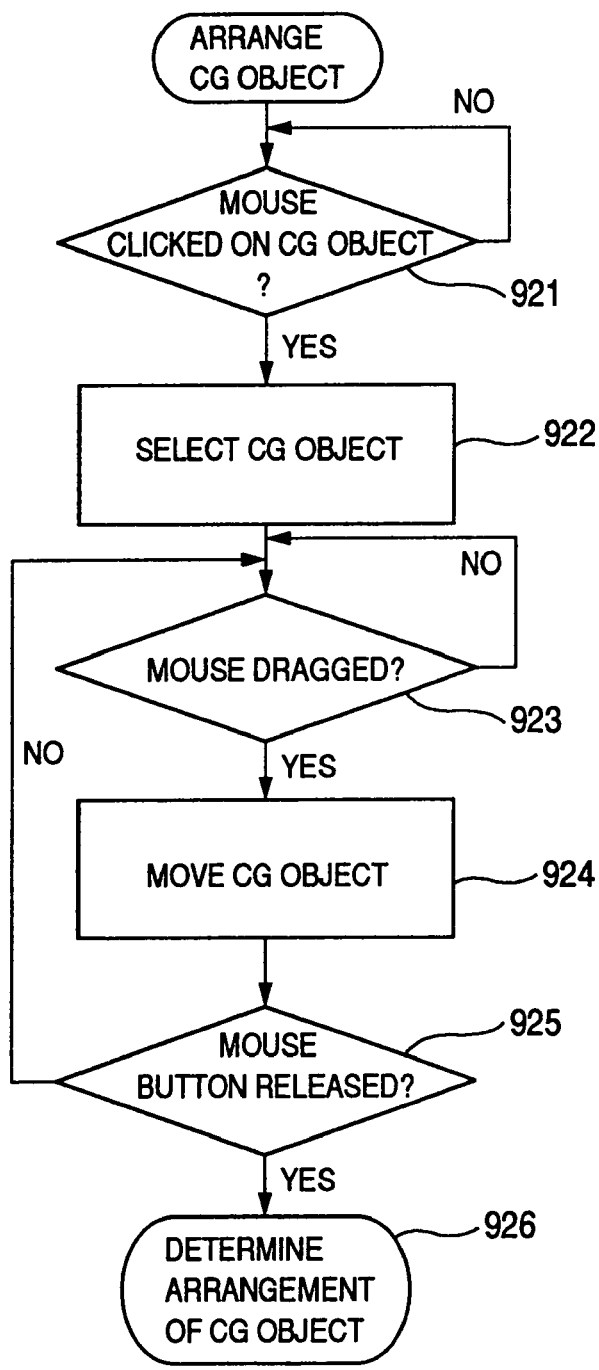
FIG. 41 is a flowchart showing the process of moving a CG object in an editing method according to an embodiment of the invention.

FIG. 41 is a flowchart summarizing the steps of intuitive edit operation (movement of the object) for the CG object carried out by the mouse pointer 550 on the monitor window 210 in accordance with the flowcharts of FIGS. 25, 27, 33 and 40.

The flowchart of FIG. 41 will be explained. In step 921, it is determined whether the operation of selecting any of the CG objects in the monitor window 210 has been performed by the mouse pointer. This select operation is performed in the case where the user edits an image by some operation for an object in the monitor window. In determining whether a CG object has been selected or not, the process is carried out for transforming the CG object in the CG studio coordinate (three dimensions) to a value on the projection coordinate corresponding to the monitor window. By determining whether the coordinate of the mouse pointer on the projection coordinate is included in the two-dimensional coordinate area of the CG object, it is determined whether the CG object has been selected or not. Once the CG object has been selected by the mouse pointer, which CG object has been selected by the mouse pointer is determined in step 922. In step 923, it is determined whether the mouse pointer has been dragged or not. This drag operation is performed in the case where the edit work is carried out for moving the object selected by the user. In step 924, it is determined whether the CG object has been moved or not. In determining whether the CG object has been moved or not, the process is carried out for transforming the two-dimensional coordinate of the mouse pointer on the monitor window to the three-dimensional coordinate value on the CG studio. In step 925, it is determined whether the drag has been complete by releasing the mouse pointer or not. In step 926, the position information of the object at the position where the drag operation is completed is stored in memory.

These steps make it possible to perform all the edit operations for arranging the CG object only by the mouse operation on the monitor window 210.

In the aforementioned embodiment, a method of arranging a CG object in the studio was described. This method is also applicable to the case in which the position in the studio is designated for the motion of a CG object.

Figure 42:
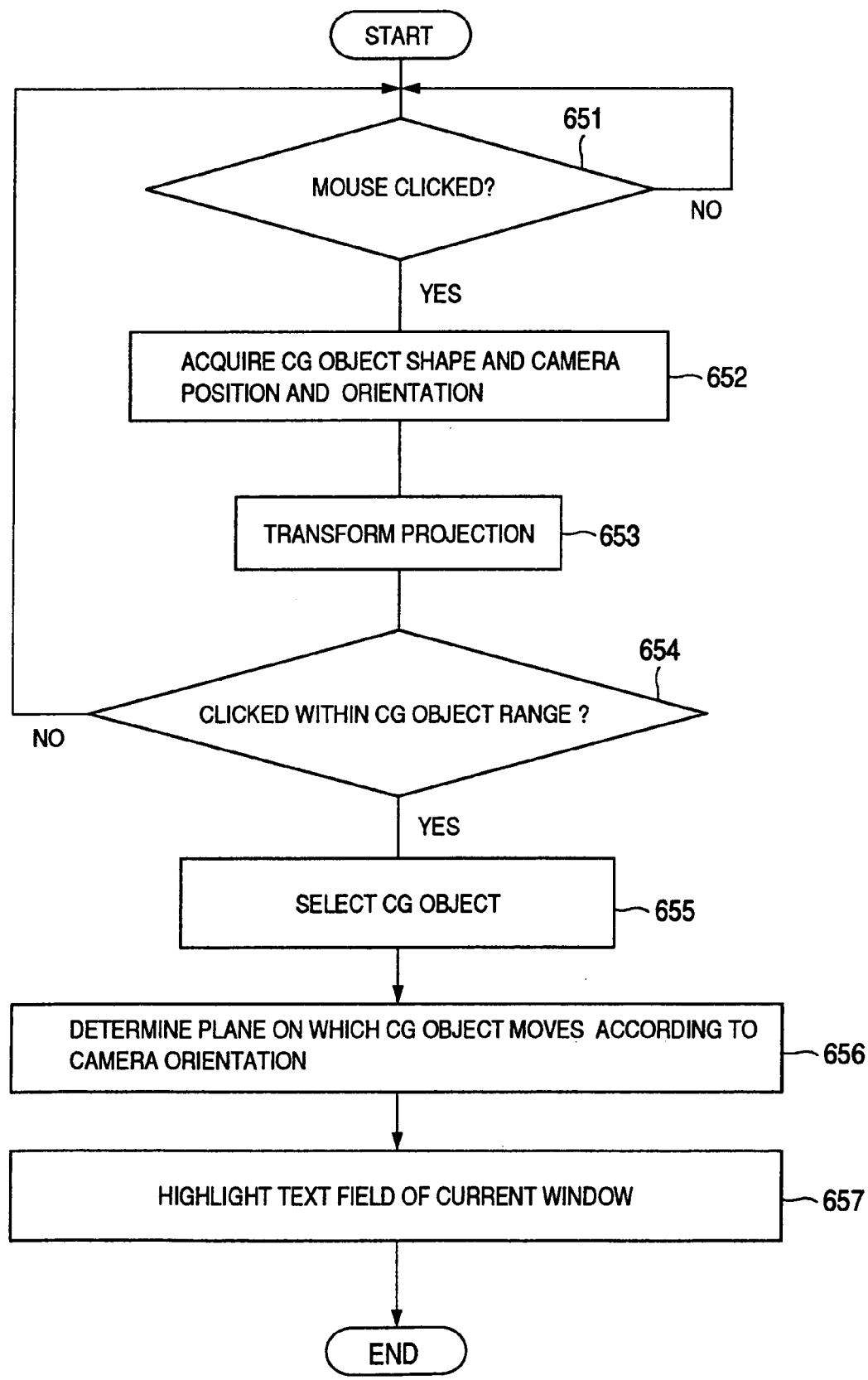
FIG. 42 is a flowchart showing the process of determining the projection coordinate of a CG object and highlighting the coordinate setting section in an editing method according to the invention.

Another embodiment of the invention will be explained with reference to FIGS. 42 to 45. FIG. 42 is a flowchart showing the flow of the process in the case where the CG object 451 displayed on the monitor window 210 of FIG. 20 has been clicked. FIG. 42 is the same flowchart as FIG. 25 to which the process for indicating the direction in which the CG object moves is added. In FIG. 42, the steps designated by the same reference numerals as the corresponding ones in FIG. 25 designate the same steps, respectively, and are not described. The plane on which the CG object determined in step 655 moves is determined in step 656. The process for determining the plane of movement is similar to the one described in steps 762 to 765 in the flowchart of FIG. 33 and therefore will not be explained. In step 657, the direction in which the object moves is displayed on the studio set-up window 351 in a manner easily understandable by the user. An example of this display will be explained below.

Figure 43:
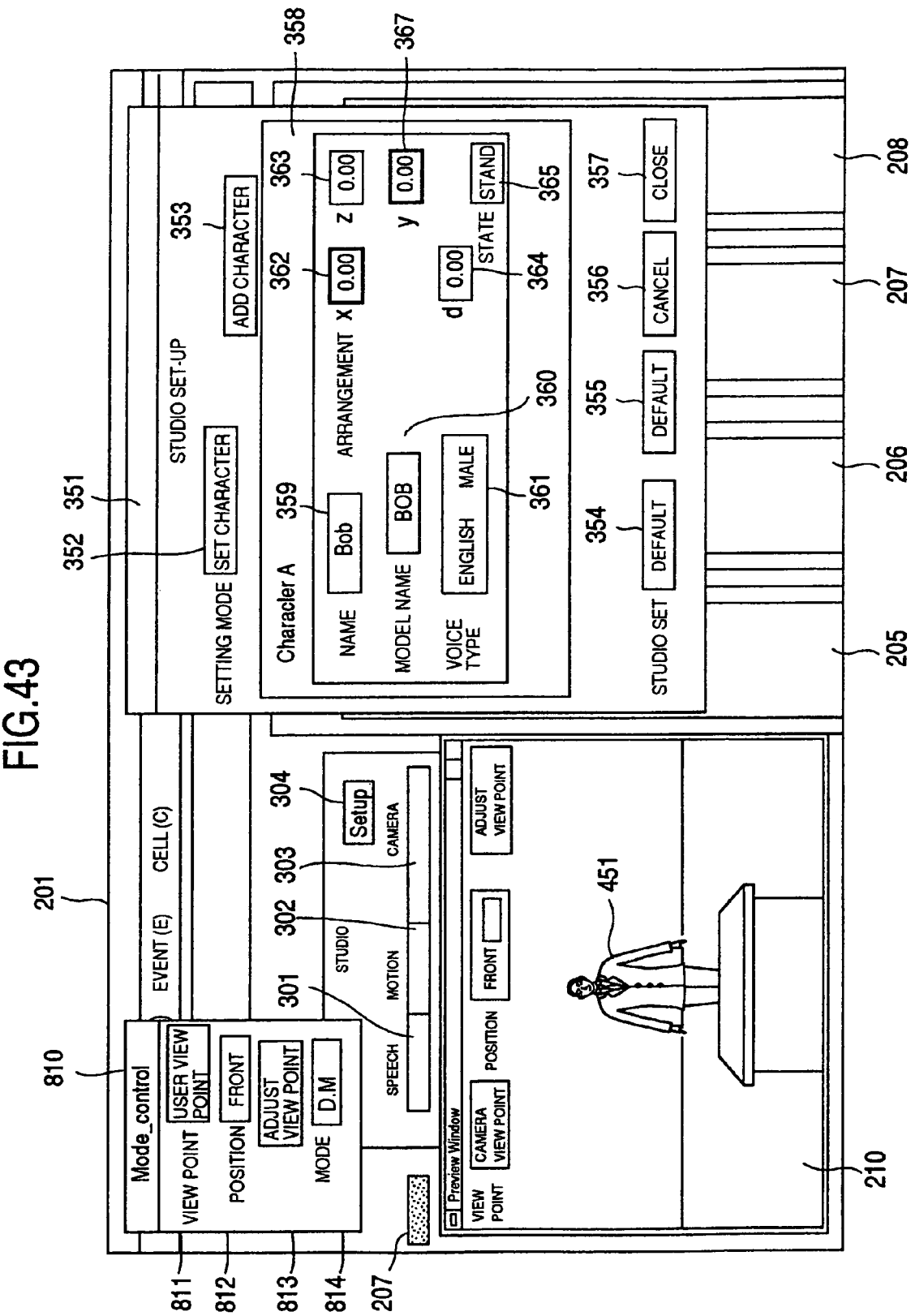
FIG. 43 is a diagram showing an example of highlighted display of the direction in which a CG object moves as viewed by the user from the front side thereof.
Figure 44:
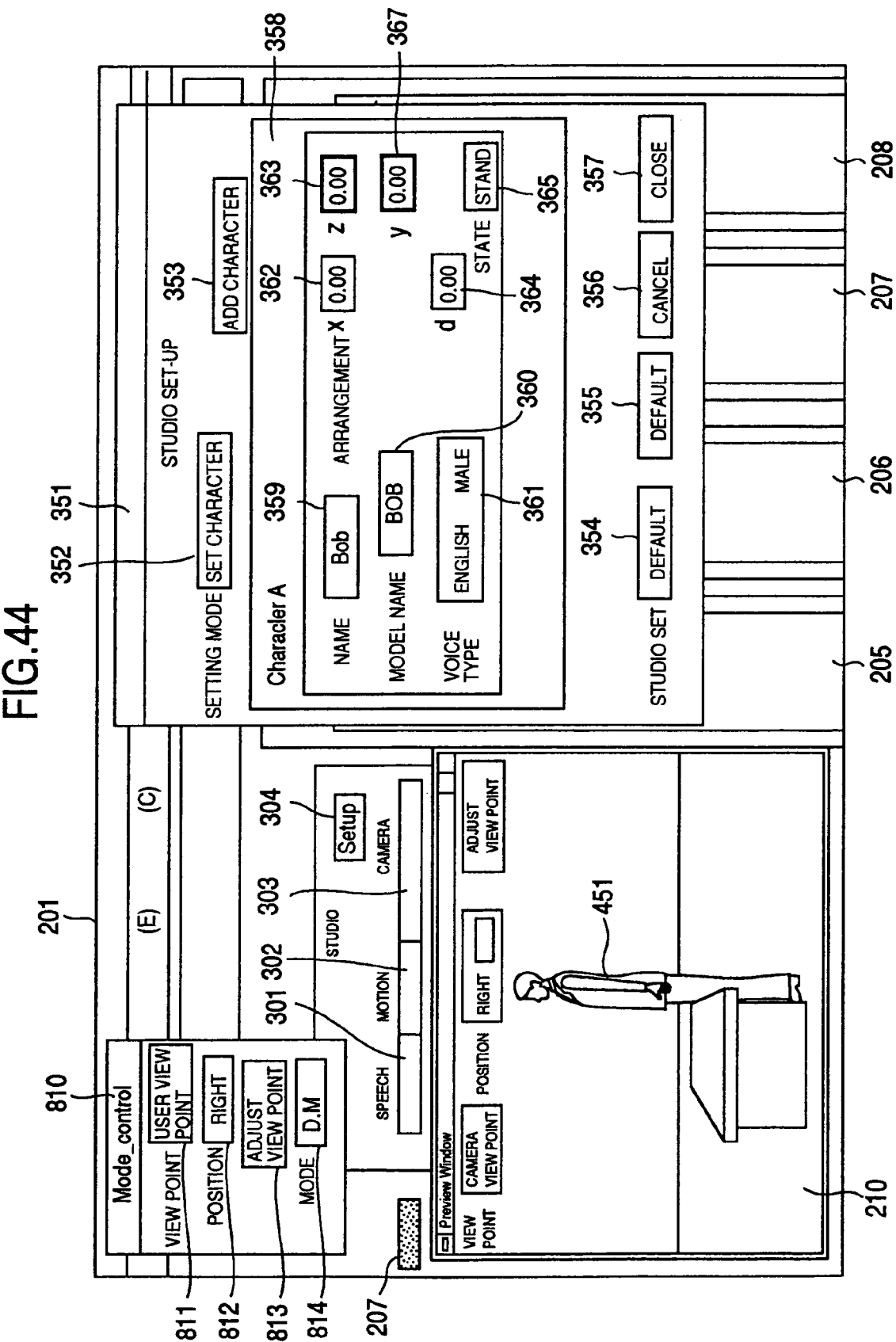
FIG. 44 is a diagram showing an example of highlighted display of the direction in which a CG object moves as viewed by the user from the right side thereof.
Figure 45:
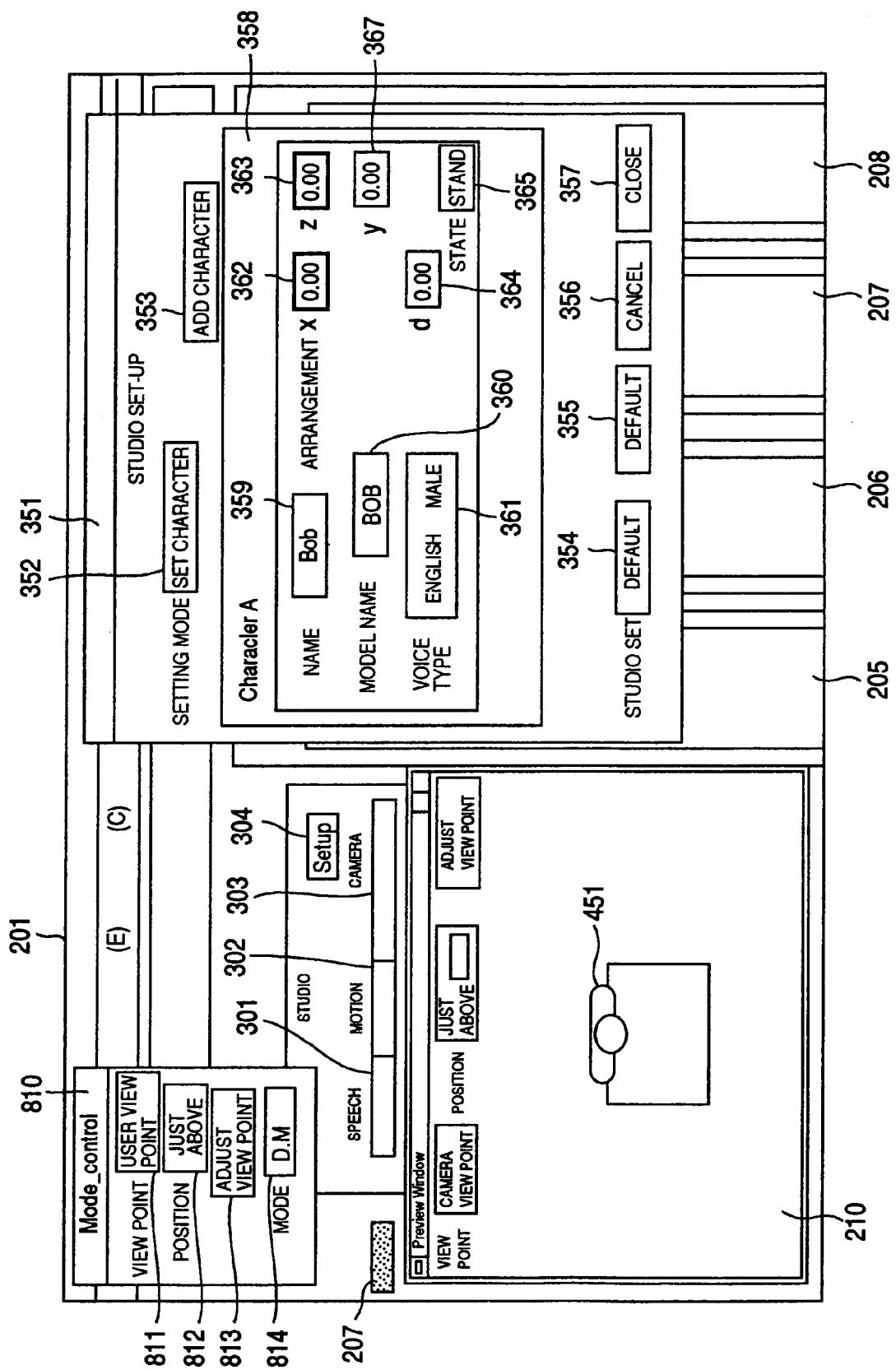
FIG. 45 is a diagram showing an example of highlighted display of the direction in which a CG object moves as viewed by the user from the top thereof.

FIGS. 43 to 45 are diagrams showing a mode control window 810 superposed on the edit window 201 shown in FIG. 21. In these diagrams, the component elements described above are designated by the same reference numerals, respectively, and therefore will not be described. An arrangement y value text field 367 is displayed on the character board 358. The y coordinate value of the CG object 451 is displayed in the arrangement y value text field 367.

FIG. 43 is a diagram showing a view point located on the front of the studio. FIG. 44 is a diagram showing a view point taken from the right side of the studio, and FIG. 45 is a diagram showing a view point taken from the ceiling of the studio.

In FIG. 43, the character 451 constituting a CG object displayed on the preview screen 210 is clicked by mouse. The coordination to which the CG character moves is then automatically determined in accordance with the direction of the camera set in step 657 of FIG. 42 to move on the plane on which the CG character moves. In the case under consideration, the xy plane is selected as a plane on which the character 451 moves. At the same time, the character 451 becomes movable along x and y axes, and the arrangement x value text field 362 and the arrangement y value text field 367 are defined by a red frame on the studio set-up window 351, thereby expressly indicating to the user the coordinate axis along which the the character 451 is movable. In similar fashion, in the case shown in FIG. 44, the character 451 is movable in the directions of y and z axes. Therefore, the arrangement z value text field 363 and the arrangement y value text field 367 are displayed in a red frame. In the case shown in FIG. 45, the arrangement x value text field 362 and the arrangement z value text field 313 are displayed in a red frame. The CG character 451, if selected as a CG object, however, is adapted to move always in contact with the floor, and therefore does not move in the direction of y axis. A property (such as a desk), if selected as a CG object, on the other hand, can move also in the direction of y axis.

The direction of movement of the CG object can be displayed in a form easily recognize to the user other than by a red frame. For example, the particular frame may be brightened than the other frames, flickered or thickened. According to this embodiment, the user is able to intuitively grasp the direction in which the CG object moves, and therefore the working efficiency of arranging a CG object is improved.

Figure 46:
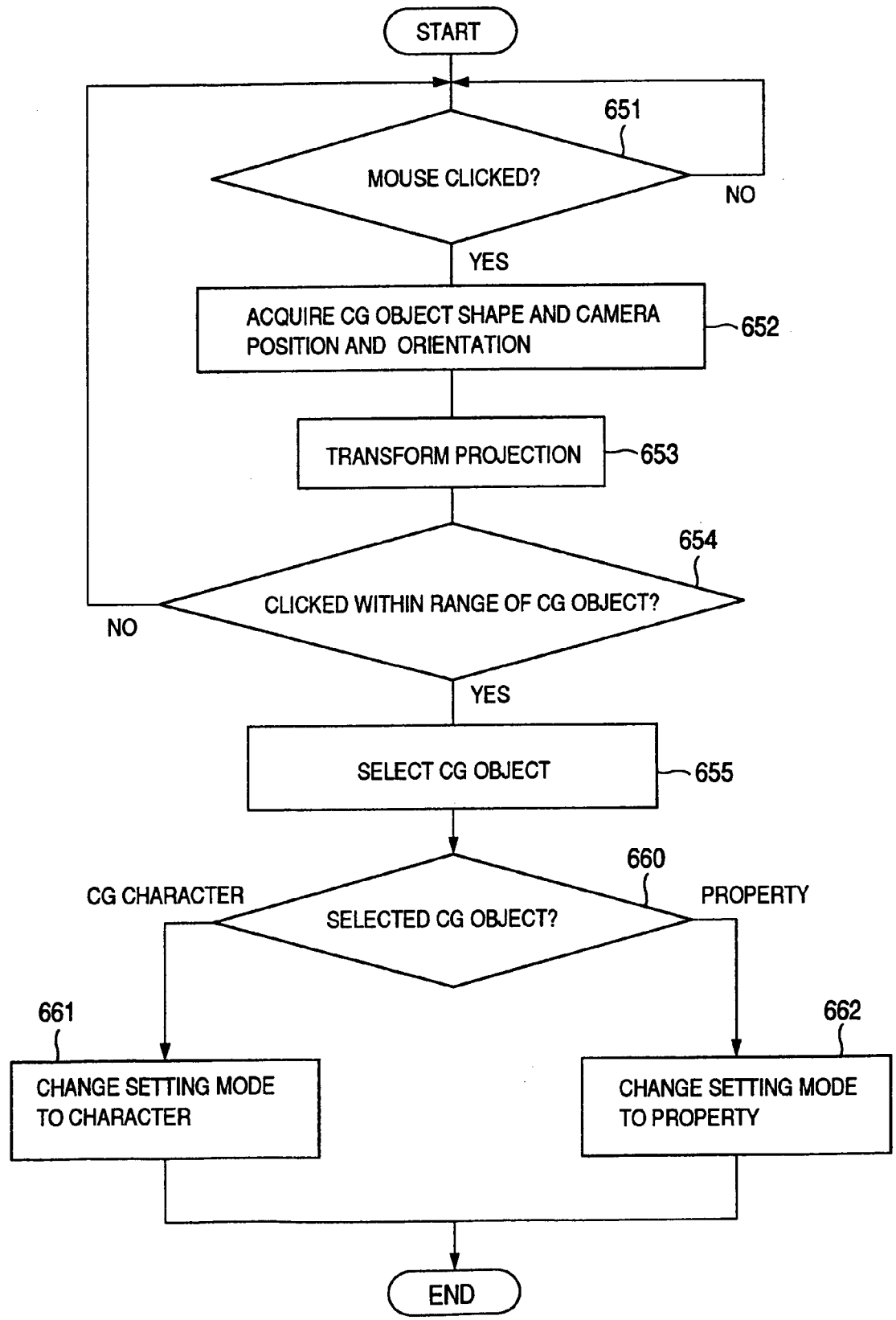
FIG. 46 is a flowchart of the process for switching the display in the set-up window automatically in an editing method according to the invention.

Still another embodiment will be explained with reference to FIGS. 46 to 48. FIG. 46, like the flowchart of FIG. 25, shows the flow of the process performed when the mouse is clicked on the monitor window 210. In FIG. 46, the same reference numerals as those in FIG. 25 designate the same component elements, respectively, and therefore will not be described. In FIG. 46, steps 660, 661, 662 are added after selecting a CG object in step 655. In step 660, it is determined whether the object 401 clicked on the monitor window 210 is a CG character or a property. In the case where the selected CG object is a CG character, the process proceeds to step 661, and the studio set-up mode is automatically set to the character setting mode. In the case where the selected CG object is a property, on the other hand, the process proceeds to step 662 in which the studio set-up mode is automatically set to the property setting mode.

Figure 47:
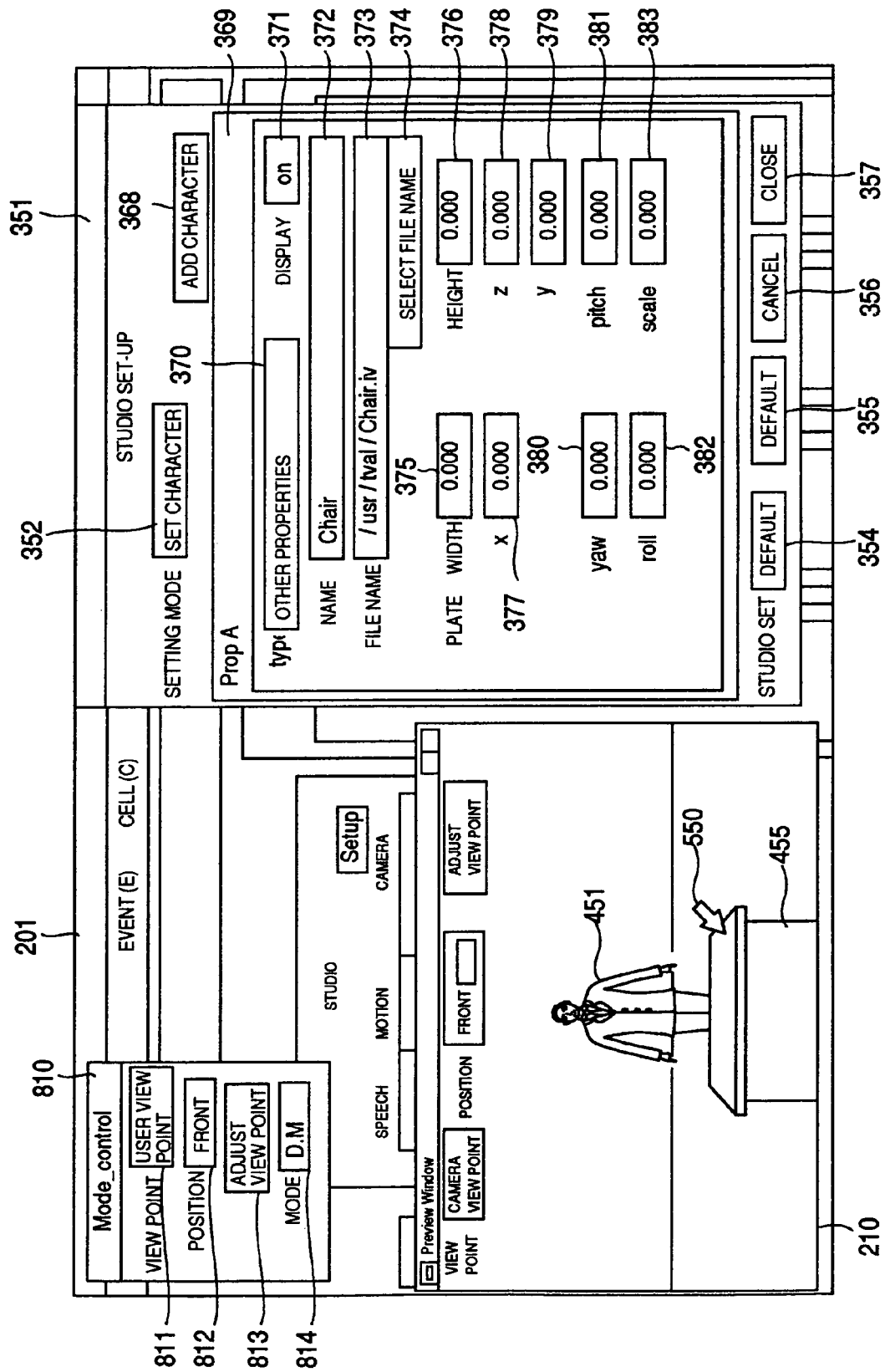
FIG. 47 shows a basic edit screen of a TV program creation device for setting properties in an editing method according to the invention.
Figure 48:
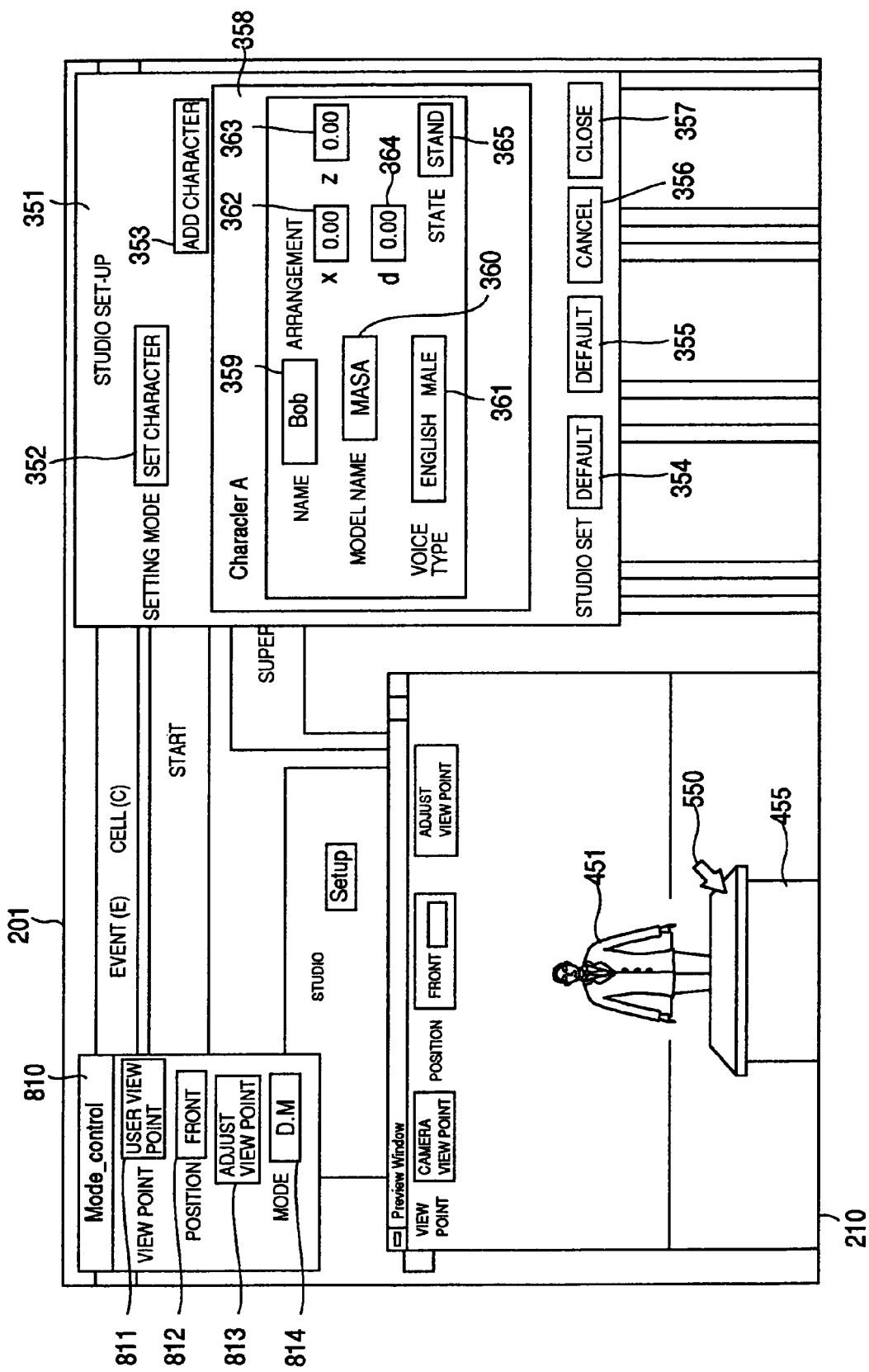
FIG. 48 shows a basic edit screen of a TV program creation device for setting a character in an editing method according to the invention.

FIGS. 47 and 48 are diagrams for explaining a specific example of the functions of determining whether the CG object displayed on the monitor window 210 is a CG character or a property and automatically switching the setting mode of the studio set-up window 351.

FIG. 47, which is basically similar to FIG. 21, shows a mouse pointer 550 displayed on the monitor window 210. Assume that it is desired to display a desk 455 as a property not yet displayed on the monitor window 210. For adding the desk 455 to the monitor window 210, the first step is to select the property in the setting mode select menu 352 on the studio set-up window 351 shown in FIG. 21. As a result, the character board 358 and the character add button 353 are deleted, and the property add button 368 is displayed in place as shown in FIG. 47. Then, the property add button 368 is clicked. The desk 455 which is a property is displayed on the monitor window 210. At the same time, a prop board 369 is displayed on the studio set-up window 351. Under this condition, the edit work is possible to arrange the property 455 at an arbitrary position. Numeral 370 designates a type select menu, numeral 371 a display select menu, numeral 372 a name text field, numeral 373 a file name select text field, numeral 374 a file select button, numeral 375 a width text field, numeral 376 a height text field, numeral 377 an x text field, numeral 378 a z text field, numeral 379 a y text field, numeral 380 a yaw test field, numeral 381 a pitch text field, numeral 382 a roll text field, and numeral 383 a scale text field, all of which are arranged on the prop board 369. FIG. 48 is a diagram basically similar to FIG. 21.

In the case where the setting mode of the studio set-up is the property as shown in FIG. 47, the arrangement of the CG character 451 on the monitor window 210 can be changed by clicking the mouse button of the mouse pointer 550 located on the CG character 451 on the monitor window 210. As a result, the property add button 368 and the prop board 369 are deleted from the display of the studio set-up window 351 shown in FIG. 47, and the character add button 353 and the character board 358 of FIG. 48 are displayed in place. Also, the display of the setting mode select menu 352 shown in FIG. 47 is automatically switched from "property setting" to "character setting", expressly indicating that the CG character can be rearranged. In similar fashion, in the case where the setting mode is the character as shown in FIG. 48, the property 455 can be rearranged by placing the mouse pointer on the proper 455 on the monitor window 210 and clicking the mouse button. As a result, the character board 358 and the character add button 353 are deleted, and the prop board 369 and the property add button 368 are displayed in place. Also, the display of the setting mode select menu 352 is automatically switched to "property setting", expressly indicating that the property can be rearranged.

As described above, according to this invention, the character board 358 and the prop board 369 displayed on the studio set-up window 351 can be automatically switched to each other simply by clicking the CG character 451 or the properties 455 on the monitor window 210. As a result, the character setting mode and the property setting mode can be switched to each other simply by manipulating the mouse on the monitor window 210 without any input operation on the studio set-up window 351. As a result, the work required of the user is simplified for an improved edit work efficiency of image sequence creation.

Although the foregoing explanation refers to the studio set-up window 351, the invention is applicable with equal effect to the motion set-up window for editing the motion of the CG object and to the screen for editing a CG object.

Yet another embodiment will be explained with reference to FIGS. 49 to 54. According to this embodiment, the restraints of the direction in which a CG object displayed on the monitor window 210 moves when it is clicked are determined in accordance with the orientation of the camera. The restraints are defined as a virtual plane on which the CG object moves when the mouse pointer is dragged on the monitor screen 210. The camera orientation is determined by the angle of elevation and the azimuth angle.

Figure 49:
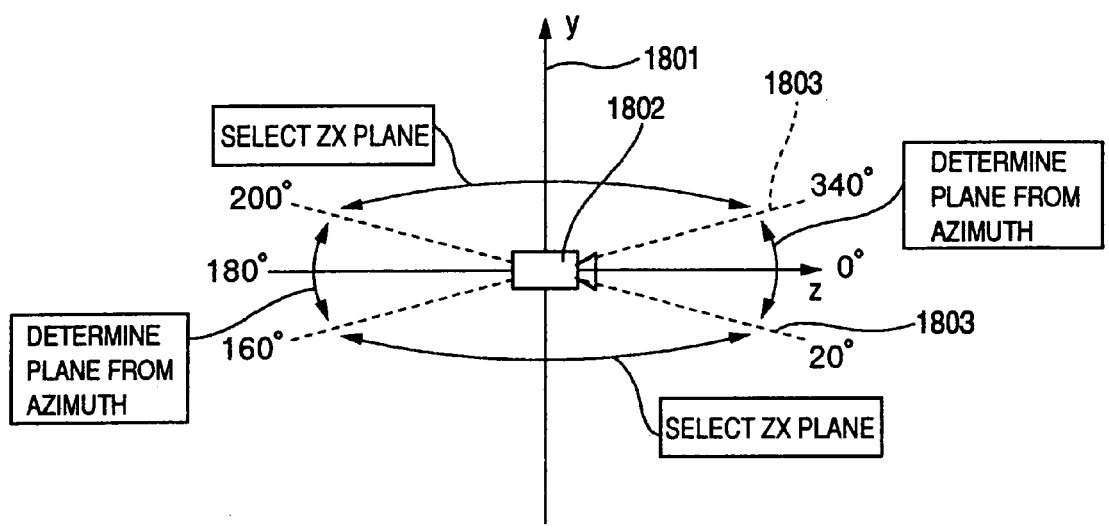
FIG. 49 is a diagram showing the relation between the azimuth of the camera and the plane in which a CG object moves.
Figure 50:
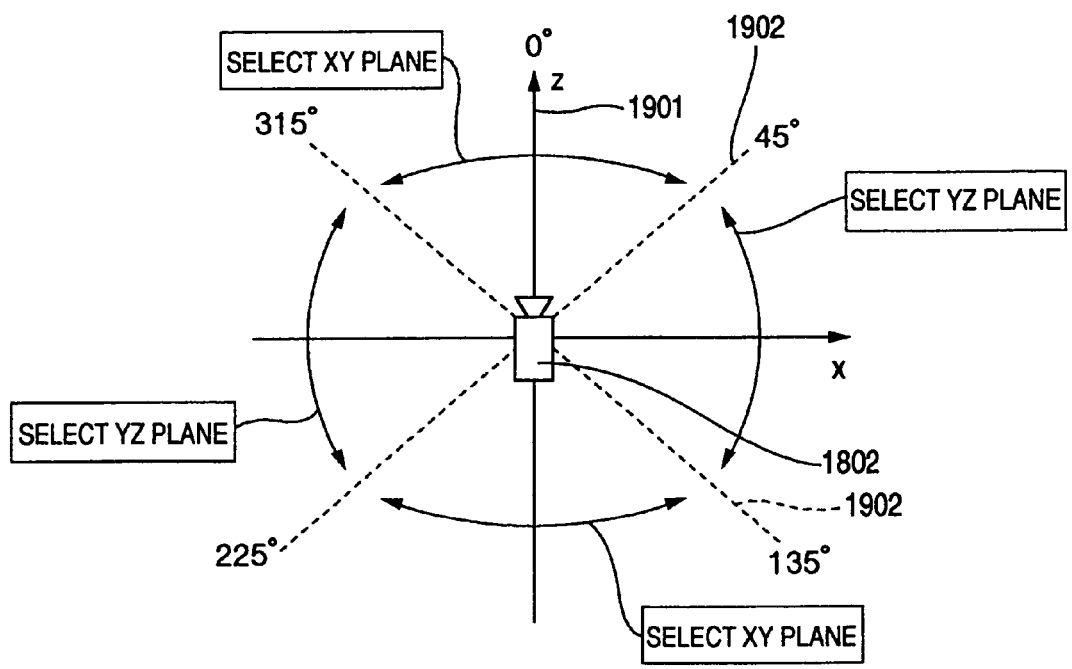
FIG. 50 is a diagram showing the relation between the elevation of the camera and the plane in which a CG object moves.
Figure 51:
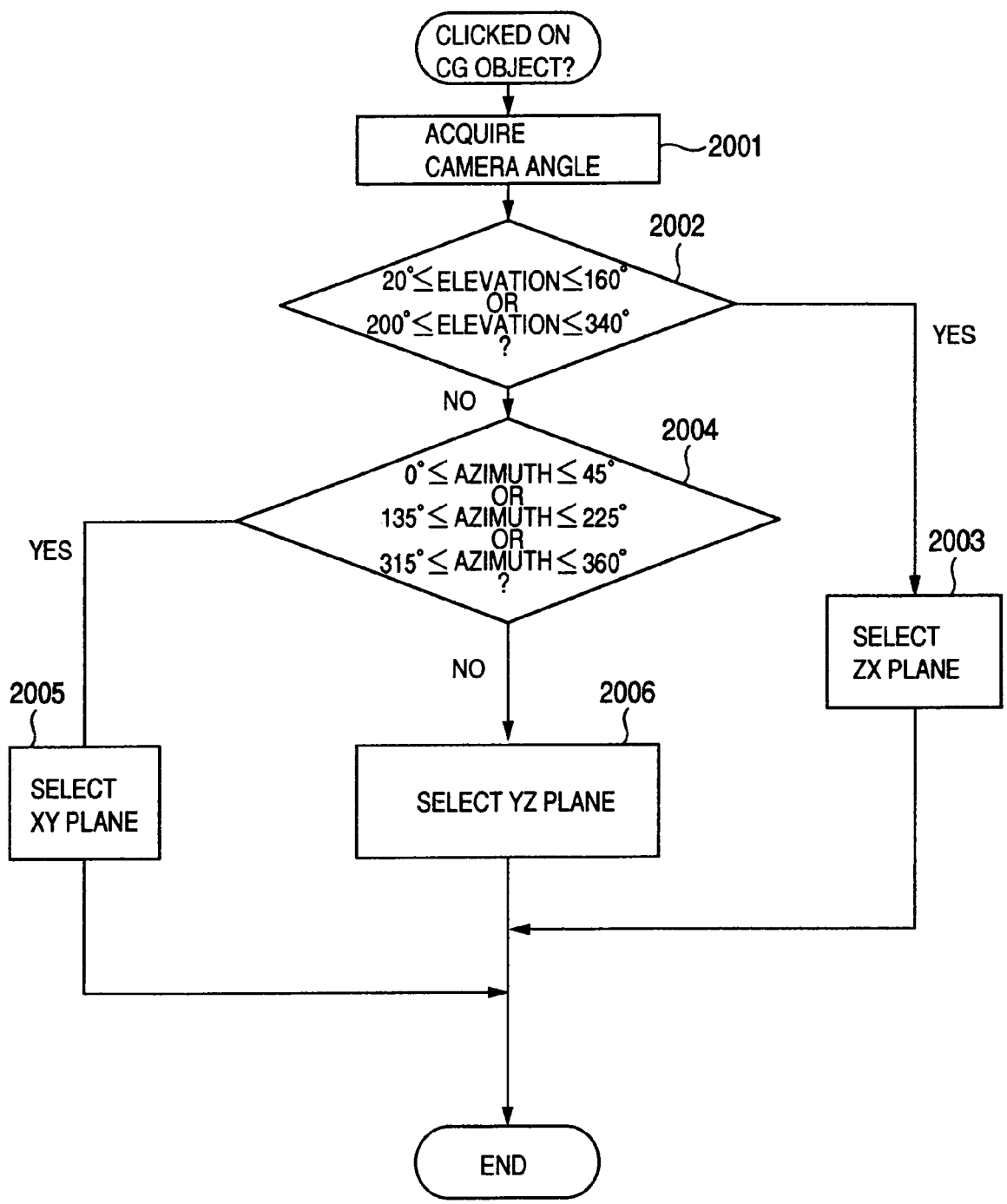
FIG. 51 is a flowchart of the process from the clicking of a CG object to the determination of the plane in which the CG object moves.

FIG. 49 shows the relation between the angle of elevation of the camera and the plane on which the CG object moves. Numeral 1801 designates a coordinate axis having the origin at the camera position, in which the page of the drawing is the yz plane and the direction perpendicular to the page is the x axis. Numeral 1802 designates the camera. The dotted line 1803 indicates the boundary at which the plane on which the CG object moves is switched when changing the angle of elevation of the camera 1802. The angle of elevation is set to 0° when the camera 1802 is directed in positive direction along the z axis. FIG. 50 is a diagram showing the relation between the azimuth angle of the camera 1802 and the plane on which the CG object moves. Numeral 1901 designates a coordinate axis having the origin at the camera position, in which the page of the drawing constitutes the zx plane and the direction perpendicular to the page is the y axis. The dotted line 1902 indicates the boundary at which the plane on which the CG object moves is switched when changing the azimuth angle of the camera 1802. The azimuth angle is assumed to be 0° when the camera 1802 is oriented in positive direction along the z axis. FIG. 51 is a flowchart showing the process from the clicking of the CG object to the determination of the plane on which the CG object moves.

First, a method of selecting the plane on which the CG object moves in the case where the orientation of the camera switching the plane on which the CG object moves is assumed to be 45° in azimuth and 20° in elevation will be explained with reference to FIGS. 49 to 51.

In step 2001, the values of the angle of elevation and the azimuth angle of the camera are acquired from the memory 102. In the case where it is determined in step 2002 that the elevation of the camera 1802 is between 20° and 160° inclusive or between 200° and 340° inclusive, the zx plane is selected in step 2003 as a plane on which the CG object is moved. In the case where the answer in step 2002 is NO, the process proceeds to step 2004. In other words, as shown in FIG. 50, the plane on which the CG object moves is determined in accordance with the azimuth angle of the camera 1802.

In the case where it is determined in step 2004 that the azimuth angle of the camera 1802 is between 0° and 45° inclusive, between 135° and 225° inclusive or not lower than 315° but lower than 360°, then the xy plane is selected in step 2005 as the plane on which the CG object moves. In the case where the determination in step 2004 is NO, the yz plane is selected in step 2006 as a plane on which the CG object moves.

Figure 53:
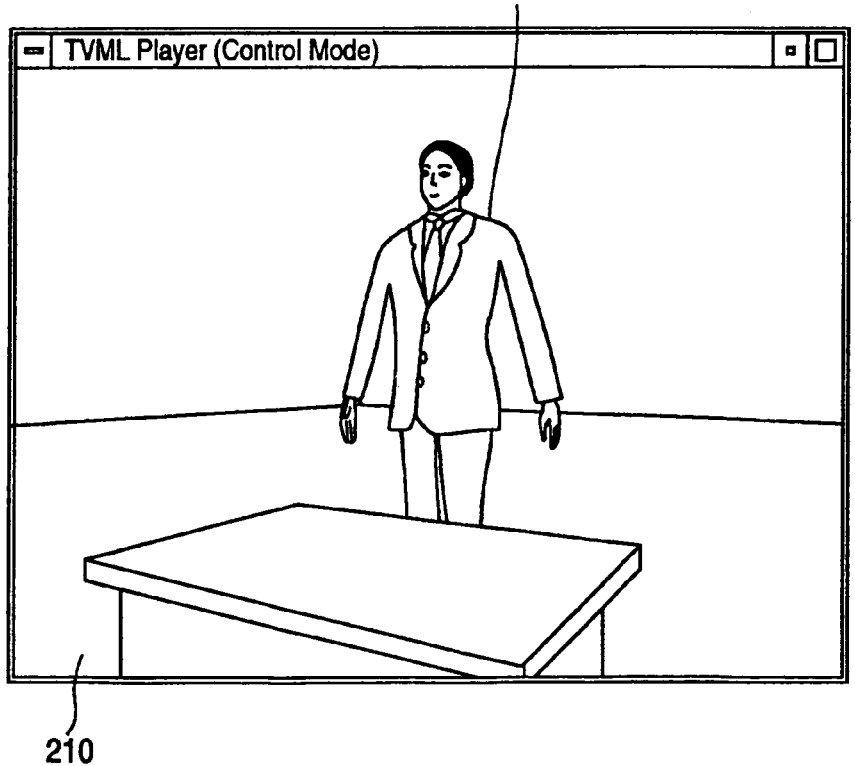
FIG. 53 is a diagram showing an example of a monitor window displayed with the camera azimuth of 30° and the camera elevation of 0°.
Figure 54:
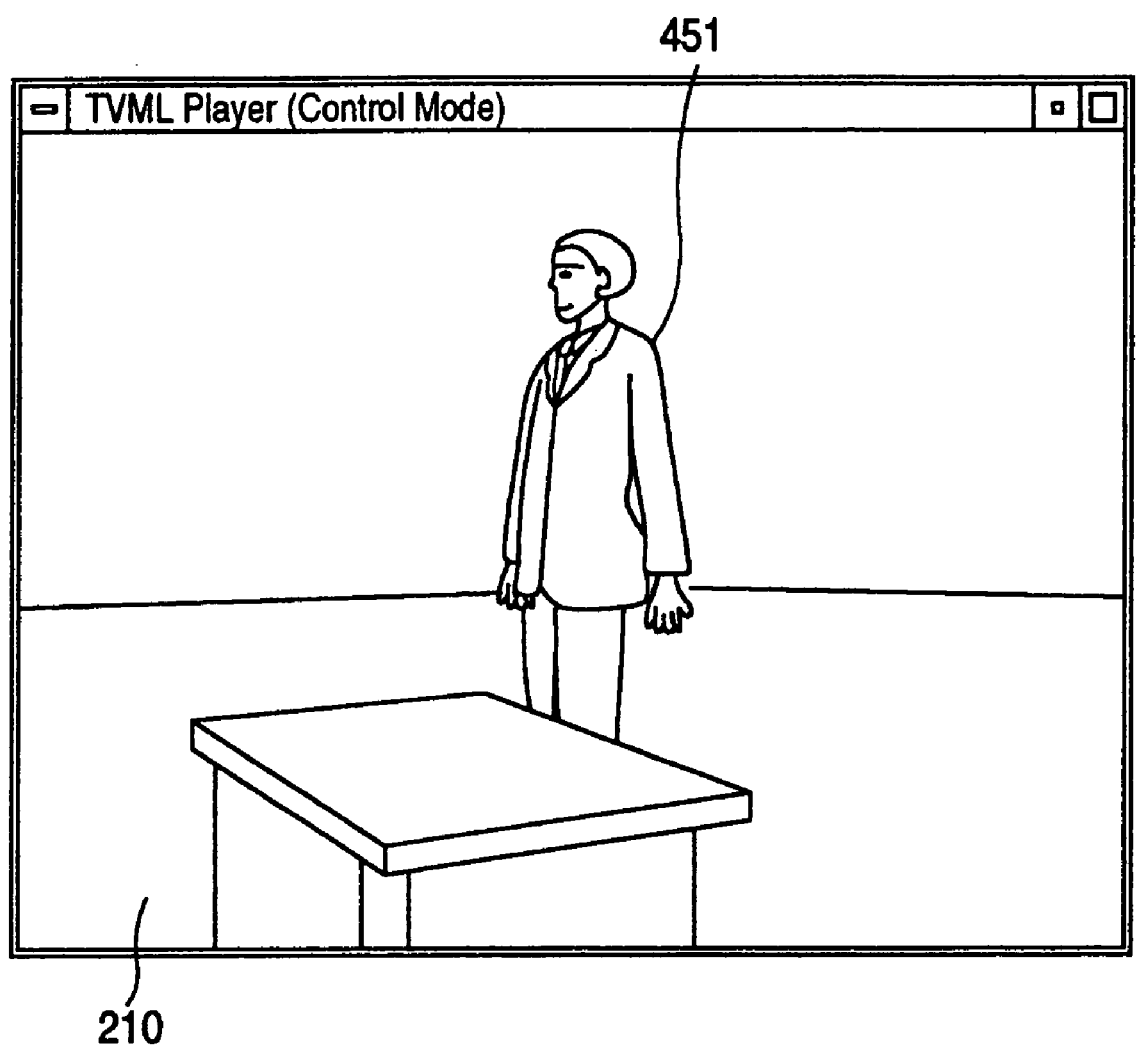
FIG. 54 is a diagram showing an example of a monitor window displayed with the camera azimuth of 600 and the camera elevation of 0°.

Now, the relation between the screen displayed on the monitor window 210 and the plane on which the CG object moves will be explained with reference to FIGS. 52 to 54.

Figure 52:
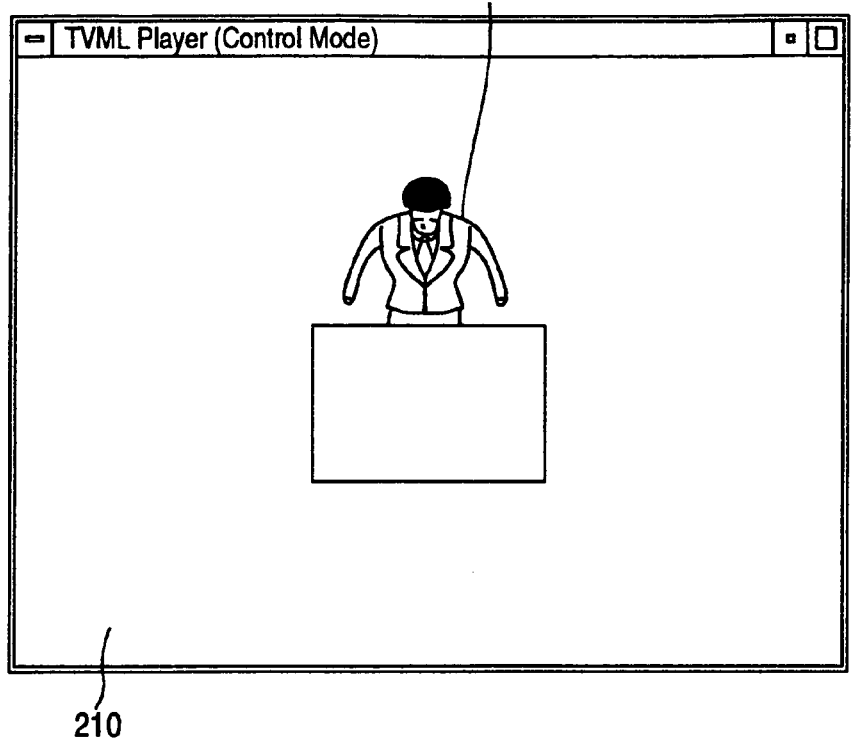
FIG. 52 is a diagram showing an example of a monitor window displayed with the camera azimuth of 0° and the camera elevation of 70°.

FIG. 52 shows an example of the screen on the monitor window 210 in the case where the azimuth angle of the camera 1802 is 0° and the elevation thereof is 70°. When the CG character 451 constituting a CG object is clicked, the zx plane is selected as a plane on which the CG character 451 moves according to the flowchart, and therefore the CG object 451 becomes movable in the directions of x and y axes. FIG. 53 shows an example screen of the monitor window 210 in the case where the azimuth angle of the camera 1802 is 300 and the elevation thereof is 0°. Since the xy plane is selected as a plane on which the CG character 451 moves, the CG character 451 moves along x and y axes. FIG. 54 shows an example of the screen of the monitor window 210 in the case where the azimuth angle of the camera 1802 is 60° and the elevation thereof is 0°. Since the yz plane is selected as a plane on which the CG character 451 moves, the CG character 451 becomes movable along both y and z axes.

By making it possible to automatically switch the plane on which the CG object moves in accordance with the position (orientation) of the camera by the aforementioned process, the program edit work is possible simply by manipulating the mouse on the screen of the monitor window 210 in whatever direction the camera is positioned.

The embodiment described above refers to the case in which the camera position for switching the plane on which the CG object moves is at the azimuth angle of 45° and the elevation of 20°. Nevertheless, the user can set the camera position as desired for switching the plane on which the CG object moves. This can be implemented by describing the camera position (elevation and azimuth) for switching the plane on which the CG object moves, in the setting file for reading when starting the program editing apparatus according to this invention.

In the aforementioned embodiment, a person was taken as an example of a CG character. Nevertheless, the CG character is not limited to the person, but the present invention of course is applicable to a living creature, a plant, etc. and all the objects, real or virtual, conceivable as an image.

Also, although an image data editing method was explained as a TV program editing method for creating and editing a TV program according to the embodiments described above, the present invention of course is applicable to the editing of all image data for creating and editing the video information such as the education TV, the demonstration video, moving images of conference materials, etc.

Further, the invention is of course applicable to not only the CG studio modeling after an actual TV studio but all images (scenes) corresponding to the virtual reality, images (scenes) picked up in reality and a combined space of them.

It will thus be understood from the foregoing description that according to this invention, a method of operation for moving a CG object immediately following the mouse pointer has been realized. As a result, it has become possible to arrange a CG object directly on the monitor window, thereby improving the efficiency of the work for producing and editing image sequences.

Also, it has become possible to arrange a CG object simply by manipulating the monitor window for an improved operability of the work for producing moving image.

What is claimed is:

1. A method of editing an image displayed on a display screen of a display unit, comprising the steps of:
   reading from a memory unit position information of computer graphics (CG) object located in the CG studio displayed on the display screen and information about position and orientation of a camera which picks up an image of said CG studio;

acquiring the information about a position to which a pointing icon has moved on the display screen of said display unit by the operation of said pointing device;

selecting a CG object on the display screen;

determining a three-dimensional area surrounding the CG object in the CG studio;

making coordinate transform on the three-dimensional area to a two-dimensional area on the display screen;

in a case that the pointing icon is located within the two-dimensional area, determining that the CG object existing in the two-dimensional area has been selected; and moving the selected CG object to the position which said pointing icon has moved, wherein said step of moving the selected CG object comprises the step of:

determining the plane on which said CG object moves in said CG studio based on said information about the position and orientation of said camera.

2. A method according to claim 1, further comprising the step of:

determining whether the CG object selected by said pointing device is a CG character of a property.

3. A method according to claim 2, further comprising the step of:

updating data of a character set-up window on the display screen in the case where said CG object is a CG character; and updating data of a studio set-up window on the display screen in the case where said CG object is a property, based on the information on the position to which said CG object has moved.

4. An apparatus for editing an image displayed on a display screen of a display unit, comprising:

means for reading from a memory unit position information of a computer graphics (CG) object located in a CG studio displayed on the display screen and information about position and orientation of a camera which picks up an image of said CG studio;

means for acquiring the information about a position to which a pointing icon has moved on said display screen by an operation of said point device;

means for determining a three-dimensional area surrounding the CG object in the CG studio;

means for making coordinate transform on the three-dimensional area to a two-dimensional area on the display screen;

means for determining that the CG object existing in the two-dimensional area has been selected in a case that the pointing icon is located within the two-dimensional area;

means for moving a selected CG object on the display screen to said position to which said pointing icon has moved; and means for updating data of a character set-up window on the display screen in the case where said CG object is a CG character, and updating data of a studio set-up window on the display screen in the case where said CG object is a property, based on the information on the position to which said CG object has moved.

5. An apparatus according to claim 4, further comprising:

means for determining whether the CG object selected by the point device is a CG character or a property.

* * * * *